F. B. CONVERSE.
LINOTYPE MACHINE.
APPLICATION FILED NOV. 9, 1907.
925,754.
Patented June 22, 1909.
31 SHEETS—SHEET 3.
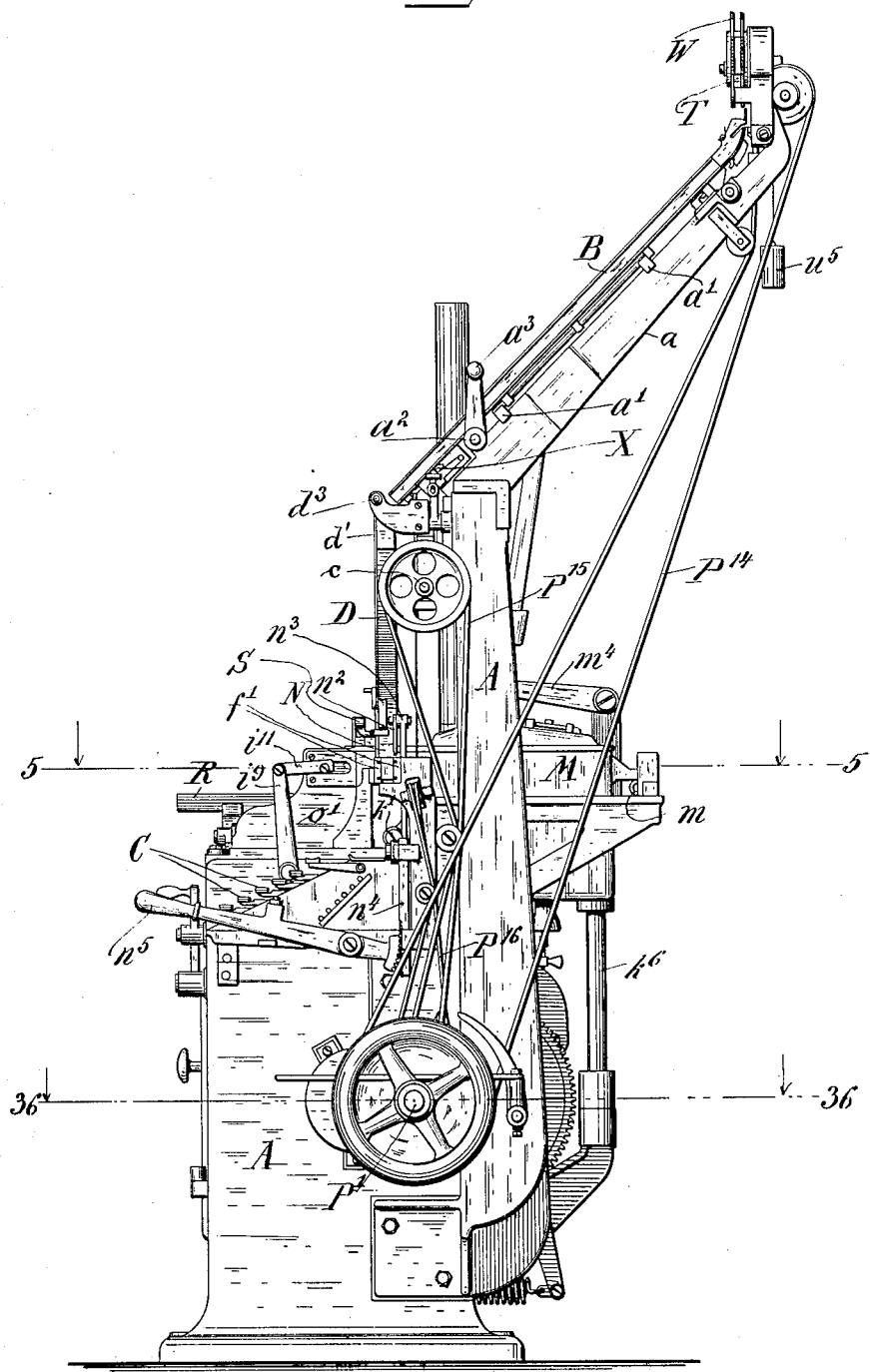

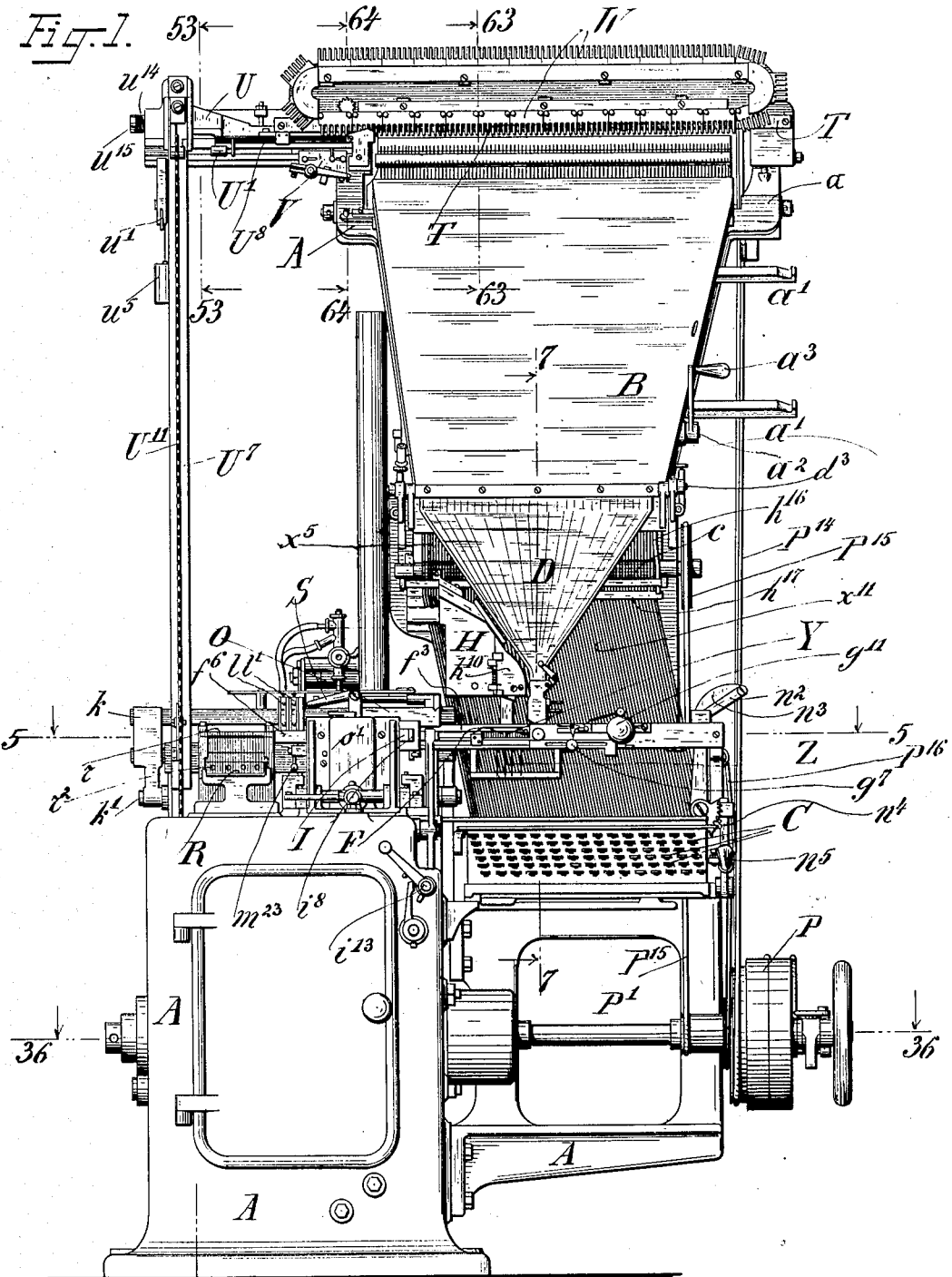

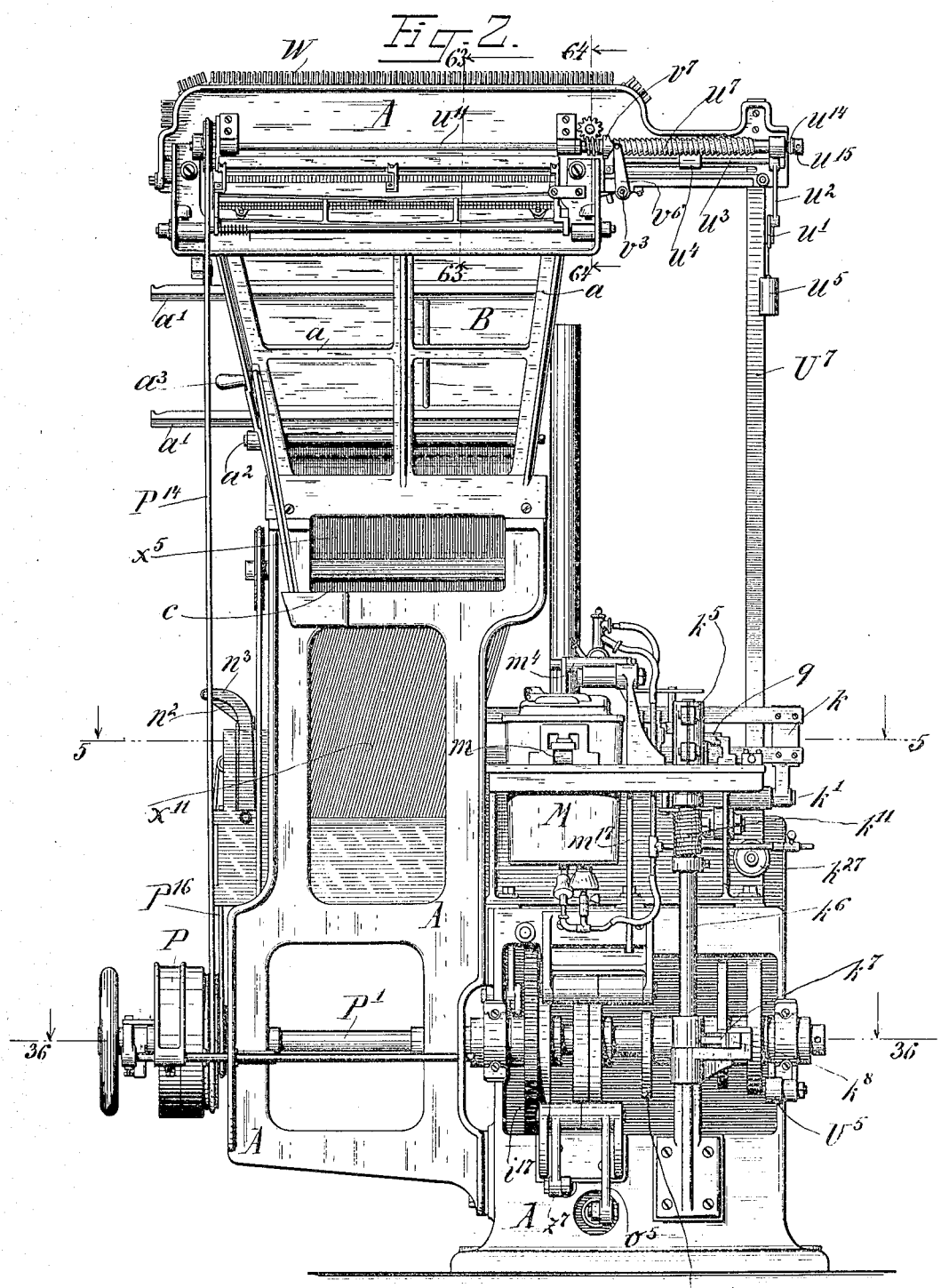

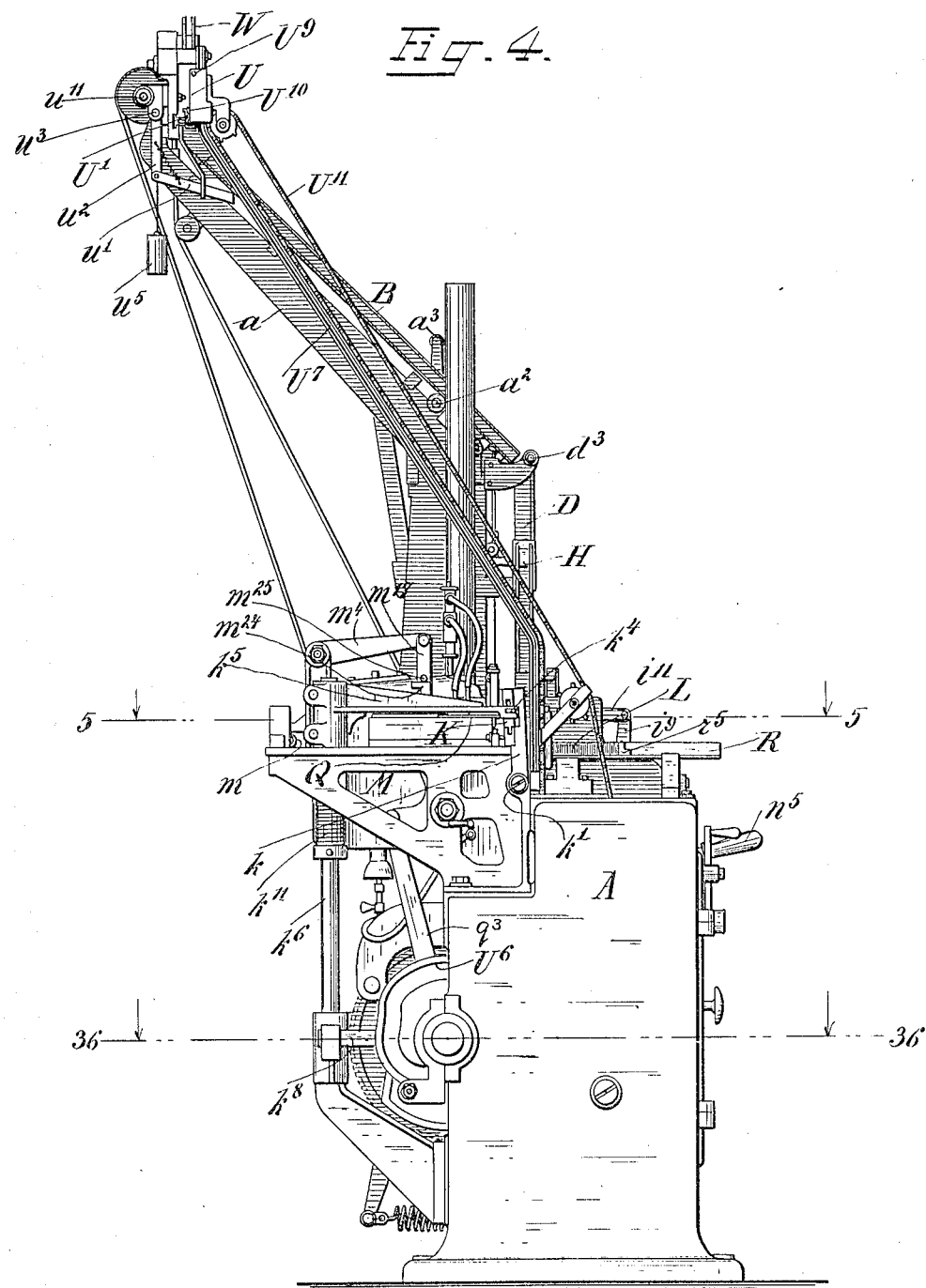

F. B. CONVERSE.
LINOTYPE MACHINE.
APPLICATION FILED NOV. 9, 1907.
925,754.
Patented June 22, 1909.
31 SHEETS—SHEET 5.
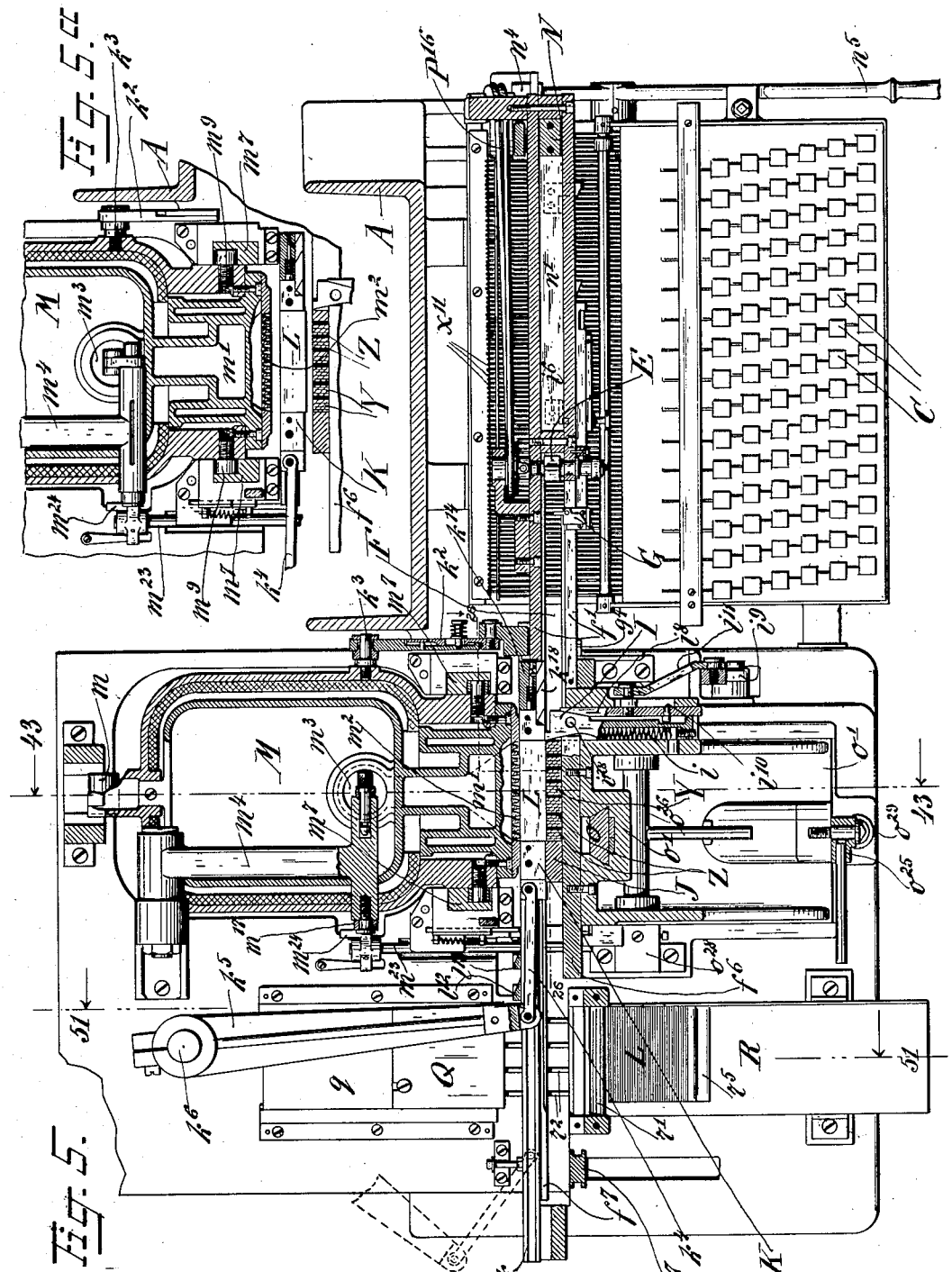
Witnesses
Francis B. Converse, Inventor
By his Attorney

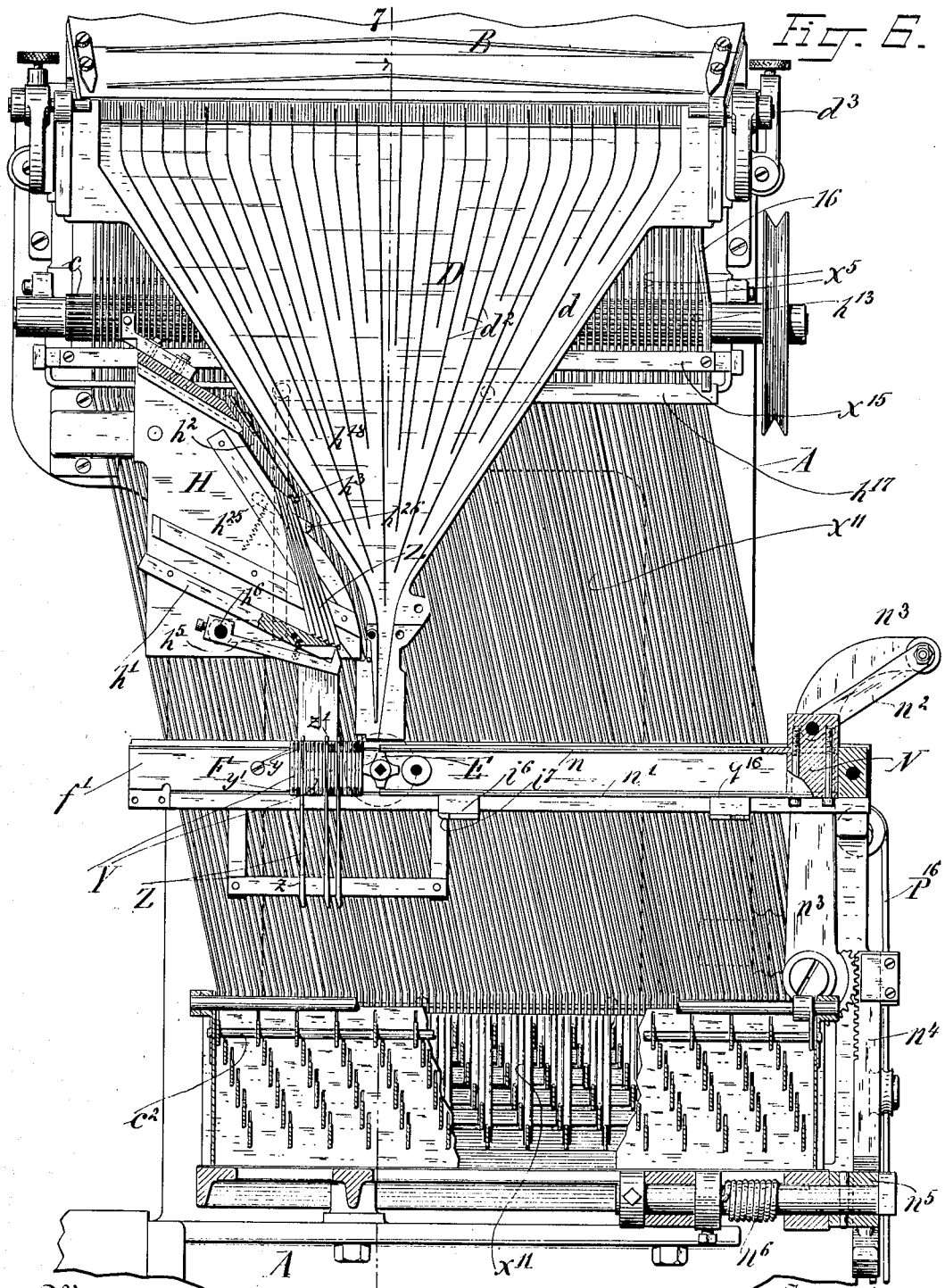

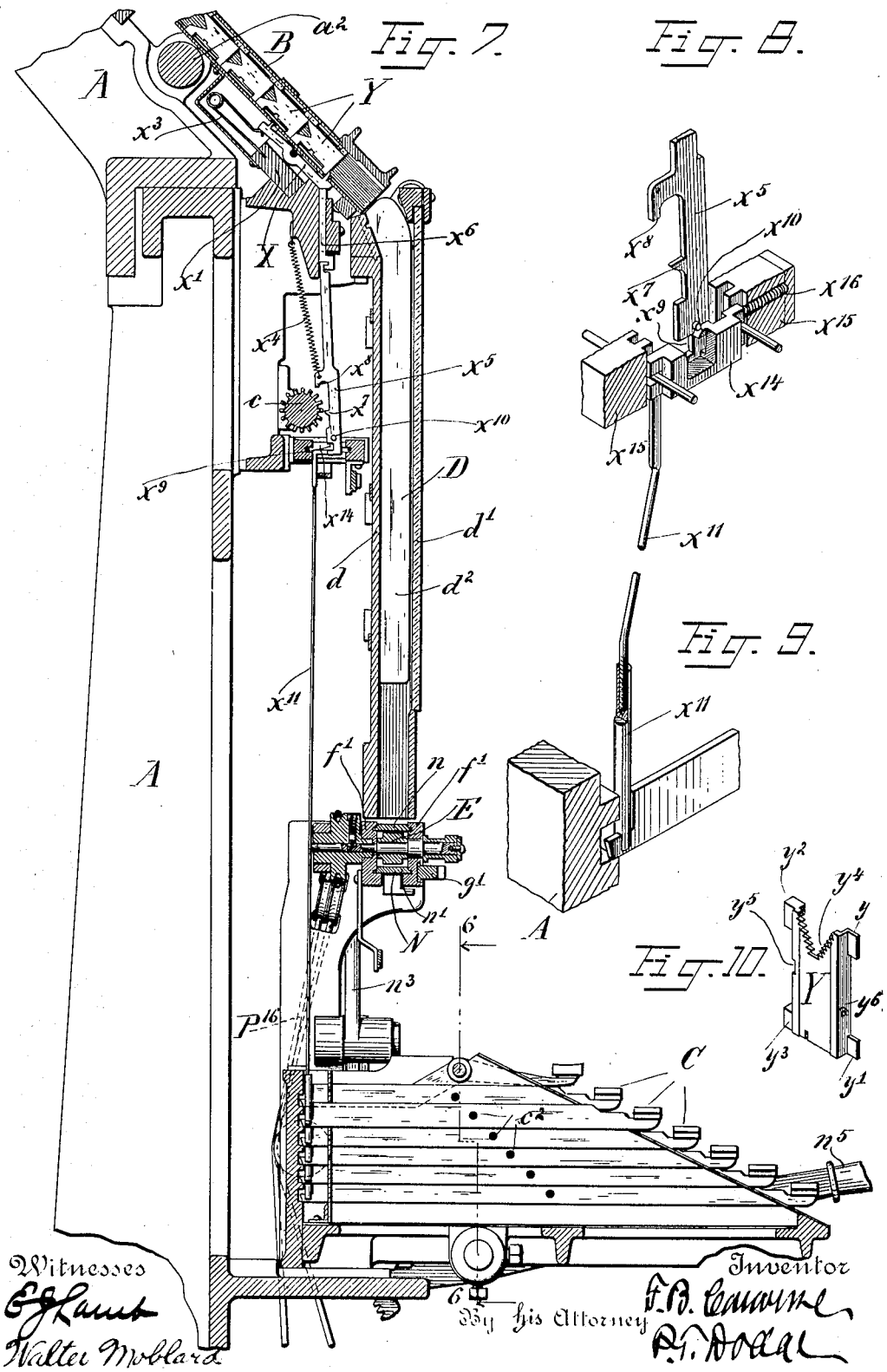

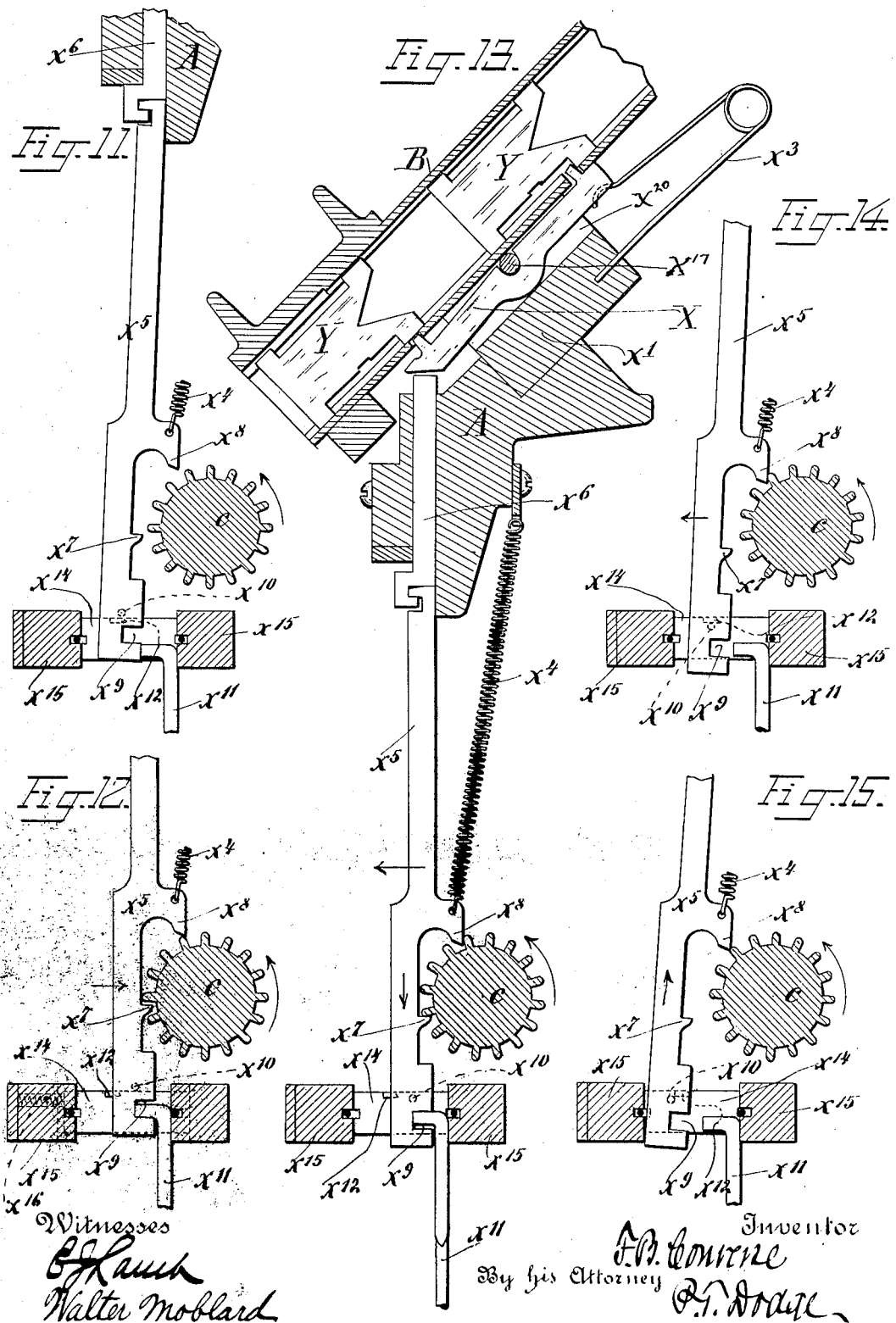

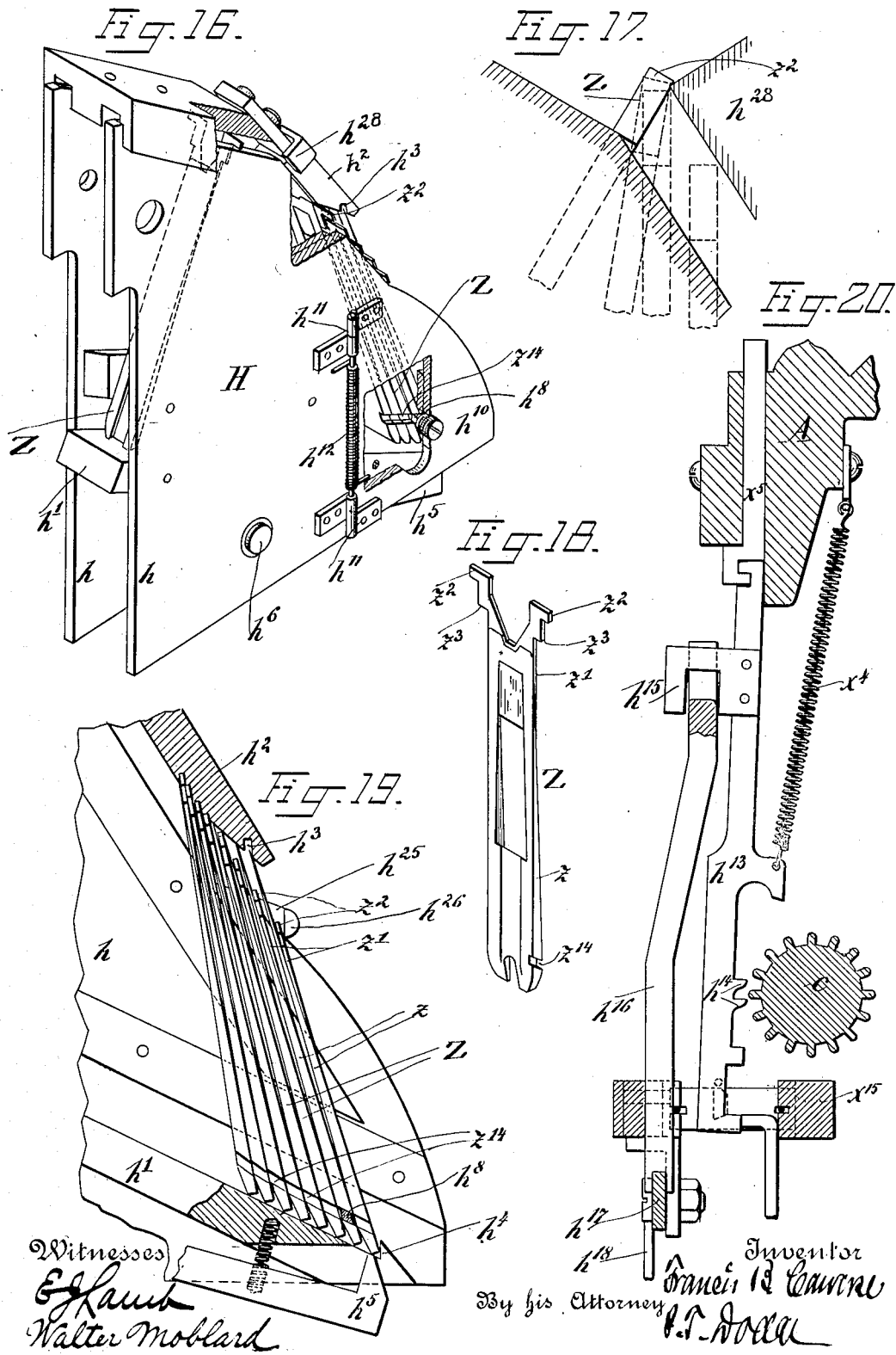

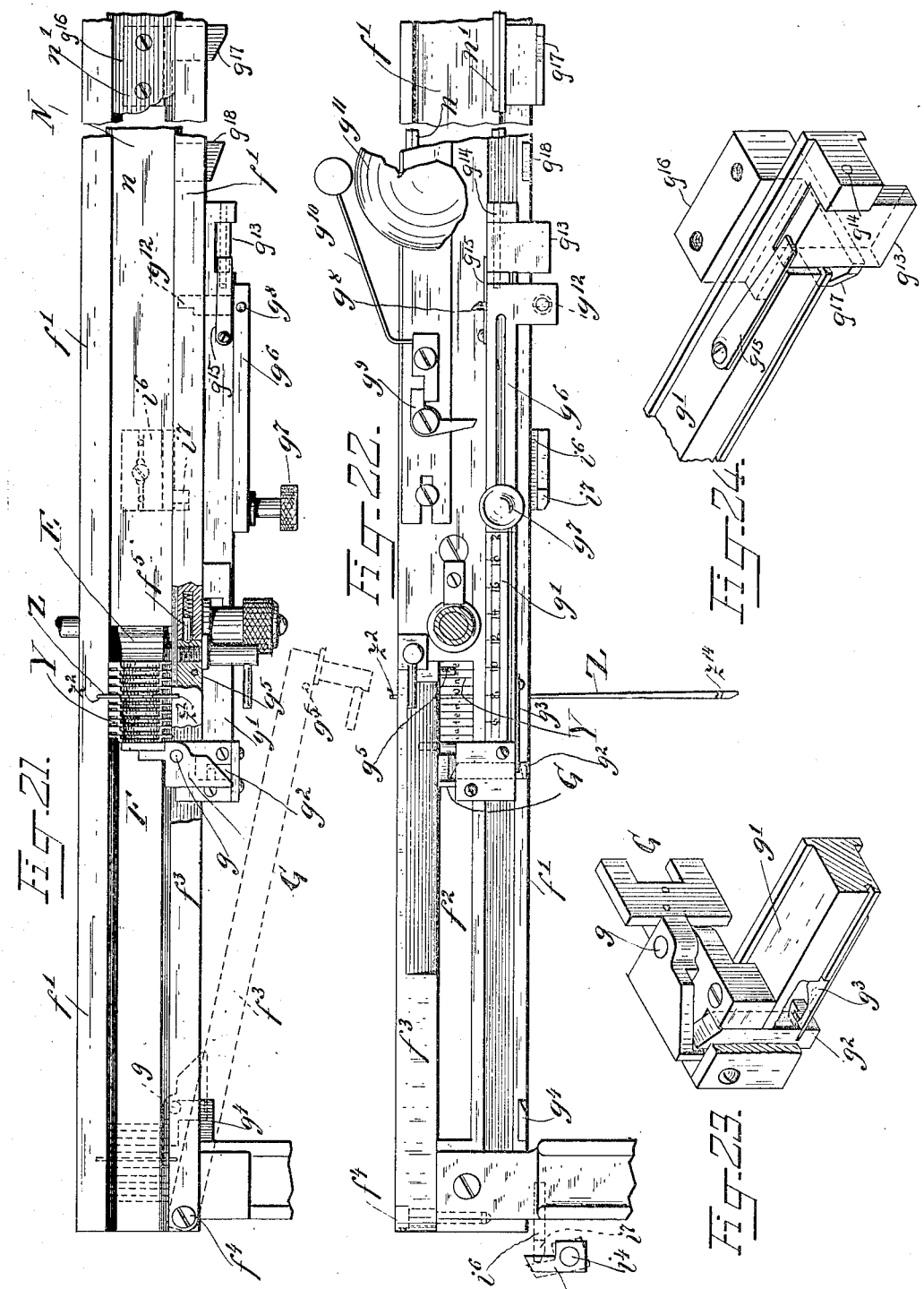

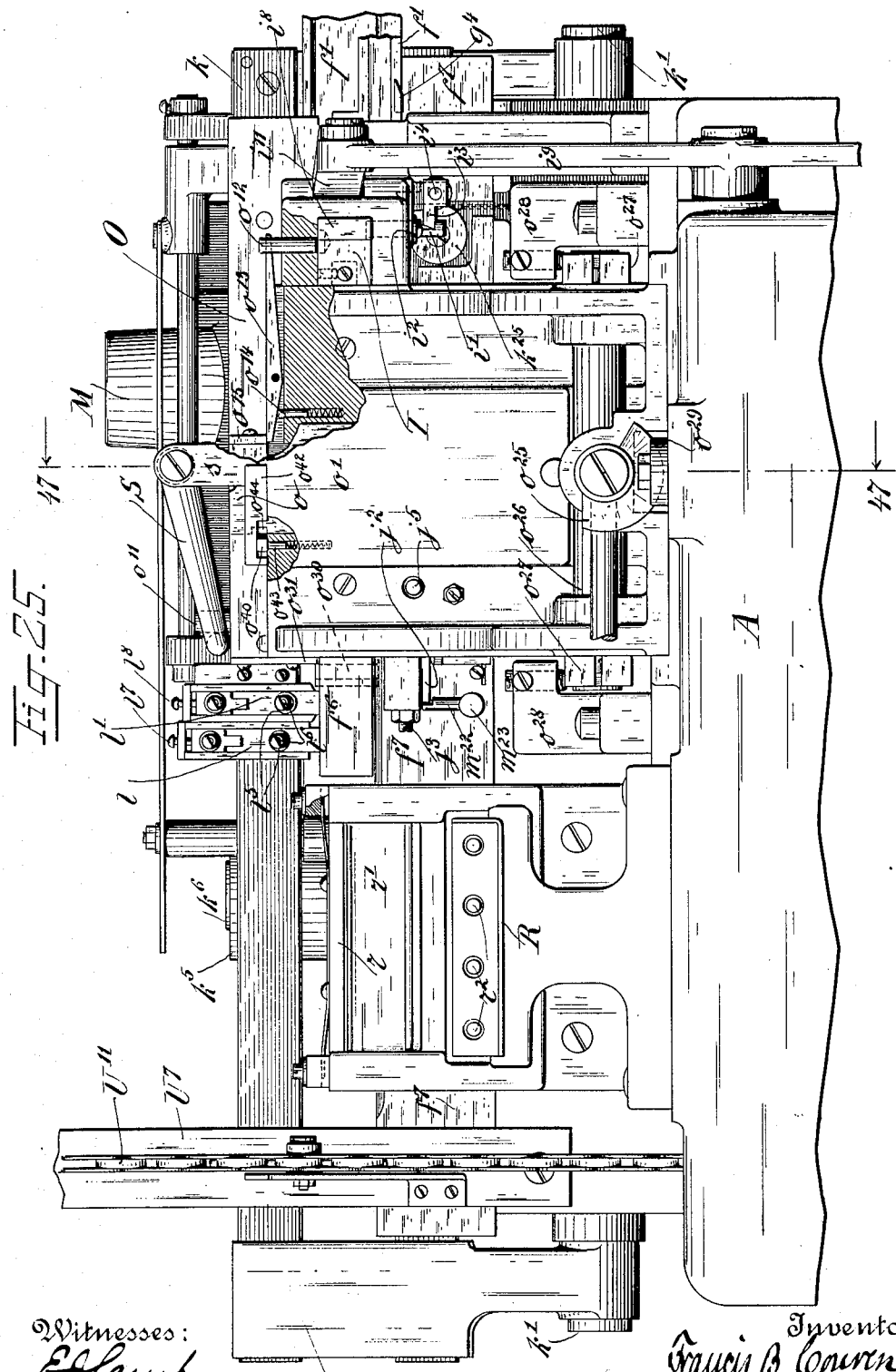

F. B. CONVERSE.
LINOTYPE MACHINE.
APPLICATION FILED NOV. 9, 1907.
925,754.
Patented June 22, 1909.
31 SHEETS—SHEET 12.
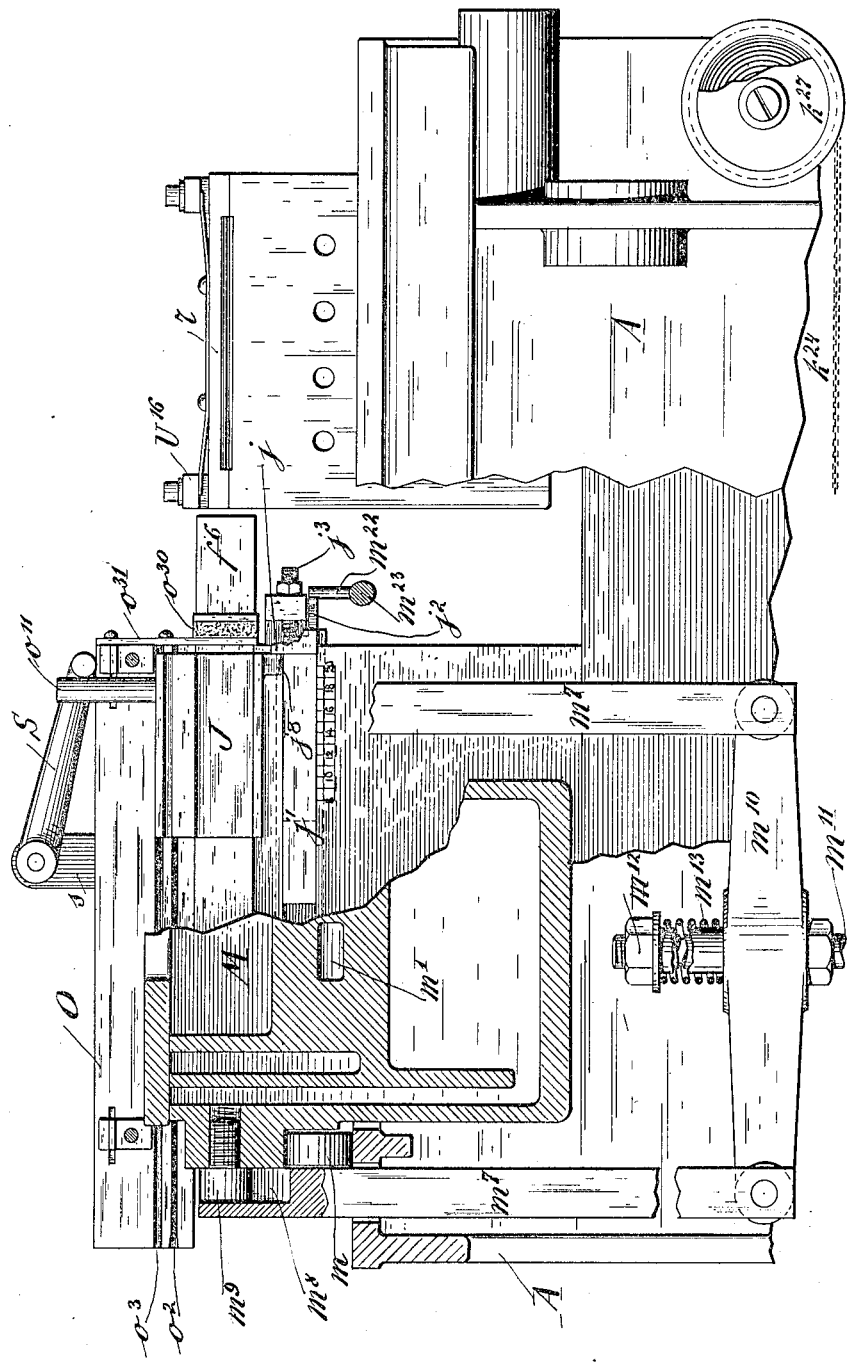

F. B. CONVERSE.
LINOTYPE MACHINE.
APPLICATION FILED NOV. 9, 1907.

925,754.

Patented June 22, 1909.
31 SHEETS—SHEET 13.

Witnesses:

Inventor
Francis B. Converse
By his Attorney

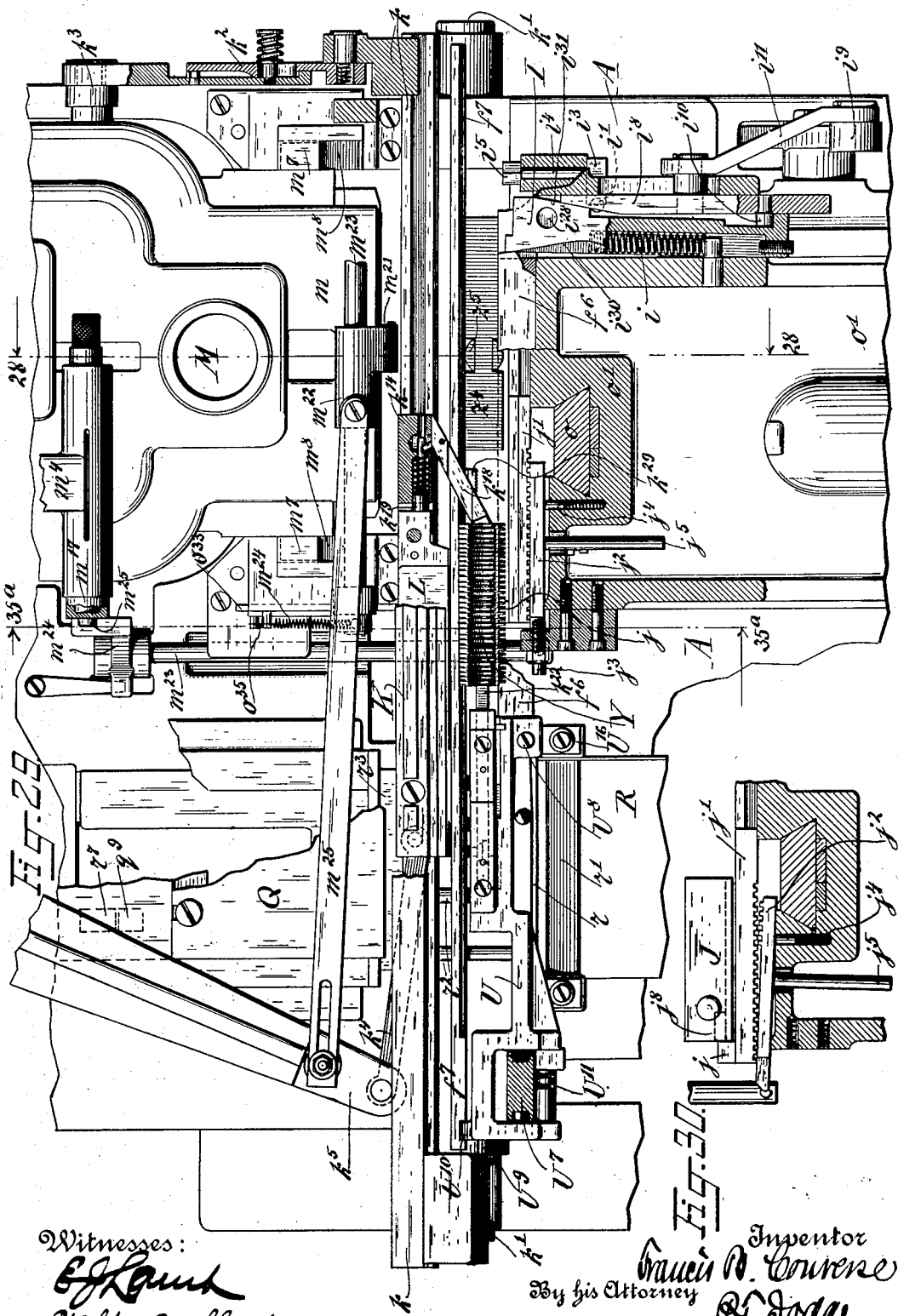

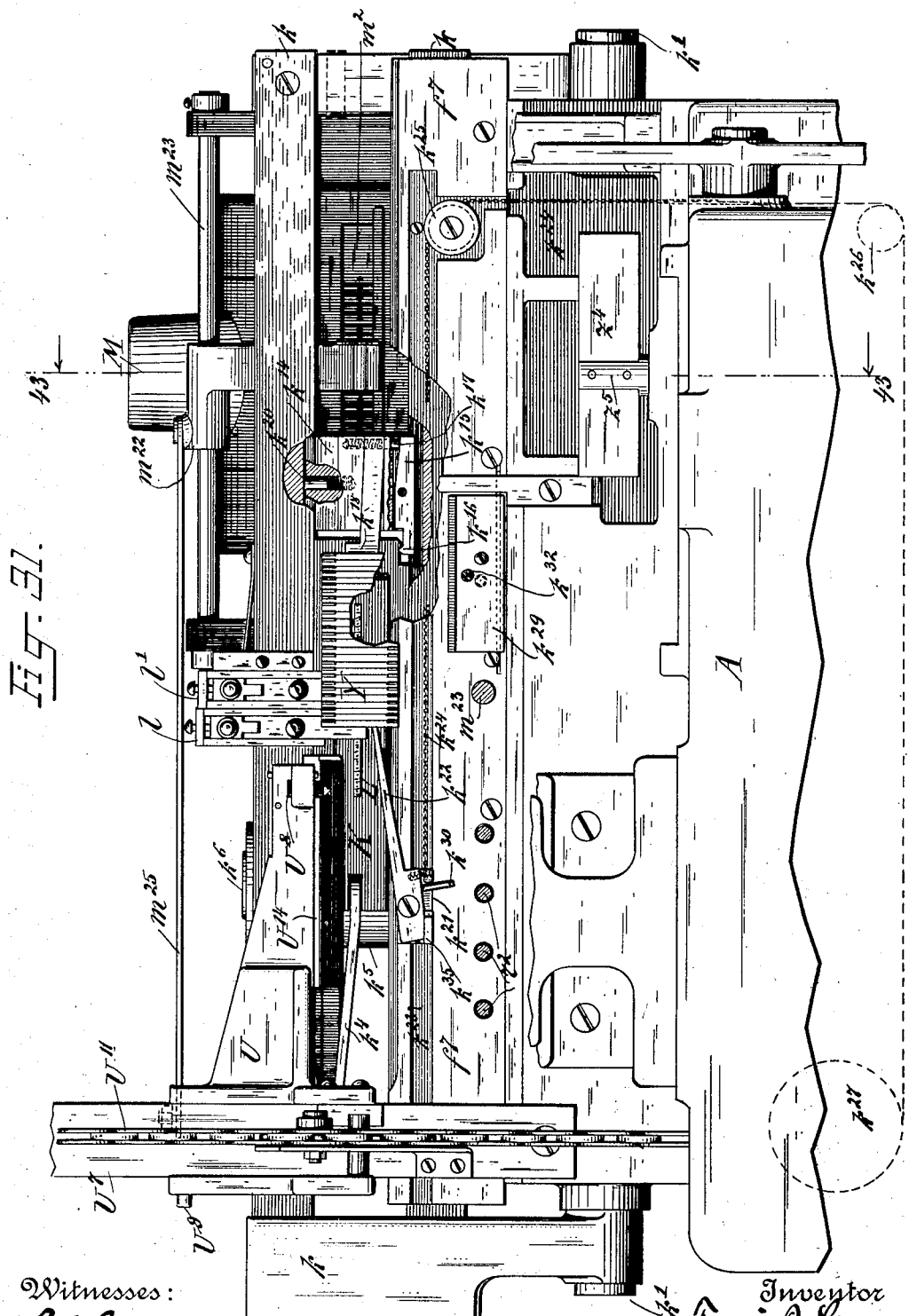

F. B. CONVERSE.
LINOTYPE MACHINE.
APPLICATION FILED NOV. 9, 1907.
925,754.
Patented June 22, 1909.
31 SHEETS—SHEET 16.
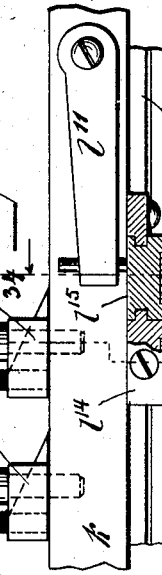
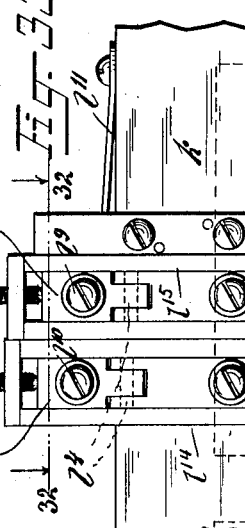
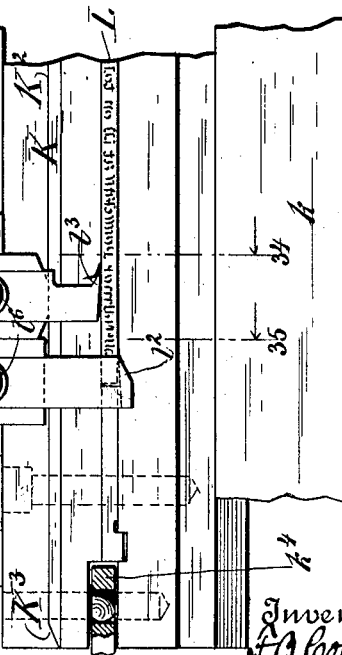
Witnesses:
Inventor
F. B. Converse
By his Attorney F. B. CONVERSE.
LINOTYPE MACHINE.
APPLICATION FILED NOV. 9, 1907.
925,754.
Patented June 22, 1909.
31 SHEETS—SHEET 17.
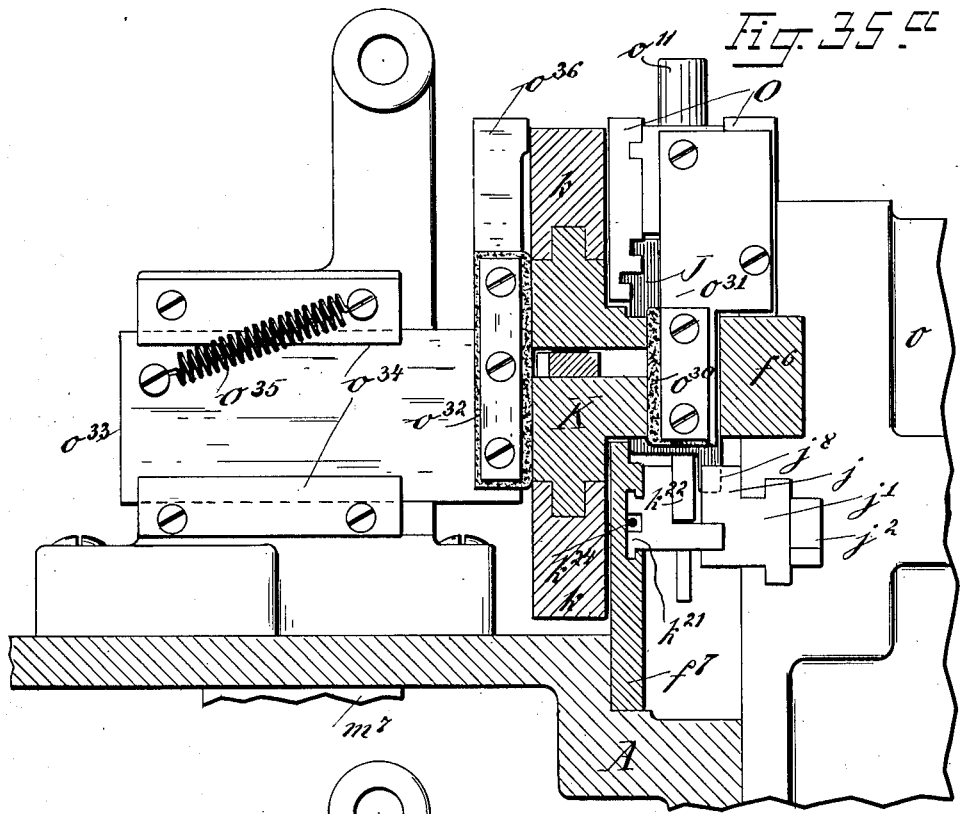
Fig. 35ᵃ
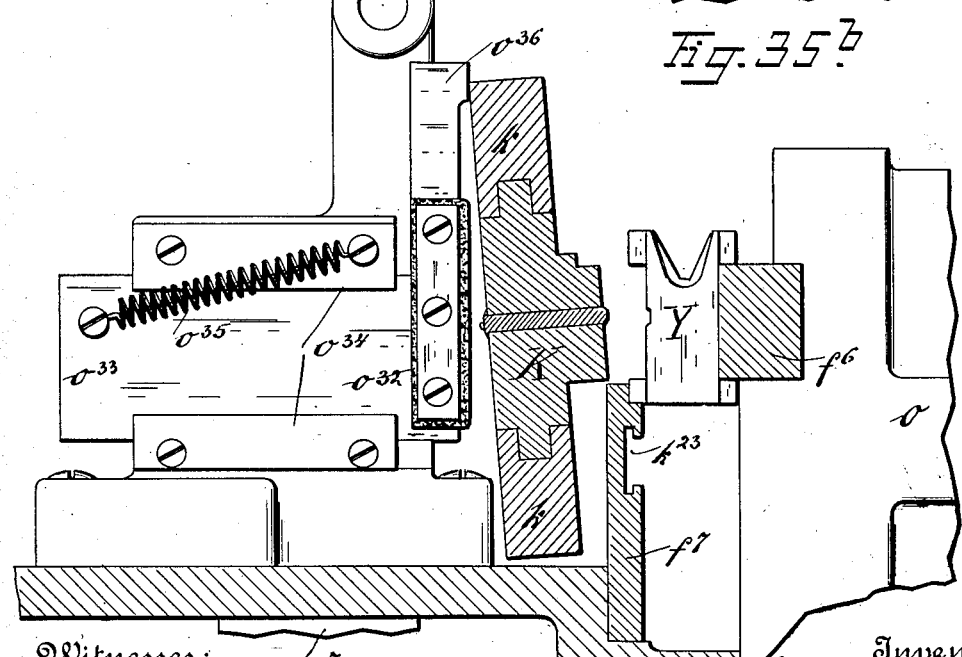
Fig. 35ᵇ
Witnesses:
Inventor
Francis B. Converse
By his Attorney

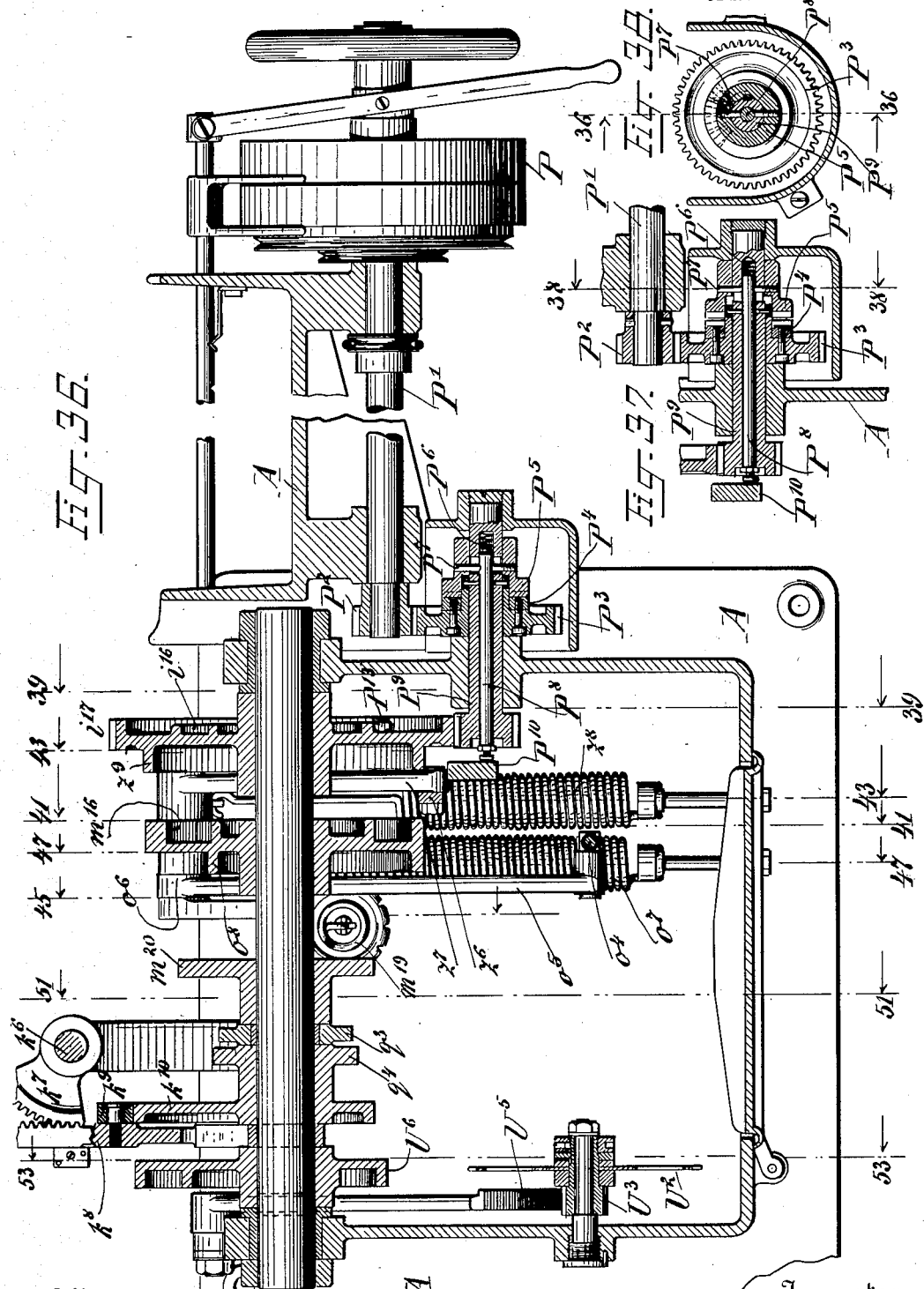

F. B. CONVERSE.
LINOTYPE MACHINE.
APPLICATION FILED NOV. 9, 1907.
925,754.
Patented June 22, 1909.
31 SHEETS—SHEET 19.
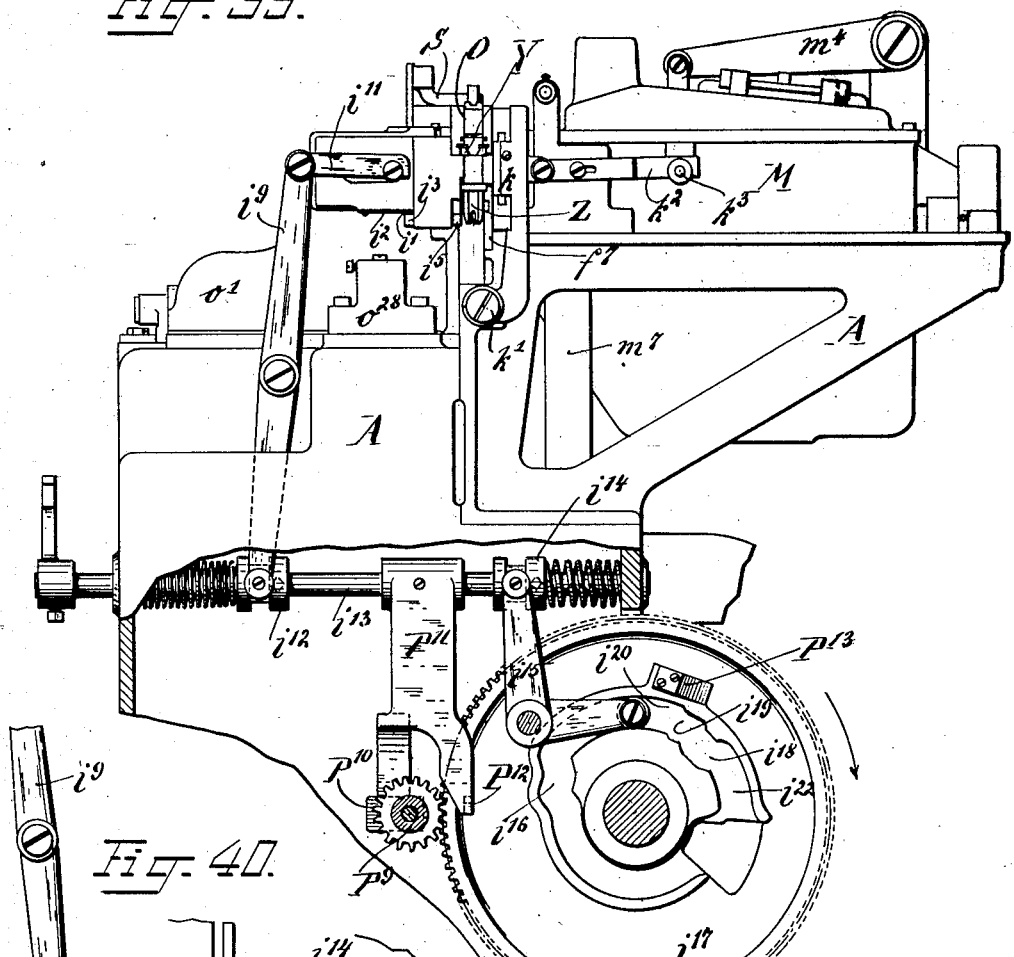
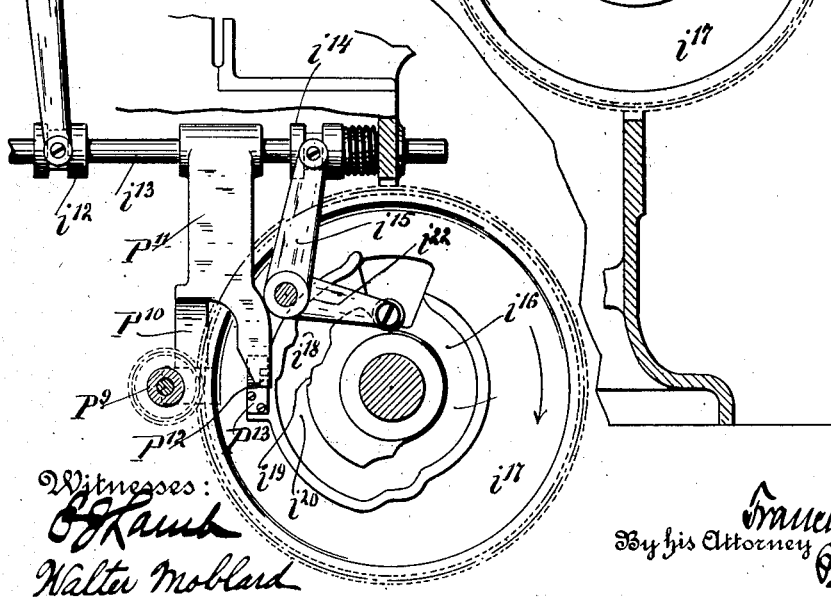

F. B. CONVERSE.
LINOTYPE MACHINE.
APPLICATION FILED NOV. 9, 1907.
925,754.
Patented June 22, 1909.
31 SHEETS—SHEET 20.
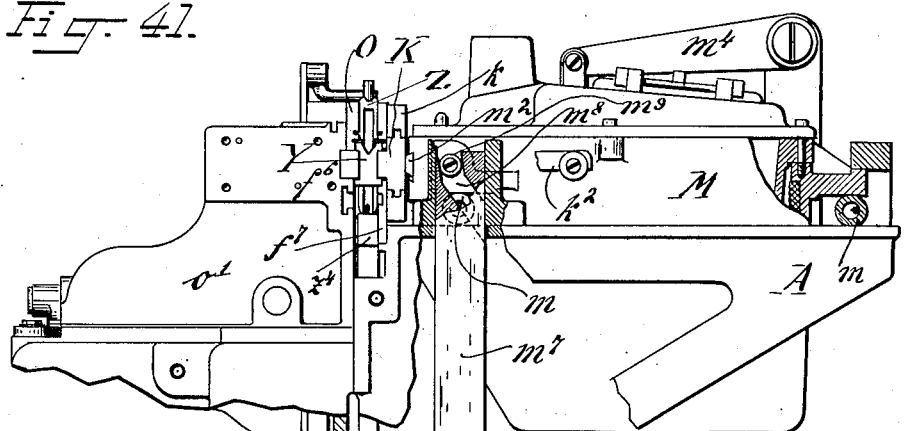
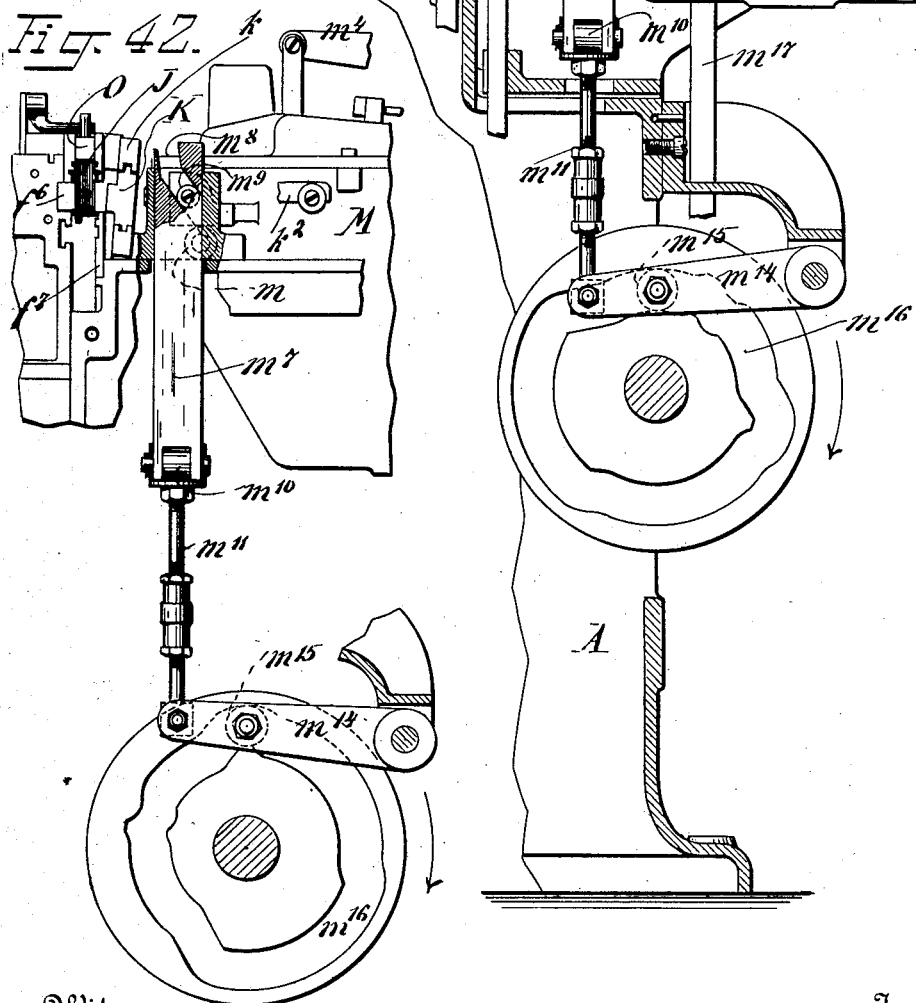

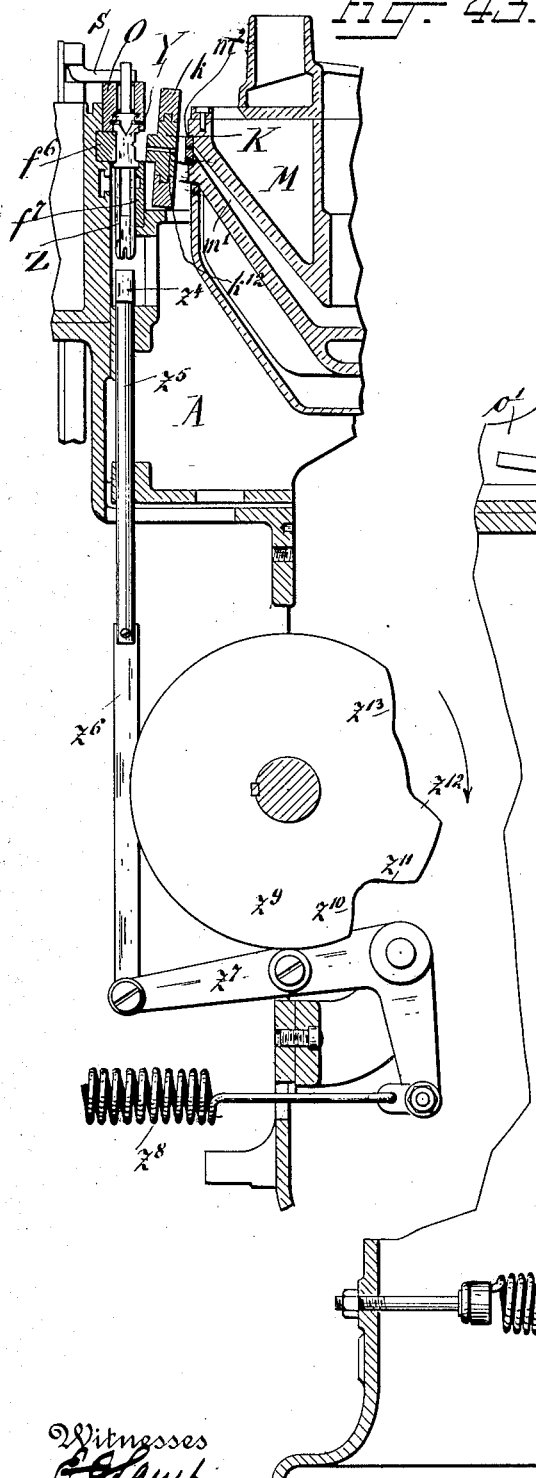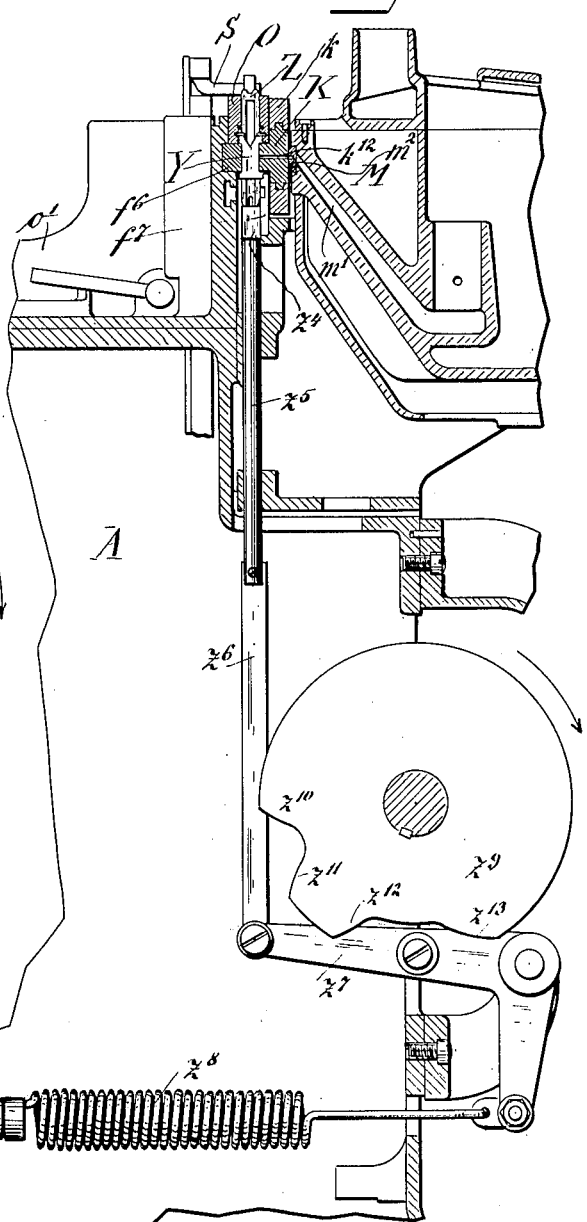

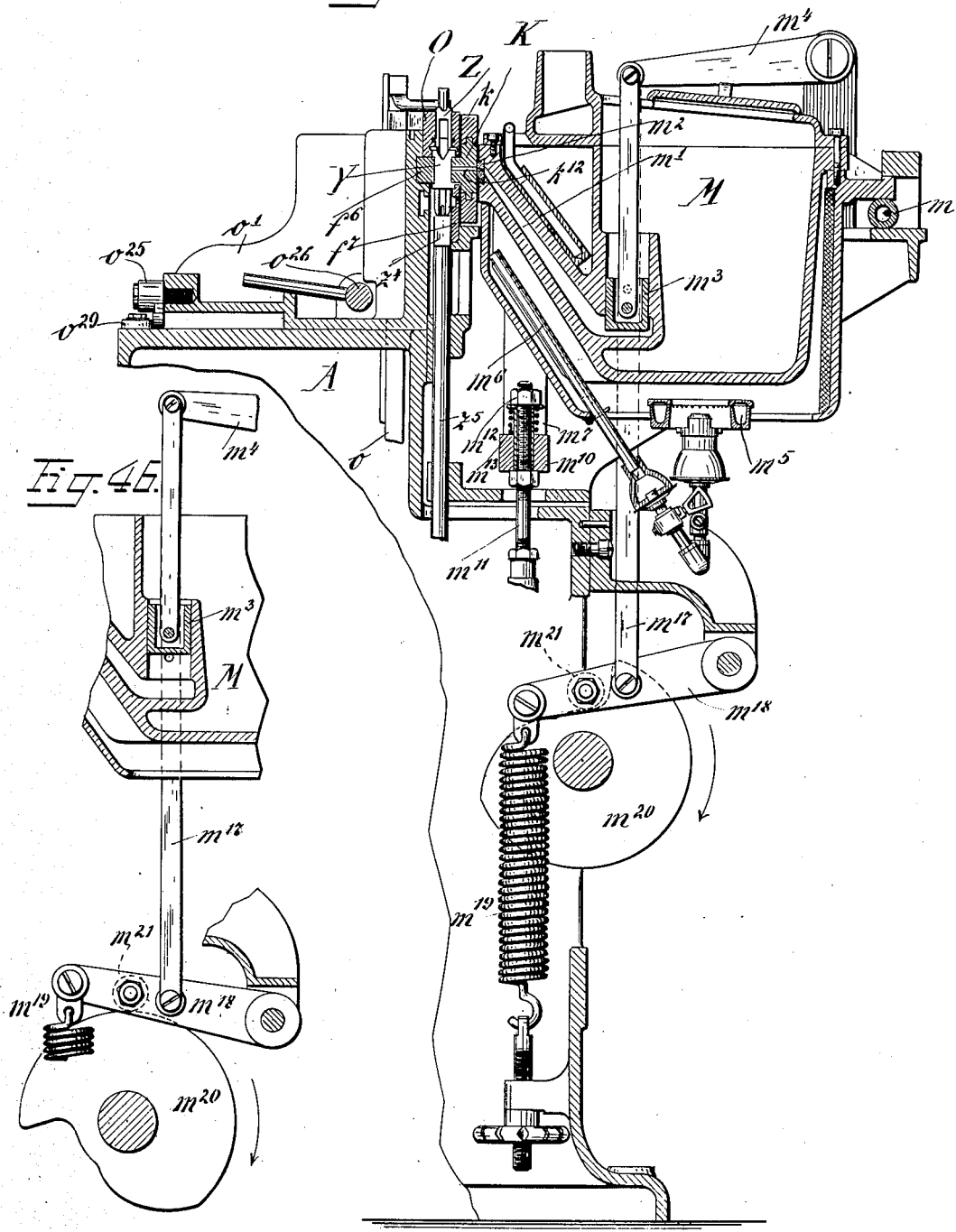

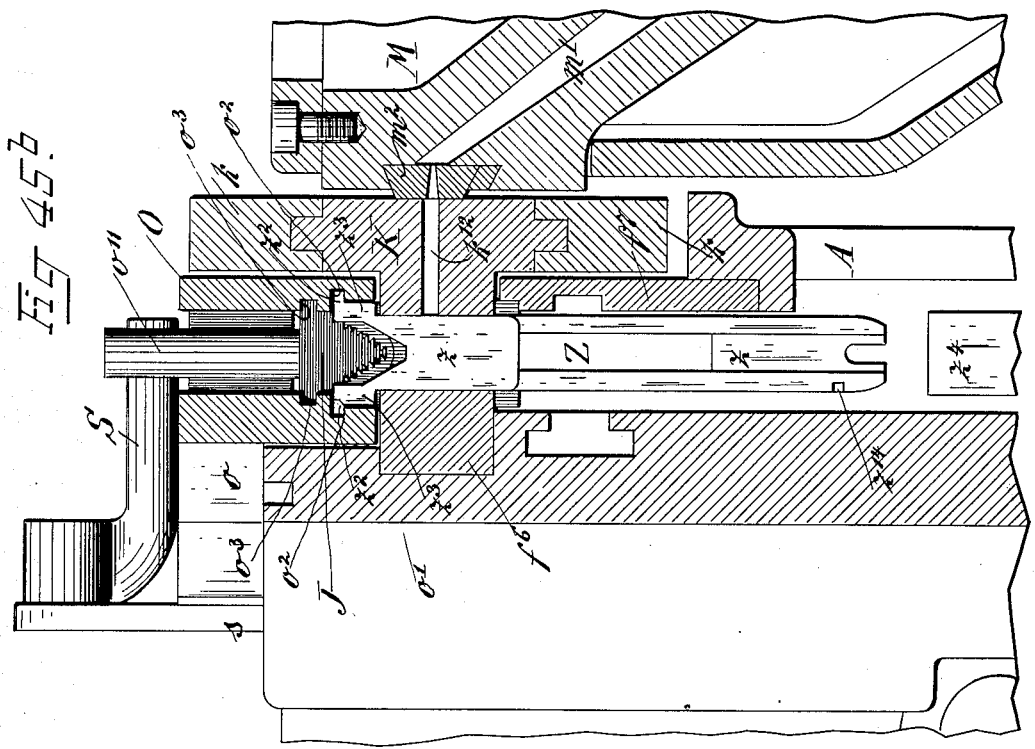
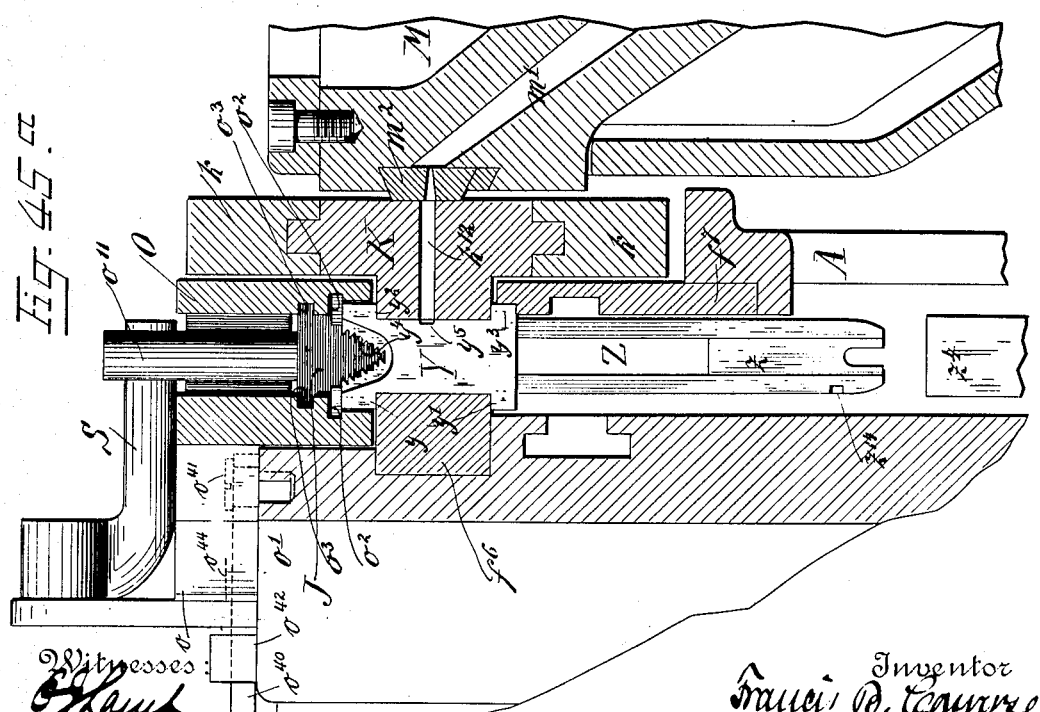

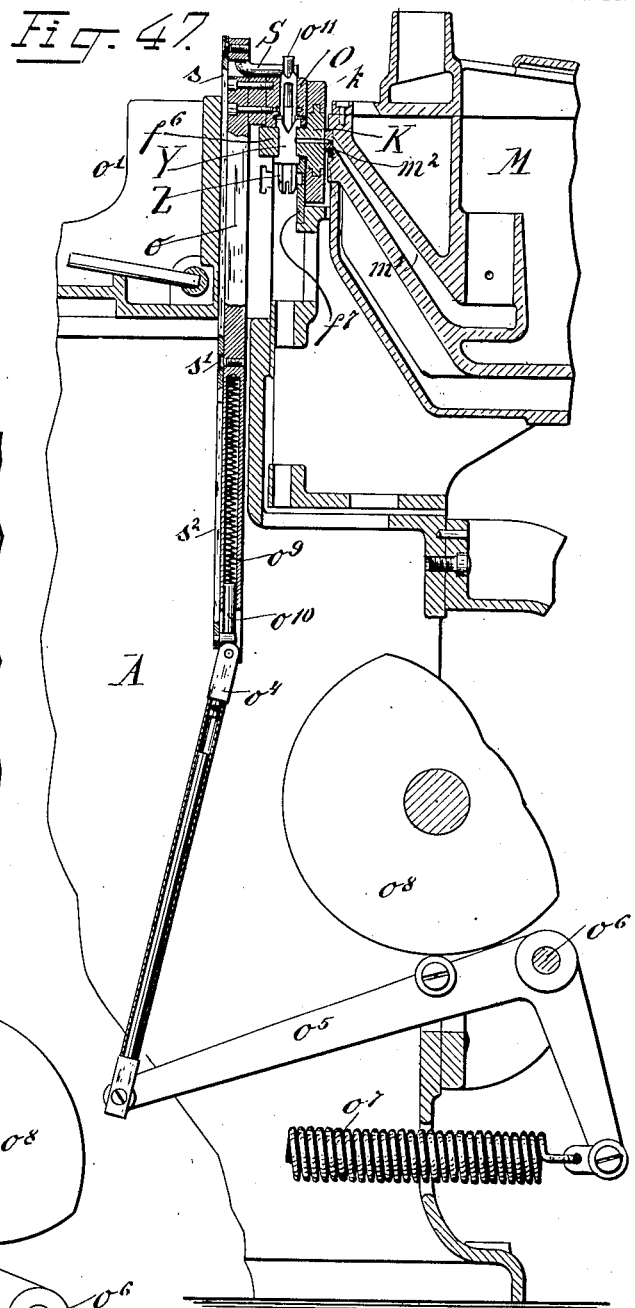

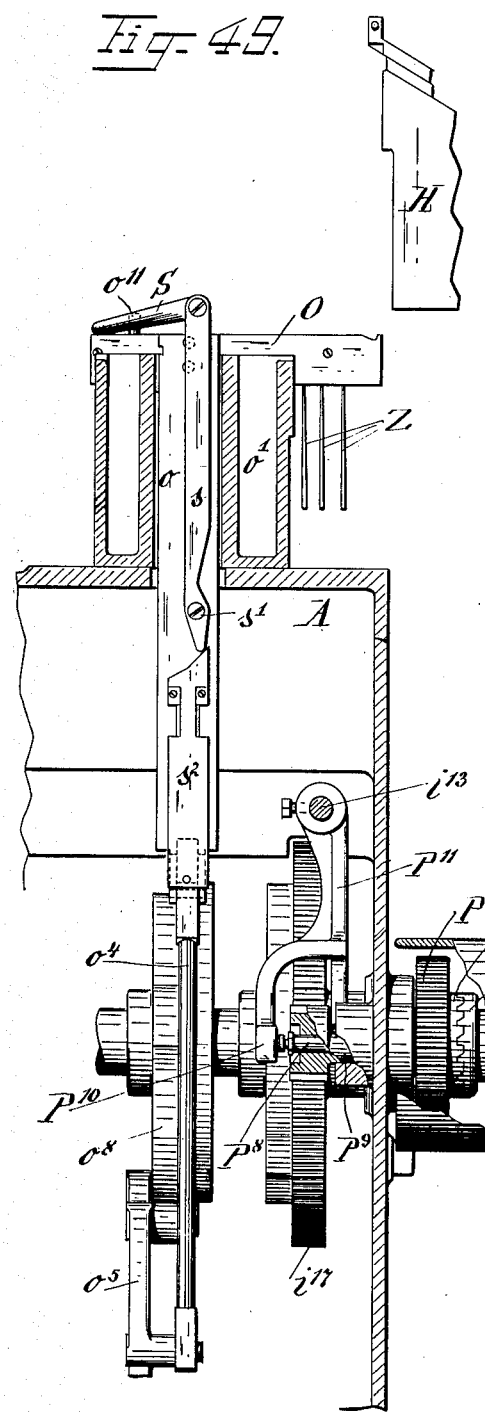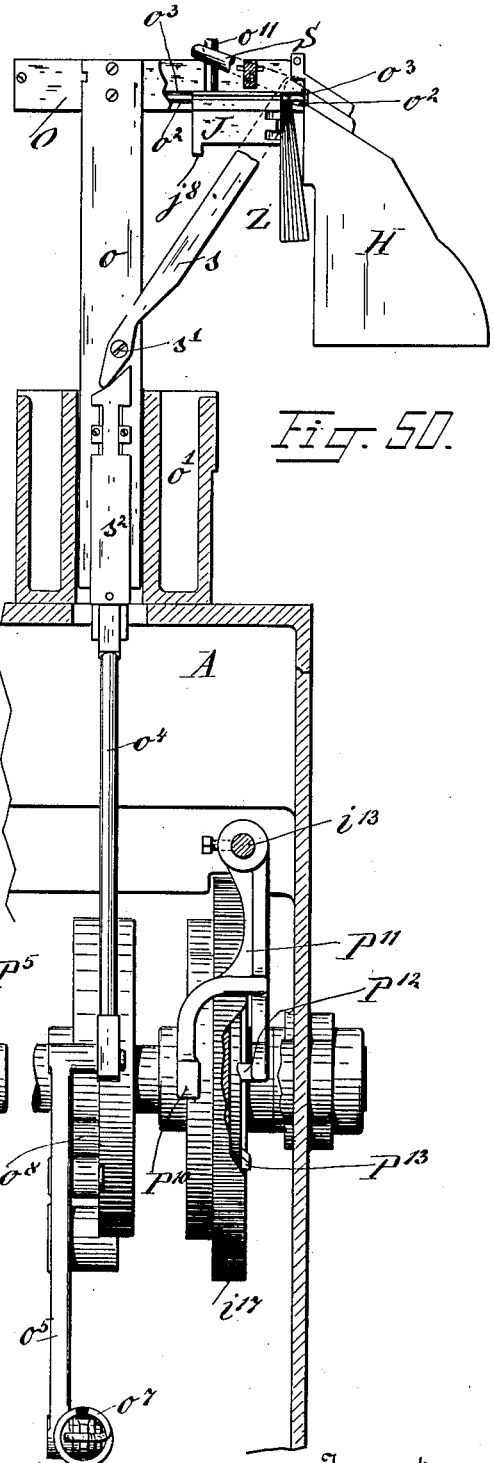

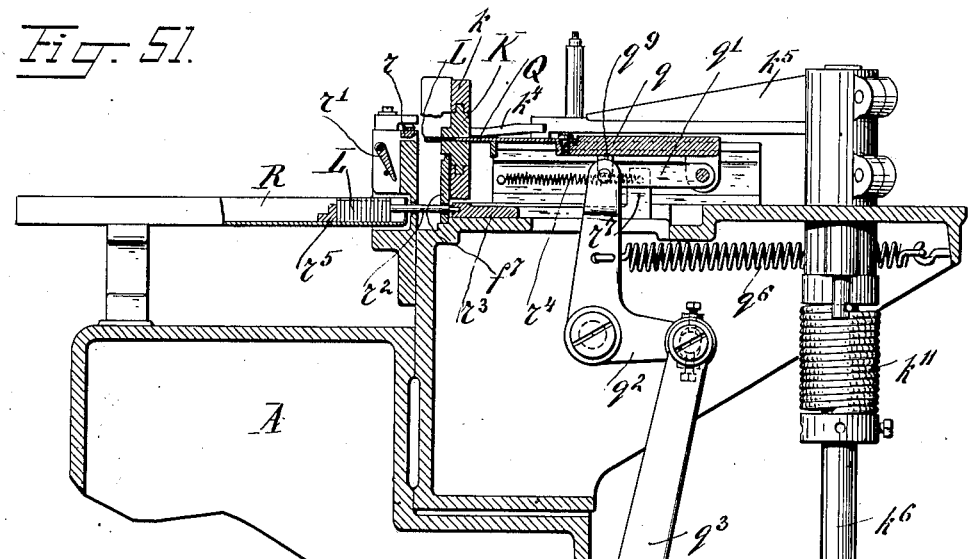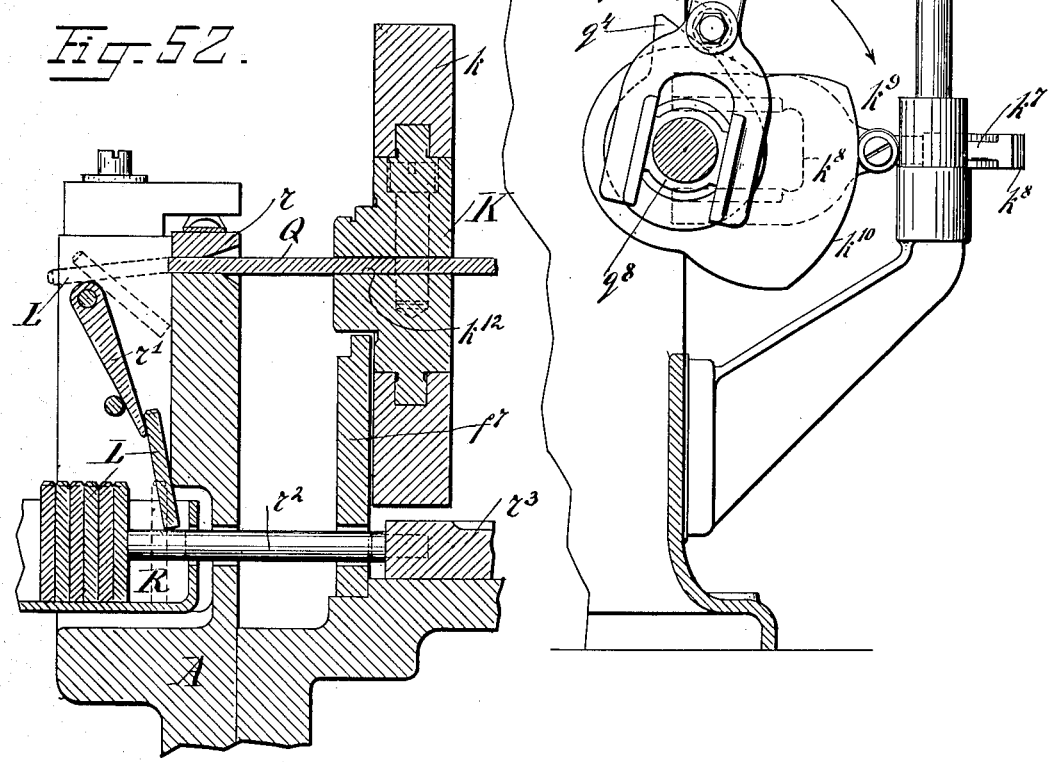

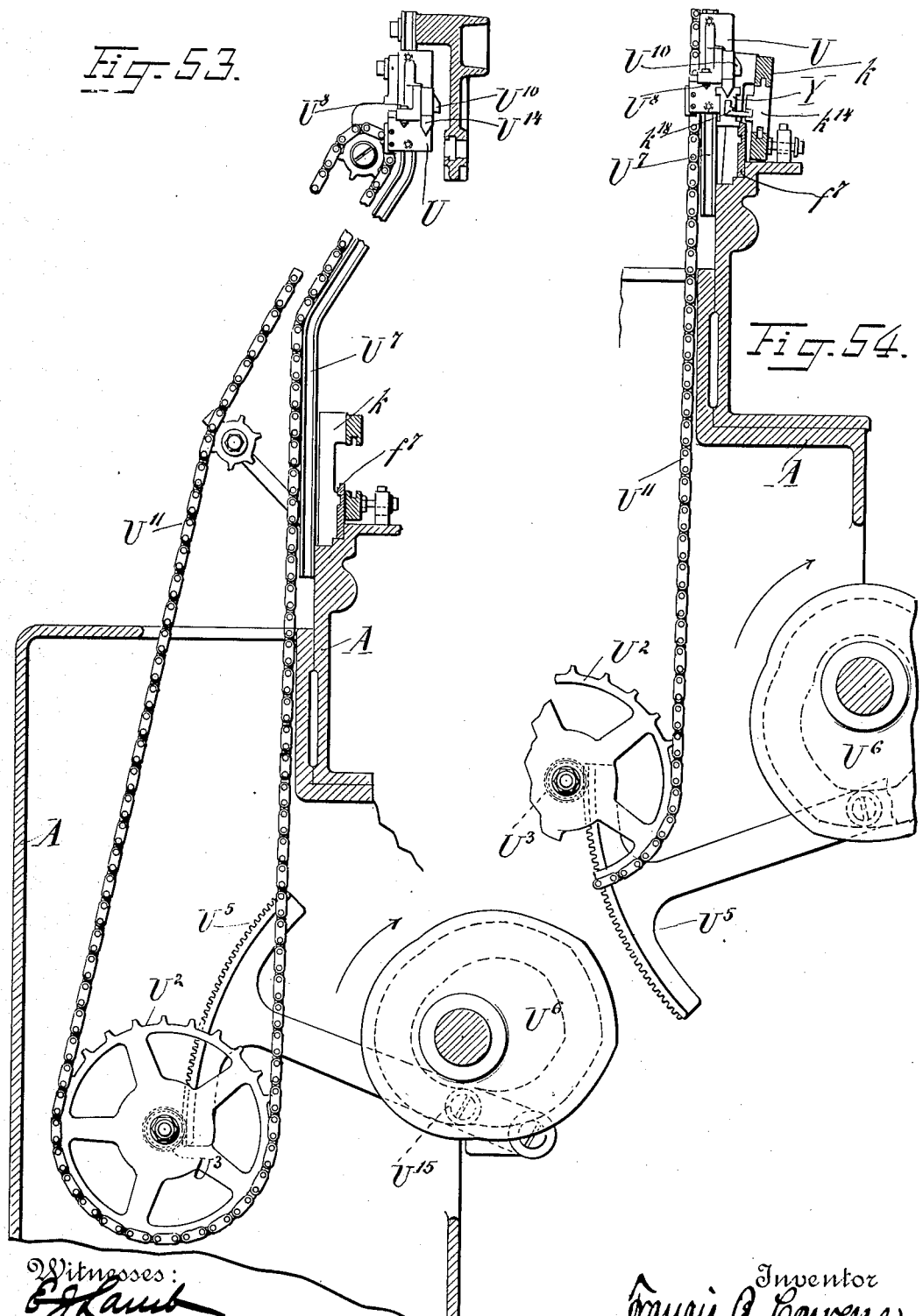

F. B. CONVERSE.
LINOTYPE MACHINE.
APPLICATION FILED NOV. 9, 1907.
925,754.
Patented June 22, 1909.
31 SHEETS—SHEET 28.
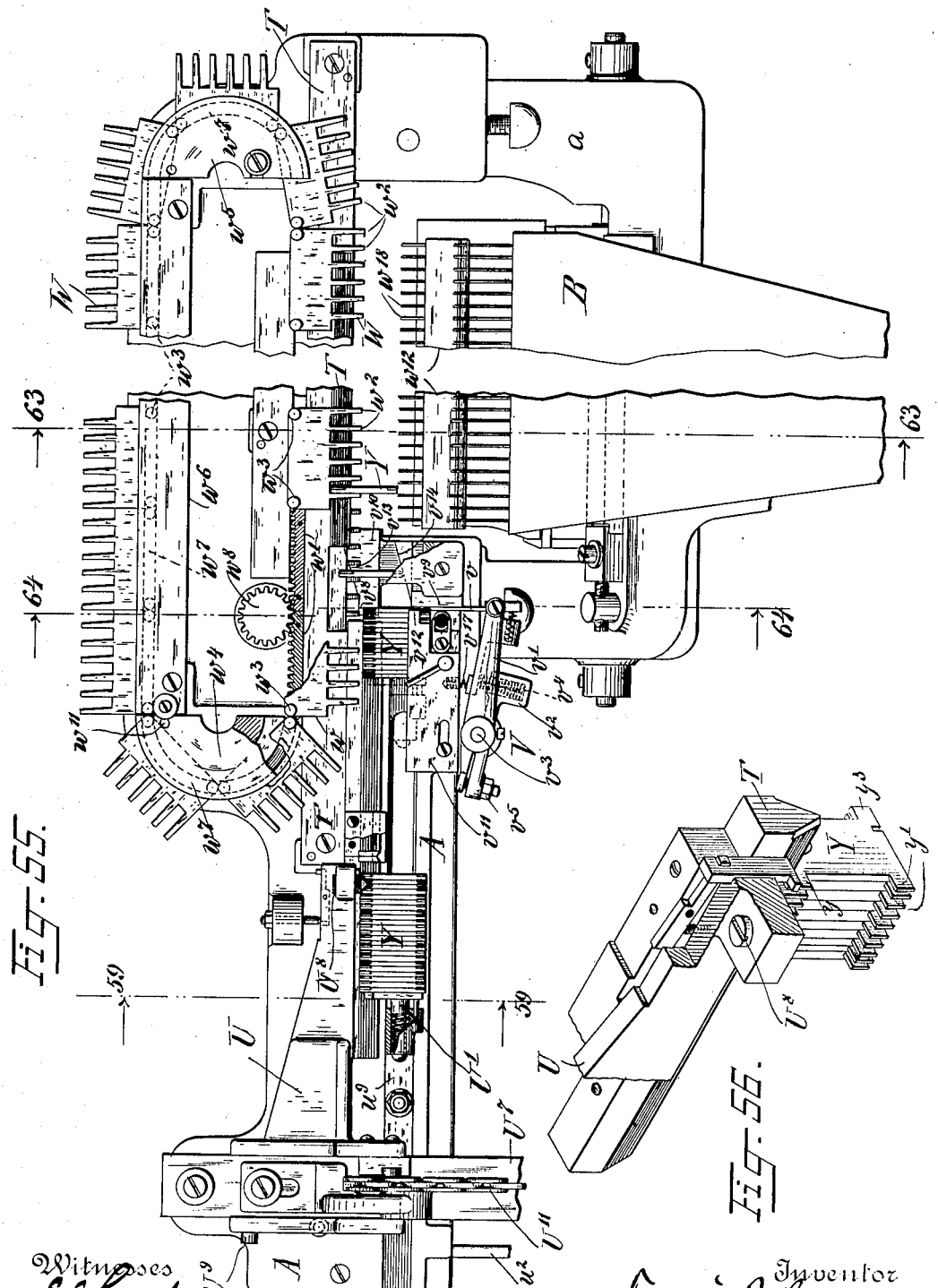

F. B. CONVERSE.
LINOTYPE MACHINE.
APPLICATION FILED NOV. 9, 1907.
925,754.
Patented June 22, 1909.
31 SHEETS—SHEET 29.
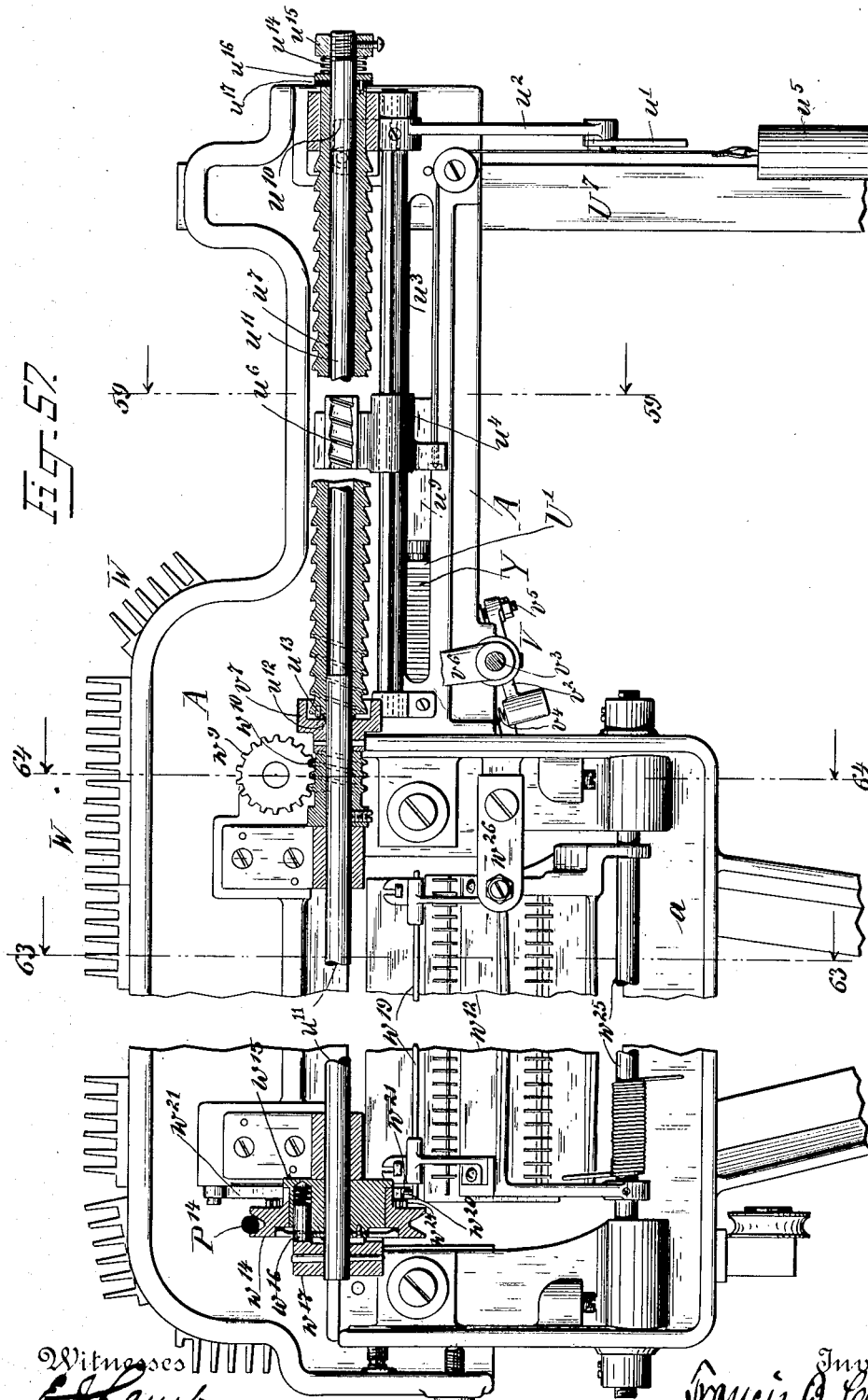

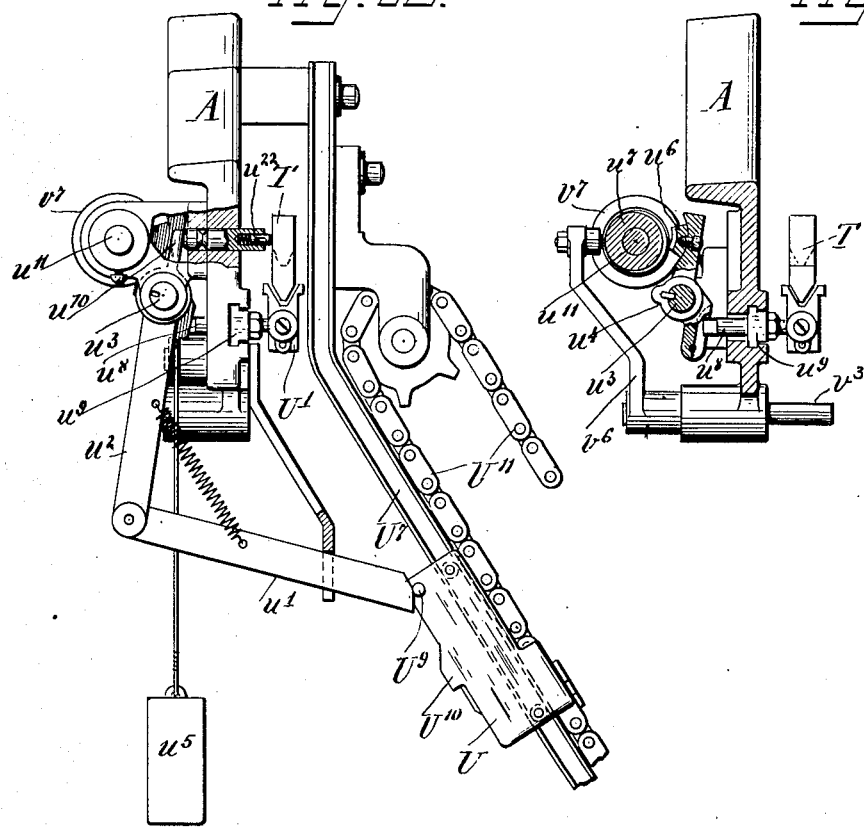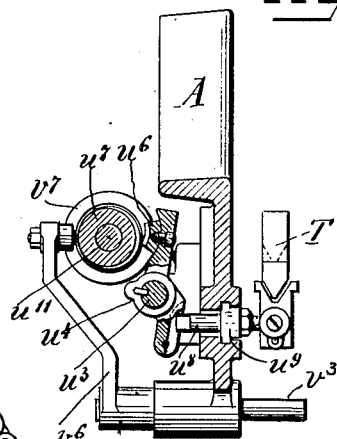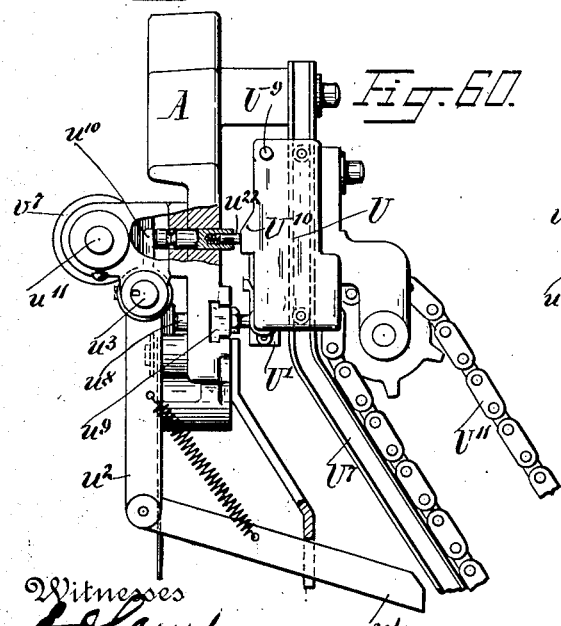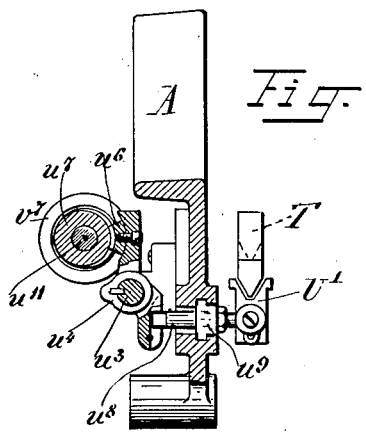

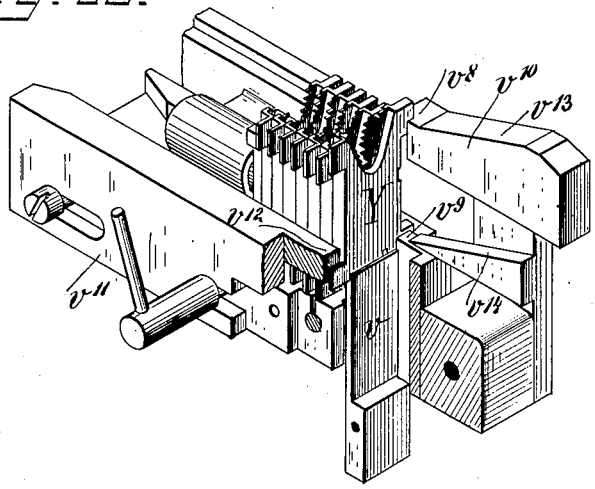
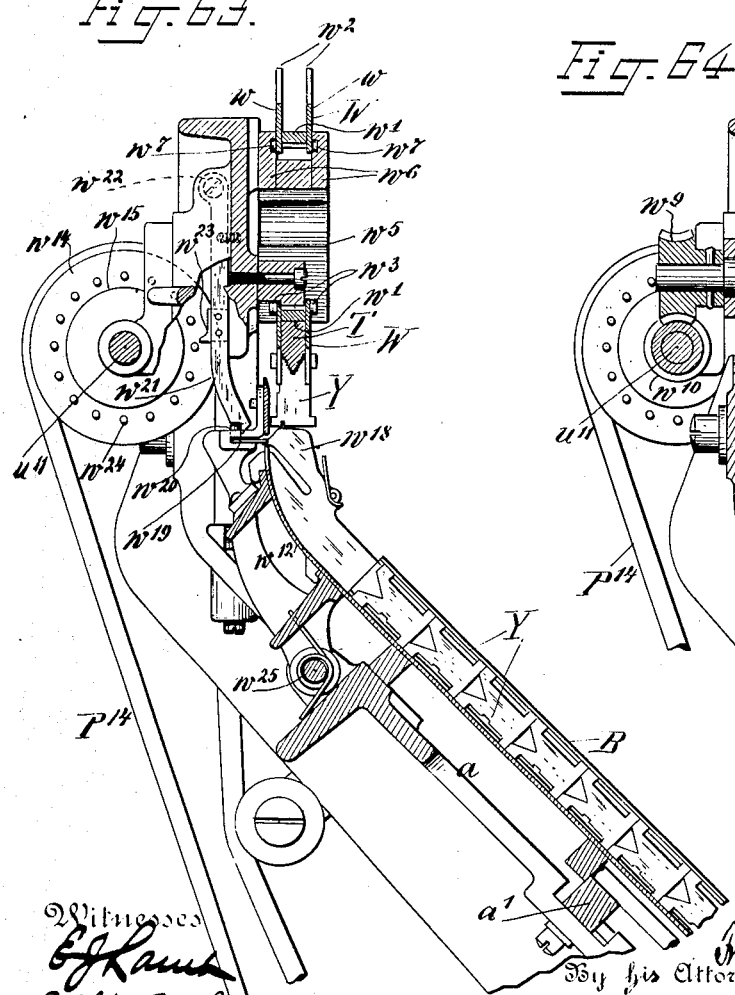
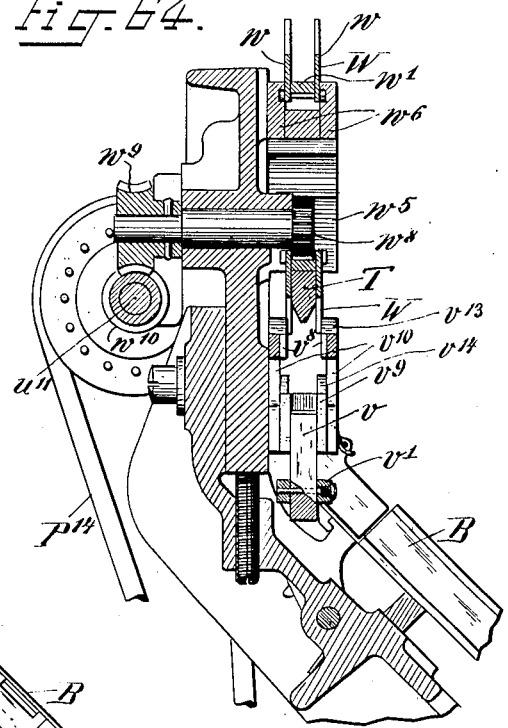

UNITED STATES PATENT OFFICE.

FRANCIS B. CONVERSE, OF NEW HAVEN, CONNECTICUT, ASSIGNOR TO MERGENTHALER LINOTYPE COMPANY, A CORPORATION OF NEW YORK.

LINOTYPE-MACHINE.

No. 925,754.　　　　Specification of Letters Patent.　　　Patented June 22, 1909.

Application filed November 9, 1907. Serial No. 401,412.

*To all whom it may concern:*

Be it known that I, FRANCIS B. CONVERSE, of the city of New Haven, county of New Haven, and State of Connecticut, have invented a new and useful Improvement in Linotype-Machines, of which the following is a specification.

Purpose of Machine.

This machine, driven by power and controlled by finger-keys, is designed to produce printing forms composed of slugs or linotypes, each bearing on one edge, properly spaced and justified, the characters to print a line.

General Action of Machine.

The machine is provided with a keyboard comprising a series of finger-keys which represent the various characters, ordinary spaces, and expansible spacers or justifiers. The manipulation of the keys by the operator results in the release of individual matrices, spaces and spacers, and in their assemblage in line in the required order, the line being subsequently transferred to the face of a slotted mold and there justified, after which the mold is filled with molten metal delivered from the melting pot. Following this action, the matrices and spacers are returned through a distributing mechanism, to the magazines from which they were released, while the slug is delivered from the mold to the receiving galley, and so on repeatedly.

In the drawings,—Figure 1 is a front elevation of the entire machine. Fig. 2 is a rear elevation of the same. Fig. 3 is a side elevation looking from the right. Fig. 4 is a side elevation looking from the left. Fig. 5 is a horizontal section on the line 5—5 of Figs. 1, 2, 3, 4, &c. Fig. 5ª is a section on the same line as the preceding figure, illustrating certain parts in a different position. Fig. 6 is a front elevation on a larger scale, of the assembling mechanism and adjacent parts, portions at the front being broken away to expose interior parts. Fig. 7 is a vertical section on the line 7—7, Figs. 1 and 6. Figs. 8 and 9 are perspective views partly in section, showing a portion of one of the keyboard connections for actuating the escapements to release the matrices. Fig. 10 is a perspective view of one of the matrices. Figs. 11, 12, 13, 14 and 15 are vertical sections on the same plane as Fig. 7, with the driving roll of the keyboard and the adjacent parts in different operative positions. Fig. 16 is a perspective view of the justifier magazine, portions being broken away. Fig. 17 is a diagram illustrating the manner in which the justifiers are guided in entering their magazine. Fig. 18 is a perspective view of one of the wedge justifiers or spacers. Fig. 19 is a vertical section from right to left through the magazine shown in Fig. 16. Fig. 20 illustrates the keyboard connections for actuating the justifier releasing devices. Fig. 21 is a top plan view of a portion of the assembling channel with a partly composed line therein. Fig. 22 is a front elevation of the same. Fig. 23 is a perspective view of the yielding resistant against which the matrix line is composed, the resisting finger being in operative position. Fig. 24 is a view of the means for returning the resistant to its initial position. Fig. 25 is a front elevation on an enlarged scale, of the principal parts of the casting mechanism in the positions they occupy just before they receive the composed line. Fig. 26 is a rear elevation, partly in section, on the line 26—26, Fig. 5, showing more particularly the left jaw for confining the matrix line. Fig. 27 is an elevation of the casting mechanism viewed from the right side, with portions broken away, this view corresponding in its principal parts to Figs. 25 and 26. Fig. 28 is a vertical section through the casting mechanism from front to rear, on the line 28—28 of Fig. 29, the parts being in the position they occupy after the casting action, and while the matrix line is being removed to the elevator. Fig. 29 is a top plan view of the casting mechanism and adjacent parts, portions being shown in horizontal section on the line 29—29 of Fig. 28, and the central portion of the bar $f^6$ being broken away to show parts below. Fig. 30 is a horizontal section illustrating a detail of the mechanism for changing the measure or length of line. Fig. 31 is a front elevation of the casting mechanism corresponding to Figs. 28 and 29, showing the matrix line and the mold with the contained slug in the course of transfer from the casting position. Fig. 32 is a plan view of the knives for trimming the front edge of the slug, a portion being broken away, on the line 32—32 of Fig. 33. Fig. 33 is a front elevation of the same. Fig. 34 is a vertical section from front to rear on the line 34—34 of Figs. 32 and 33, showing more particularly the upper trimming knife and its relation to the mold and the contained slug. Fig. 35 is a similar view on the line 35—35 of Figs. 32 and 33, showing more particularly the lower trimming knife and its relation to the mold and slug. Figs. 35ᵃ and 35ᵇ are vertical sections taken from the left on line 35ᵃ of Fig. 29, showing the mold wipers. Fig. 36 is a horizontal section on the line 36—36 of Figs. 1, 2, 3, 4, &c., showing the main shafts, their cams, the main driving clutch, &c.,—the clutch being engaged. Fig. 37 is a similar view through the clutch mechanism and adjacent parts, the clutch being disengaged. Fig. 38 is a vertical cross-section on the line 38—38 of the preceding figure. Fig. 39 is an elevation of the principal parts of the casting mechanism in casting position, viewed from the right. Fig. 40 is an elevation of the driving parts shown in the preceding figure in their position of rest. Fig. 41 is an elevation looking from the right and showing more particularly the means for moving the metal pot to and from the casting position, portions being shown in section, with the various parts in the casting position. Fig. 42 is a similar view with the pot retracted from the mold and the mold retracted from the casting position,—being the position of rest of these parts. Fig. 43 is a vertical section from front to rear on the line 43—43 of Figs. 5, 31, 36, &c., showing more particularly the mechanism for operating the wedge justifiers, the parts being in their normal position of rest. Fig. 44 is a similar view of the parts in action, with the pot and mold in their casting positions. Fig. 45 is a vertical section from front to rear on the line 45—45 of Fig. 36, showing more particularly the details of the melting-pot, its plunger and the actuating devices therefor, the plunger being in its delivering or casting position. Figs. 45ᵃ and 45ᵇ are sections similar to Fig. 45, but on a larger scale, to show the manner in which the matrices and justifiers are respectively supported in the casting position. Fig. 46 is a similar view with the plunger in its normal or elevated position. Fig. 47 is a vertical section from front to rear on the line 47—47 of Figs. 25 and 36, showing more especially the details of the mechanism for lifting the justifiers from the line at the casting position, and for delivering them to their magazine,—the parts being in the casting position. Fig. 48 is a similar view, with the justifiers lifted to the level of their magazine. Fig. 49 is a front elevation of the parts shown in the two preceding figures, with the justifier elevator at the casting level. Fig. 50 is a similar view, showing the justifier elevator in its upper position and the justifiers in course of delivery to their magazine. Fig. 51 is a vertical section from front to rear on the line 51—51 of Figs. 5 and 36, showing more particularly the mechanism for ejecting the slugs, and the galley to which they are delivered. Fig. 52 is a similar view on an enlarged scale, with the parts in a different position. Fig. 53 is a vertical section on the line 53—53 of Figs. 1 and 36, showing the mechanism for lifting the matrix line from the casting level to the distributing mechanism,—the elevator being in its uppermost position for delivering the line to the distributer. Fig. 54 is a similar view with the elevator in the lower position for receiving the line from the casting mechanism. Fig. 55 is a front elevation of the distributing mechanism, the middle portion being removed to reduce the size of the figure, and front portions being broken away to show the internal construction. Fig. 56 is a perspective view of the line elevator or carrier and its safety devices. Fig. 57 is a rear elevation of the parts shown in Fig. 55, with portions broken away. Fig. 58 is a left side elevation of a portion of the elevator and the parts for transferring the line to the distributer,—the elevator ascending with the line, and the pusher receding to admit the line. Fig. 59 is a vertical cross-section on the line 59—59 of Figs. 55 and 57, of details of the mechanism for advancing the matrix line into the distributer, the parts being out of action. Fig. 60 is a view similar to Fig. 58, with the elevator in the uppermost position and the line in course of delivery therefrom. Fig. 61 is a view similar to Fig. 59, with the line-transferring or pushing device in action. Fig. 62 is a perspective view of the matrix-lift and adjacent parts. Fig. 63 is a vertical section through the distributer and the upper end of the magazine on the line 63—63 of Figs. 1, 2, 55 and 57. Fig. 64 is a vertical cross-section through the distributer on the line 64—64 of Figs. 1, 2, 55 and 57.

*General Organization of the Machine.*

In order that the arrangement and action of the details may be more readily understood, I will first describe the general organization and action of the machine, referring particularly to Figs. 1 to 6. A represents the main-frame, and B the magazine containing the matrices, which are delivered one at a time from the magazine by means of the finger-keys C and intermediate devices which actuate escapements connected with the magazine. The matrices descend through converging channels in the face-plate D in front of a star-wheel E, and are assembled side by side in the horizontal assembling channel F against the yielding resistant G. The expanding spacers or justifiers are stored in their magazine H, and being released by one of the finger-keys, descend into line with the matrices. The composed line, consisting of the matrices Y and intermediate justifiers Z, is advanced horizontally in a straight line to the casting position in front of the mold K, where the justifiers are sustained independently of the matrices by their elevator O. The line is confined endwise by the two jaws I and J, and is justified in this position. The mold, at this time, is seated directly in front of the pot M, and the pot, mold and matrix line are closed together and the metal delivered through the perforated mouth of the pot into the mold against the matrices, thereby forming a slug. The parts then separate and the elevator O lifts the justifiers out of the line of matrices, after which the line is advanced in its original path to the left, thereby delivering the matrices to their elevator U. At the same time the mold is moved to the left, carrying the contained slug past the trimming knives to a position in front of the ejector-blade Q, by which the slugs L are pushed forward out of the mold into the galley R. When the elevator U reaches its uppermost position, the matrix line is transferred therefrom to the right by a pusher U' toward the distributer-bar T. A lifting device V raises the successive matrices between the teeth of a conveyer-chain W, by which they are moved forward along the distributer-bar until released and delivered into their appropriate channels in the magazine. These various operations are repeated, and a slug produced as a result of each cycle.

*Detailed Description of Machine.*

Figure 27:
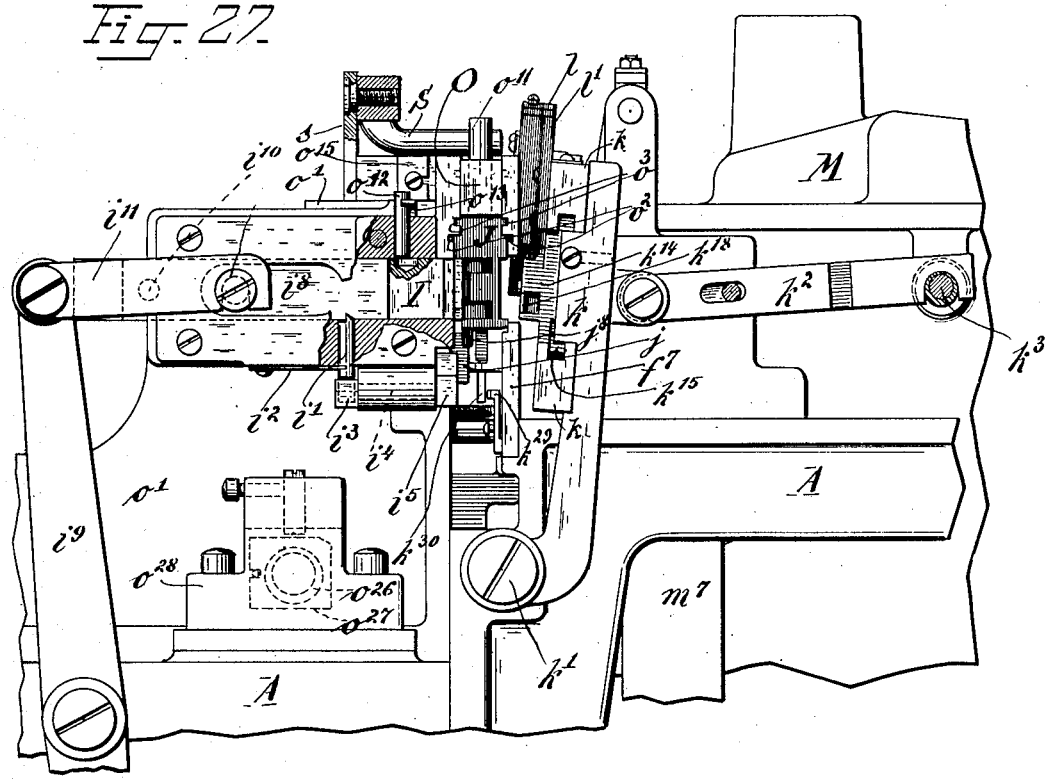

*Matrices.*—The matrices Y,—of which some 1200 to 1500 will be employed in the machine,—are of the form shown in Fig. 10, Sheet 7, of the drawings. They are of the same general character as those used in commercial linotype machines and described in detail in Letters Patent of the United States No. 436,532. They consist each of a flat plate having a generally rectangular form, with projecting ears or shoulders $y$, $y'$, &c., at the upper and lower ends, with distributing teeth $y^4$ in the notched upper end, the matrix proper $y^5$ in one of the vertical edges, and the corresponding reading character or exponent $y^6$ in the opposite edge. The projecting ears or shoulders $y$, $y'$, &c., are designed to travel in the channels of the magazine, and to engage the edges of the mold and the other devices by which the matrices are kept in alinement in the composed line. In the matrices of the Mergenthaler machine, the ears vary in thickness according to the thickness of the body: all of the ears of one matrix being, however, of the same thickness. My matrices differ therefrom in that the ears $y$, $y'$, on the forward edge, which is uppermost in the magazine, are of equal thickness on all matrices in the machine regardless of the thickness of their bodies. The ears $y^2$, $y^3$, on the opposite edge may be varied in thickness as heretofore, according to the thickness of the matrix body.

It will be observed that my matrices differ from those heretofore employed, in that the ears on opposite edges of the same matrix may be of different thickness, and in that the forward or upper ears are of one thickness throughout the font, and this in order that they may coöperate effectively with the devices for disintegrating the lines and delivering the individual matrices to the distributing devices.

*Justifiers.*—The expansible spacers or justifiers, shown in Fig. 18, Sheet 9, are of the same general construction as those used in the Mergenthaler linotype machines and illustrated in U. S. Letters Patent No. 436,532. As shown in Fig. 18, Sheet 9, of the accompanying drawings, these spacers consist of a long wedge $z$ connected by a longitudinal sliding joint to the shorter wedge $z'$ provided at the upper end with ears $z^2$ and shoulders $z^3$. The outer side faces of the two wedges are parallel, and the connection is of such character that the shorter wedge will serve as a means of carrying or transporting the longer wedge during assemblage and distribution. The connection is also such that when the shorter wedge is locked fast in the line, the longer wedge may be moved upward past it through the line, in order to gradually increase the total thickness of the justifiers and thus increase the space between the words to effect justification in a manner well understood by those skilled in the art.

*Main-frame.*—The main-frame A, which may be of the form shown or any other suitable form, is a rigid structure intended to support the various operative parts hereinafter described.

*Magazine.*—The magazine B, which is preferably arranged in an inclined position, may be of any suitable channeled construction. It is preferably composed, as in the Mergenthaler machines, of two parallel plates rigidly secured to intermediate spacing pieces, and provided in their inner or opposing faces with longitudinal converging grooves or channels adapted to receive and guide the upper and lower edges of the matrices Y, which are delivered from the distributer to the upper end of the magazine, and released from the magazine one at a time, in the order in which their characters are to appear in the lines of print.

The magazine may be secured to the frame in any suitable manner. I prefer to lay it loosely upon a skeleton base-frame $a$, forming part of the main-frame, and to arrange it for removal at will over one side of the machine, so that it may be replaced by another containing matrices for a different type face. To permit this removal, I provide the main-frame with two horizontal supporting and guiding rails $a'$ extended beyond one side of the frame, and having their ends notched, in order to arrest and momentarily suspend the off-going magazine.

In order to lift the magazine clear of the underlying escapement-operating mechanism presently to be described, I seat on the frame, at the lower end of the magazine, a transverse eccentric rock-shaft $a^2$, having on one end an operating handle $a^3$ so arranged that when this handle is turned downward, the rock-shaft will lift the end of the magazine and sustain it while it is being moved to or from its operative position. A rod $a^4$, secured longitudinally to the back of the magazine, slides upon the guide-rails $a'$ as the magazine is being removed, until the rod is arrested by the hooked ends of the rails; whereupon the magazine may be tilted downward on this rod as a hinge, to a convenient position to be lifted off.

*Matrix escapement mechanism.*—In order to effect the release of the matrices one at a time from the respective channels of the magazine, I provide for each channel an underlying escapement X, shown in detail in Figs. 7 and 13. Each of these escapements is made in one piece in the form of a lever, having upwardly extending lips or shoulders at or near its ends, a downwardly extending portion at the middle to serve as a fulcrum or bearing, and a notch in the upper edge directly over the downwardly extending portion. The distance between the upper lips or shoulders is substantially greater than the extreme length of a matrix. The escapements are seated in grooves $x^{20}$ in the upper side of a rigid supporting bar $x'$ in such position that as each escapement is rocked about its central bearing, the lips at its ends will be projected upwardly alternately through openings provided for the purpose in the under side of the magazine. A rod $x^{17}$, extending across the machine is seated in the notches in the upper edges of the levers to prevent their longitudinal displacement. The withdrawal of this rod endwise, or the lifting of the rod from its place after the magazine is removed, will release all of the escapement levers so that they may be individually removed. The form and arrangement is such that the lips alternately engage the successive matrices, and permit one matrix at a time to escape from the lower end of the magazine. The central projections or bearings on the under side of the escapements, seated directly on top of the grooved supporting-bar, are advantageous in that the escapements are given a very solid support, and their individual removal and insertion is permitted. The construction is also advantageous in that the escapements are free to adjust themselves to a limited extent to the position of the other parts, so that the extremely accurate and expensive construction necessary when a central pivot is used, is avoided.

The escapements stand normally in the position shown in Fig. 7, with the lower lip elevated and in engagement with the forward end of the foremost matrix. A spring $x^3$ acts on each escapement and tends to reverse its position, but the movement is prevented by a second and stronger spring $x^4$, acting through a lift-bar $x^5$ on a vertical slide $x^6$, which presses upward against the lower forward end of the escapement. When the bar $x^5$ is depressed, against the resistance of spring $x^4$, the position of the escapement is reversed by the spring $x^3$, and the foremost matrix permitted to escape, while the second matrix advances until its upper shoulder is arrested momentarily against the upper lip of the escapement. When the lift-bar $x^5$ is again permitted to rise under the influence of spring $x^4$, the escapement resumes the position shown in Fig. 7, and the second matrix advances until it occupies the position vacated by the first.

While it is preferred to construct the parts $x^5$ and $x^6$ as separate connected members, it is obvious that the two may be formed in one piece.

*Keyboard mechanism.*—For the purpose of actuating the escapement lift-bars $x^5$, I may employ devices of any suitable character connected with or controlled by the finger-keys C or other operating means. In order, however, to relieve the operator from excessive labor, to insure the proper movement of the parts regardless of the rapidity with which the keys are actuated or the distance to which they are depressed, and to insure positive release of the matrices and spacers in the order in which the keys are actuated, I make use of a motor, consisting of a continuously rotating power-driven roll $c$, seated in bearings on the frame and serving to actuate the escapements,—its action on the respective escapements being controlled by the finger-keys. The roll extends horizontally across the frame from side to side, past the bars $x^5$, and is provided with any appropriate number of teeth of the form shown, or of any equivalent form. The bars $x^5$ slide vertically in guides in the main-frame, the lower guides being slotted to permit the bars to move edgewise to and from the roll. Each bar is provided with a tooth $x^7$ and an overhanging tooth $x^8$, and also at the lower end with a notch $x^9$ and a laterally projecting stud $x^{10}$. The springs $x^4$ stand in a diagonal position and tend to draw the bars $x^5$ upward and toward the actuating roll.

Each of the finger-keys C is mounted at the middle on a horizontal pivot $c^2$, and is engaged at the rear end beneath a vertically sliding rod $x^{11}$, the upper end of which is bent toward the front of the machine and seated behind the lower end of the corresponding bar $x^5$, in its guiding slot.

The normal position of the parts is shown in Figs. 7 and 8, the upper end of the rod $x^{11}$ standing behind the bar $x^5$ and holding it forward out of engagement with the roll $c$, the bar being at this time in its uppermost position, and the escapement in engagement with the front end of the foremost matrix. In order to release a matrix, the operator depresses, for an instant only, the forward end of the corresponding key C, which lifts the corresponding rod $x^{11}$ until its bent end is opposite the notch $x^9$ in the bar, whereupon the bar is pulled rearward by the spring $x^4$ so that its tooth $x^7$ is engaged by one of the teeth on the roll $c$. The roll instantly acts to drive the bar and slide $x^6$ downward against the resistance of the spring $x^4$, thereby permitting the escapement X to reverse its position under the influence of spring $x^3$, so as to release the matrix. As the bar $x^5$ descends, its tooth $x^8$ is brought into engagement with the roll $c$, as shown in Fig. 13, whereupon the roll acts through said tooth, as shown in Fig. 14, to move the bar edgewise to the front until the tooth $x^7$ is disengaged, whereupon the bar is lifted by the spring $x^4$ to its original position and the escapement X thereby caused to assume its normal position. During this return of the parts, the rod $x^{11}$, having its end seated in the notch of the bar $x^5$, as shown in Fig. 18, is depressed thereby to its original position so that the uplifted bar will again be held out of engagement with the roll, as shown in Fig. 11. This positive depression of the rod $x^{11}$ by the bar $x^5$ serves also to restore the finger-key C positively to its normal or original position. In order to prevent the possibility of the tooth $x^7$ engaging the roll as the bar is moving upward, I provide the guide alongside of each bar $x^5$ with a fixed lip $x^{12}$ designed to coöperate with the stud $x^{10}$ on the bar. As the bar moves forward out of engagement with the roll, the stud passes backward under the lip, as shown in Fig. 14, and ascends in front of the same, as shown in Fig. 15, the lip serving to hold the stud and the bar forward until the bar is again engaged and held by the rod $x^{11}$, as shown in Figs. 7, 11, &c. The lip $x^{12}$ is given a substantial length from front to rear whereby the bar $x^5$ is held in its depressed position for a sensible moment after the tooth $x^7$ is clear of the roll, while the stud $x^{10}$ is traveling under the lip. This dwell of the parts permits the escapement to stand in the releasing position long enough to assure the matrix clearing the escapement before the spring $x^4$ returns the escapement to its position of rest.

In order to avoid the possibility of the parts being interlocked or strained under any circumstances, I prefer to arrange either the lips $x^{12}$ or the studs $x^{10}$ to yield under strain. A simple arrangement for this purpose is shown in Figs. 8, 11, 12, 13, &c., the lips $x^{12}$ being mounted on plates $x^{14}$ which are seated to slide endwise in supporting-bars $x^{15}$ and urged in a rearward direction by spiral springs $x^{16}$, so that if one of the studs should improperly encounter one of the lips,—which may happen when the tooth of the lift-bar is not in full engagement with the tooth of the actuating-cylinder—the supporting-plate of the lip will be moved forward against the resistance of the spring. The plates $x^{14}$ are seated between and serve as guides for the bars.

From the foregoing description it will be understood that the depression of a key is instantly followed by the actuation of an escapement from the roll $c$ and the release of a matrix. Immediately after the release of the key, the parts resume their original position and the second matrix passing forward, is in its turn engaged and held by the escapement. It will be understood that the movement of the escapement in both directions is effected by springs, and if it should happen that either lip of the escapement should rise against the ear of a passing matrix, no injury could result.

*Face-plate.*—Regarding the face-plate or raceway D, which receives the released matrices from the magazine, the only requirement is that it shall contain a series of channels having their upper ends in position to receive matrices from the various magazine channels, and their lower converging ends in position to deliver the matrices into the assembling channel F.

As shown in the drawings, the face-plate consists of a rear-plate $d$, a parallel front glass plate $d'$, and the partitions $d^2$ secured to the back-plate $d$. The face-plate as a whole, is preferably connected to the frame at its upper end by a horizontal pivot $d^3$ so that it may be swung forward and upward in order to give access to the assembling devices and to the lower end of the magazine, and the front glass plate is independently hinged so that it may be turned upward to give access to the channels.

*Assembling mechanism.*—The assembling mechanism, designed to receive the successive matrices and spacers, assemble them in line, and support the line during composition and during its transfer, comprises as the leading elements, a horizontal assembling channel F between two horizontal bars $f'$, $f'$, in position to receive and sustain the matrices and spacers; the star-wheel E in position to push the matrices and spacers forward successively into the channel; and a yielding resistant G against which the forward end of the line is advanced, the resistant being gradually driven forward by the line as the latter is elongated by the addition of matrices or spacers in front of the star-wheel. The star-wheel, so-called, which may be of any suitable angular form, is mounted on a horizontal axis, and constantly and rapidly rotated, its arrangement and action being very similar to that of the corresponding part in the Mergenthaler linotype.

The resistant G, shown in detail in Figs. 21 to 24, is in the form of an angular finger extending at one end into the assembling channel in advance of the incoming matrices and connected by a vertical pivot $g$ to a horizontal slide $g'$ arranged to travel in a guiding groove in the forward rail $f'$, or in any other suitable guide. The resistant G is held normally in the operative position in the path of the matrices by a vertically movable latch $g^2$ seated in the slide $g'$ and urged upward by a spring $g^3$, as shown in Figs. 22 and 23. When the completed line is moved to the left from the composing position to the casting position, it is necessary that the resistant G shall be released and permitted to turn back, as shown in dotted lines in Fig. 21, to permit the passage of the line thereby. In order to unlock the resistant, I provide on the frame in its path, the beveled lip $g^4$, which acts on a corresponding lip on the latch $g^2$ as the resistant is moved to the left, when the line is forwarded to the casting mechanism, the effect being to withdraw the latch from engagement with the resistant so that it may turn away from the matrix line, as shown. The resistant is of less height than the distance between the upper and lower ears of the matrices, permitting it to be swung into the space between the matrix ears, as indicated in dotted lines in Fig. 21, the ears passing below and above it as the line is advanced to the casting mechanism. After the delivery of the line, the resistant is again carried to the right to its original position near the star-wheel, preparatory to the composition of the next line. As this is done, the finger must be again turned to its original operative position. This is effected by the fixed stud $g^5$, Figs. 21 and 22, which encounters the beveled tail end of the resistant, causing it to turn about its center to the operative position in front of the star-wheel, in which it is again locked by the latch $g^2$.

It will be remembered that the matrices are provided on the forward edge with reference or index letters corresponding to the matrices in their rear edges. During composition it is desirable that the operator should view these reference letters in order to see whether the line contains the proper characters in the proper order or arrangement. For this purpose I provide the assembling channel-plate $f'$ with a slot or opening $f^2$ through which the characters are exposed. In order that convenient access may be had to the matrices in the line, for purposes of transposition or removal, I hinge the portion $f^3$ of the channel lying immediately over the slot $f^2$ on a vertical pivot $f^4$, so that it may be swung forward as indicated in dotted lines in Fig. 21. Normally this movable member is held in operative position by a spring-actuated pin $f^5$, Fig. 21, which is seated in the frame and projected into a notch or opening in the pivoted member.

In order to limit the composed line to the required length, and in order to sound an alarm when it has reached its approximate length, I secure to the front of the slide $g'$, which carries the resistant G, a second slide $g^6$ horizontally slotted and secured by a thumb-screw $g^7$, so that it may be adjusted endwise. The slide $g'$ is provided with a series of graduations on its forward face by which the slide $g^6$ may be adjusted to the required length of line. The slide $g^6$ is provided with a stud $g^8$ to actuate a lever $g^9$ mounted on the frame and acting on a pivoted bell-striker $g^{10}$, which in turn acts on an alarm bell $g^{11}$. The adjustable slide $g^6$ carries a rearwardly projecting lug $g^{12}$ which, as the line is being composed, approaches the projection $i^7$ of the block $i^6$ secured to the lower line-advancing finger, and limits the movement of the slide by engaging said lug to prevent the line being over-set. The resistant G and the connected parts are carried forward to the left by the matrix line, which is advanced by mechanism presently to be described, and the resistant is returned after the delivery of the line by devices which will also presently be described.

*Justifier delivery.*—As before mentioned, the wedge justifiers Z, stored in their magazine H, must be delivered downward one at a time to the rear end of the line of matrices as composition progresses. As shown in Figs. 1, 6, 16, 17 and 19, this magazine consists of two parallel upright plates $h$, fixed in position and having inclined upper edges on which the ears of the contained justifiers ride. The lower ends of the justifiers ride upon and are deflected to the right by an underlying inclined plate $h'$ fixed in position and having at the forward end a lip or shoulder $h^4$ which arrests the foremost justifier. To the top of the magazine is secured an overhanging plate $h^2$ overlying the upper ends of the spacers and containing a notch or shoulder $h^3$. At the bottom of the magazine, between its side walls, there is a vertically swinging dog $h^5$ pivoted at $h^6$ and having its forward end so formed and located that when it rises, it will act beneath the forward justifier and lift its lower end clear of the lip $h^4$, whereupon the justifier will slide forward and downward in a curved path out of the magazine into the assembling channel in front of the star-wheel and behind the preceding matrix, the lower end of the justifier riding over and being guided by the front of the lip $h^4$. During this descent of the released justifier, the ears on its upper end ride upon and are guided by the upper inclined edges of the magazine walls. The shoulder $h^3$ of the top plate engages the upper end of the forward justifier, holding it in position in the magazine and permitting it to be raised preparatory to its release, and prevents the upper end from passing forward prematurely. A pivoted arm $h^{25}$, secured to the back of the rear-plate of the magazine, carries a lug $h^{26}$ which overhangs the edge of the magazine plate. Being spring-pressed thereupon, it engages the ear of the spaceband slide, to cause the spaceband to be elongated to its full length as it descends,—the weight of the spaceband being sufficient to pull the ear past the detaining lug. As each justifier is delivered, the others advance, and the second one takes the place of the one discharged. In order to prevent the premature lifting of the second justifier, any suitable means may be employed, but I prefer to provide each justifier in one edge with the notch $z^{14}$, and to provide one wall of the magazine with an inwardly projecting stud $h^8$ in position to enter the notch in the second justifier, thus holding it down while permitting the one ahead to be lifted, as shown in Fig. 16.

The left-hand wall of the lower end of the face-plate D, below the convergence of the channels, is made as shown in Fig. 6, in the form of a plate $d^5$, pivoted on a horizontal axis to the rear wall of the face-plate, thereby permitting it to yield toward the right as the lower end of the released justifier impinges against it. This allows the justifier to enter the assemblage channel far enough behind the last preceding matrix to avoid conflict therewith.

By the successive actions of the dog $h^5$, the justifiers are released and delivered one at a time to the line. The justifiers are received into the magazine at the left side, as elsewhere described, their ears being guided over the upper edges of its walls. In order to insure their forward inclination at the lower ends and to prevent them from assuming improper positions, the depending ends of the plate $h^{28}$ are formed and arranged, as shown in Fig. 17, at such distance above the magazine walls that they will encounter and arrest the upper ends of the ingoing justifiers and hold them until they have swung forward, as indicated in dotted lines. As soon as they have assumed the required position, they are permitted to pass downward in the manner indicated in said figure. The justifier-releasing dog $h^5$ may be actuated by any suitable finger-key connections, but I prefer to employ connections similar to those used for actuating the escapements, as illustrated in Figs. 6 and 20.

The lift-bar $h^{13}$ is similar to those used to operate the escapements and is actuated by the same roll $c$. It is given a greater movement by two teeth $h^{14}$ thereon. As it descends, a plate $h^{15}$ secured thereto and engaging the slotted end of a rod $h^{16}$, depresses the rod, which in turn depresses the end of a lever $h^{17}$ pivoted near its center; the other end of the lever being connected by a link $h^{18}$ with a lever-arm on the shaft of the justifier lifter dog $h^5$. The lift-bar $h^{13}$ moves idly a certain distance (the gap between the lift-bar connection and the engaging end of the slot in the rod) to delay the delivery of the justifiers relatively to the delivery of the matrices. This becomes necessary in the rapid operation of the machine, on account of the path to be traversed by the justifiers between their magazine and the assemblage channel being substantially shorter than that of the matrices.

In order to give ready access to the interior of the justifier-magazine H, the right-hand portion of its front wall $h^{10}$ is connected to the remaining portion by hinges $h^{11}$ and an intermediate spring $h^{12}$, which latter tends to keep the hinged portion closed and in its operative position, while permitting it to be forcibly opened when required.

*Line-advancing mechanism.*—It will be remembered that the matrix line is to be advanced horizontally in a straight line from the composing position, first to the casting position, and thence to the position from which it is elevated to the distributer,—the guides $f'$, $f'$ and parts forming continuations of the same being extended a suitable distance to the left. For the purpose of thus pushing the composed line forward to the left, I mount between the bars $f'$, $f'$, or equivalent supports, a slide N, Figs. 5 and 6, divided horizontally from the left end, to that it presents two arms or fingers $n$, $n'$, lying one above and the other below the level of the star-wheel. When this slide is pushed to the left, these fingers advancing past the star-wheel, act on the rear end of the matrix line, carrying the same positively forward to the casting position in front of the mold K, as shown in Fig. 5, the jaw I being at such time retracted beyond the path of the advancing matrices. After the slide or pusher N has thus delivered the line, it is immediately retracted in order that composition of the next line may begin. The advantage of the employment of the two arms or fingers $n$, $n'$ lying above and below the star-wheel, lies in the fact that they may be retracted until their forward ends are in rear of the axis of the wheel, so as to avoid the possibility of their conflict with the lower ends of the descending matrices and spacers. In this respect, they are superior to the common line-pushing devices, in which the upright pushing fingers lie always in advance of the axis of the star-wheel. The slide N is operated, as shown in Fig. 6, through a link $n^2$ and lever $n^3$, pivoted to the keyboard frame, and having gear-teeth meshing with a vertical rack $n^4$. Other teeth on this rack engage the teeth of a hand-lever $n^5$ pivoted to the frame, so that downward manual pressure on the lever serves to advance the line to the casting position. A spring $n^6$ on the pivot-shaft of the lever returns it. As the slide N returns to the right after delivering a line to the casting mechanism, the resistant G is returned with it to its initial position. For this purpose, a downwardly projecting plate $g^{13}$ is pivoted to the slide $g'$ at $g^{14}$, and yieldingly held in position by the spring $g^{15}$. A block $g^{16}$, secured to the under side of the lower plate $n'$ near its right-hand end, has a beveled projection $g^{17}$ extending across the path of the lower end of the plate $g^{18}$. As the slide N is advanced, the beveled end of the projection $g^{17}$ passes behind the plate, to a position to engage that plate as the slide returns, thereby returning the resistant. As the resistant approaches its initial positon, the rear face of the plate $g^{13}$ meets a beveled projection $g^{18}$ secured to the bottom of the assemblage channel, and is thereby pressed forward out of engagement with the projection $g^{17}$, permitting the resistant slide to stop in the required position, adjacent to the star-wheel.

The manner in which the line is confined in the casting position, and delivered thence to the elevating position, will be hereinafter described.

*Line support.*—When the line is advanced to the casting position, it is necessary that the matrices and the justifiers in the line shall be separately sustained and firmly supported so that their vertical operative edges will aline with the mold when it is forced against them. The construction to this end is shown more particularly in Figs. 5, 29, 45ª, 45ᵇ, 47 and 48. A horizontal bar $f^6$ and the upper edge of a plate $f^7$, both fixed rigidly in position, form in effect a continuation to the left of the assemblage channel F. The bar $f^6$ is so formed and located that as the line is carried to the left, it enters between the upper and lower ears of the matrices at their forward or inactive side, as clearly shown in Figs. 5, 45ª, &c. At the opposite side, the matrices are sustained by the fixed bar or plate $f^7$, over which they are carried. This bar or plate rests beneath the rear ears of the matrices immediately in front of the mold, and sustains the line in the proper position until the mold is advanced against it. At the time the line is advanced to the casting position, the justifier elevator O lies immediately over the line-supports, as shown in Figs. 45ª, 47, &c. This elevator O is composed of two parallel plates horizontally grooved at $o^2$, $o^2$, in their inner vertical faces to receive the ears at the upper ends of the justifiers, so that as the line is moved to its operative position, the ears of the justifiers pass into these grooves, whereby the justifiers are sustained or suspended independently of the matrices. The plates of the elevator are recessed in their lower edge to fit downward over and around the upper end of the matrices, but they have no engagement therewith, and they may rise freely therefrom when the justifiers are to be lifted out of the line, subsequent to the casting operation. The plate $f^7$ and the rear plate of the elevator O prevent the matrices from being drawn rearward by the slug when the mold is retracted. It sometimes happens that the letters on the slug will retain a strong hold in the matrices; hence the importance of having the matrices held forward.

*Line-confining jaws.*—When the line reaches the casting position in front of the mold, and before justification occurs, it is confined between the two jaws I and J, known as the right- and left-hand jaws, both of which are retractable beyond the matrix path,—the first in order that the matrix line may be advanced from the assembling to casting position; and the second in order that it may be farther advanced from the casting position to the elevator, for delivery to the distributing mechanism.

The right-hand jaw I is arranged to slide forward and backward on the right-hand side of the frame $o'$ (hereafter referred to as the casting-vise knee) into and out of the matrix path, and is also movable slightly to the right and left for the purpose of compressing and releasing the line endwise, for reasons which will presently appear. Referring to Figs. 3, 5, 21, 22, 25, 27, 29, 39 and 40, I represents the body portion of the jaw arranged to slide forward and backward in a guideway in the frame, the guideway being of such width that the forward end of the jaw may move slightly to the right and left. The jaw is urged constantly forward to its operative position by a spring $i$, and on being retracted, is held back out of the matrix path, as shown in Fig. 27, by a vertical latch-pin $i'$ urged upward by a spring $i^2$ into engagement with a notch in the lower edge of the wedge member $i^8$, which has engagement with the jaw as hereafter referred to. This pin is acted upon by an arm $i^3$ of a horizontal rock-shaft $i^4$ seated in the frame and provided at its opposite end with a second arm $i^5$, (see Fig. 29) this second arm being, as shown in Fig. 22, in the path of the block $i^6$ secured to the lower arm of the slide N by which the matrix line is advanced. When, therefore, the slide N has advanced the line from the composing to the casting position, the block $i^6$, through the intermediate parts, retracts the jaw-detaining pin $i'$, and permits the jaw to advance under the influence of the spring, until it stands opposite the right end of the matrix line, as shown in Fig. 5. On the left side, the jaw I has inclined surfaces $i^{30}$ at its upper and lower edges which ride against projecting ends of the bar $f^6$ so that as the jaw is retracted, it is caused to move slightly to the right away from the matrix line. It advances across the end of the line slightly to the right of its active position, and without danger of encountering the matrices. On the opposite side, the jaw is also provided with an inclined surface $i^{31}$ which coöperates with a wedge $i^8$ seated in the guideway alongside of the jaw, as clearly shown in Figs. 5 and 29. After the jaw is advanced, the wedge is advanced against it, the effect being to give the jaw a firm support and at the same time carry it slightly to the left against the end of the matrix line. The wedge $i^8$ is moved forward and backward by a lever $i^9$, and is provided on one side with a stud $i^{10}$, which enters a slot in the side of the jaw. This arrangement permits a lost motion between the wedge and the jaw, so that when the wedge is retracted, it will first move independently of the jaw to release the latter, and thereafter carry the jaw backward positively until it is locked by the detaining pin already described. As shown in Figs. 39 and 40, the wedge is connected to the lever $i^9$ by a link $i^{11}$. The lower end of this lever is connected to a grooved collar $i^{12}$ on a rod $i^{13}$, which is mounted to slide endwise and also to rotate in bearings in the frame. This rod carries a second collar $i^{14}$, engaged by one end of an angular lever $i^{15}$, the opposite end of which is provided with a stud or roller seated in an irregular cam groove $i^{16}$ in one side of the main gear-wheel $i^{17}$. In the inactive position, shown in Fig. 40, the stud stands in a widened portion of the cam groove, permitting it to move upward freely as the vise-jaw moves into its active position under the influence of its spring $i$, carrying with it the wedge $i^8$, thereby imparting motion through the lever $i^9$ to the rod $i^{13}$, which moves the lever $i^{15}$ from the position shown in Fig. 40, so that it will enter the narrower portion of the cam grove when the wheel is rotated. This groove is of such form that it causes the wedge to advance behind and against the jaw in the manner above described, forcing the jaw to the left against the end of the matrix-supporting bar $f^6$ to definitely limit the length of the matrix line when justified.

It will be observed that the cam groove has a concentric portion $i^{22}$, which holds the lever and wedge at rest when the justifying wedges are first driven upward to effect preliminary justification of the line. At a later period, and while the portion $i^{18}$ of the cam groove is passing the lever, the wedge is slightly retracted to permit a yielding of the jaw to the right in order to relieve the endwise pressure on the line and permit the advancing mold to press the matrices backward edgewise firmly and in exact alinement against their supporting-bar $f^6$. The following portion $i^{19}$ of the cam of increased radius, serves to arrest the wedge before it is advanced to its final active position, thus permitting the jaw to remain slightly to the right of its final position. While this portion is passing the lever, the justifier plate again rises, forcing the justifier wedges firmly home and expanding the line to a length slightly more than that required. After the justifying action is thus completed, the portion $i^{20}$ of the cam carries the wedge forcibly home, thereby pressing the jaw to the left and compressing the justified line to the exact length required. This compression is to the extent of a small fraction of an inch only. The form of the cam and groove is such that after the casting action, it retracts the wedge sufficiently to relieve all pressure on the line, but not far enough to withdraw the jaw until after the justifiers are lifted from the line, as hereinafter described. In other words, although the line is relieved from end pressure, the jaw remains in position to sustain the end of the matrix line and prevent the matrices from falling over while the justifiers are being lifted out. After the removal of the justifiers, as hereinafter explained, the cam retracts the wedge, and thereby the jaw, to their forward and inactive positions.

The left-hand jaw J is in the form of a block mounted to slide horizontally in grooves $o^3$, $o^3$, (Fig. 45$^a$) in the justifier elevator O, before referred to. This elevator, which, it will be remembered, receives and suspends the justifiers when advanced to the casting position, is mounted to rise from the casting level in order to lift the justifiers out of the line, and to such height that they may be transferred to their magazine. When the elevator is lowered to the casting position it carries the jaw J downward to the level of the position to be occupied by the matrix line, as shown in Figs. 5, 27, 30, etc. The jaw thus lowered into the matrix channel stands in the path of the advancing matrix line, and gives rigid support to the forward end of the line after the latter is released by the resistant G. The jaw when in this position is rigidly supported in a manner presently described, and gives firm support to the matrix line during justification and the subsequent casting action. The movement of the jaw J to the left may be limited by any suitable stop or support on the main-frame, but I recommend the arrangement shown in Figs. 26, 28, 29, 30 and 35ª, which provides for a longitudinal adjustment of the jaw to correspond with the different lengths of line which may be demanded from the machine. In this arrangement, a downwardly projecting lug $j^8$ of the jaw J is advanced, as the line is elongated in justification, against a shoulder $j$ on one end of a bar $j'$ so seated in the frame that it may be moved endwise, and provided on one side with a series of teeth. These teeth are arranged to interlock with corresponding teeth on the end of a bar or latch $j^2$, which is seated in the frame and limited as to end motion by an adjustment screw $j^3$, as shown in Fig. 29. The bar $j^2$ is urged into engagement with the bar $j'$ by a spring $j^4$, and when thus engaged, it holds the bar $j'$, which in turn holds the jaw J against movement to the left.

The locking bar $j^2$ is provided with a handle $j^5$ by which it may be disengaged to permit longitudinal movement of the bar $j'$, which may be locked in a new position by reëngagement of the parts. This change in the arrangement of the bars $j'$ will effect a corresponding change in the operative position of the jaw J so that it may confine a matrix line of greater or less length as demanded. When the elevator O is raised to lift the justifiers from the line, it carries with it the jaw J, which is thus lifted away from the matrix line and out of its path, so that the line may be moved to the left from the casting position to the elevating devices.

*Casting-vise knee.*—The spaceband elevator O, and the other parts above described, for holding and limiting the length of the line of matrices during the casting operation, are carried by a frame $o'$, consisting essentially of a right-angled member or knee properly braced for rigidity, as shown in Figs. 1, 3, 5, 25, 27, 28, 29 and 45. The matrix-supporting bar $f^6$, and the line-length adjustment bars $j'$ and $j^2$, are carried on the rear vertical face of this knee; the right-hand vise jaw I on its right-hand side, and the spaceband elevator O on a slide $o$ having vertical movement in a central bearing in the knee. For convenience of access to the face of the mold and adjacent parts, the knee is adapted to be drawn forward on the main-frame, carrying the elevator and other connected parts with it. It is held in its rear or operative position by a cam $o^{25}$ pivoted to the forward edge of the knee, and provided with a handle by which it may be turned to force it between the edge of the knee and a roll $o^{29}$ on a stud on the main-frame. The knee is held firmly down on its seat by blocks $o^{27}$ on the two ends of an eccentric rock-shaft $o^{26}$ having bearings in the sides of the knee, and provided at its center with a handle for rotating it. In the locked position, the blocks $o^{27}$ bear against set-screws in the brackets $o^{28}$ secured to the main-frame. The link $i^{11}$ connecting the vise-jaw wedge and its operating lever, has a slotted connection with the stud of the wedge $i^8$. By lifting this link out of engagement, and releasing the locking devices just described, the knee may be drawn forward a number of inches to give free access to adjacent parts.

*Justification.*—After the composed line of matrices and wedge justifiers is presented in front of the mold, and while the jaws I and J are in position opposite the ends of the line, justification is effected as usual in linotype machines, by pushing the longer members or wedges of the justifiers upward through the line past the connected members and between the matrices. This lifting movement of the wedges is effected as shown in Figs. 31, 43 and 44, by the vertically movable pusher-blade $z^4$ carried on the upper end of a rod $z^5$, actuated as shown in Figs. 43 and 44, by a link $z^6$ connected to an angular lever $z^7$ pivoted to the main-frame and acted upon by a lifting spring $z^8$ and a depressing cam $z^9$. During the advance of the line to the casting position, the pusher $z^4$ is held down, as shown in Fig. 43, but after the line-confining jaws are in position, the faces $z^{10}$ and $z^{11}$ passing the cam roll, the blade rises and pushes the wedges upward for a preliminary justification, and then descends, remaining down while the pressure on the line is released, and the matrices are properly alined, as elsewhere explained. Thereafter, the justifier blade again rises, at the decreasing face $z^{12}$ of the cam, driving the wedges up for the final justification, the increasing face $z^{13}$ lowering the blade after the cast is made.

*Mold and actuating mechanism.*—The mold K contains a horizontal slot or opening $k^{12}$ extending therethrough from front to back,—of the size of the slug or linotype required,—so that it may coöperate with the matrix line at the front and the mouth of the pot at the rear. The mold may be made in one piece, or built up as shown, by a series of pieces, to admit of variation in the size of the slot, or in short, constructed in any desirable manner, provided it is adapted to serve its purpose. The mold is provided with longitudinal tongues at its upper and lower edges, and is mounted to reciprocate horizontally in a supporting-frame $k$ sustained at its ends by depending arms connected by horizontal pivots $k'$ to the main-frame, as shown in Figs. 1, 2, 27, 29, 31 and 39. This arrangement permits the mold to be moved horizontally between the casting and the ejecting positions, and to be swung forward and backward to and from the matrix at the front and the mouth of the pot M at the rear. After the line is in the casting position, the mold-frame and mold are swung forward by mechanism hereinafter described, until the line is seated firmly against the face of the mold so as to close the slot therein. While the mold is thus seated, the mouth of the pot is seated firmly against its rear side to close the same preparatory to the delivery of the molten metal from the pot into the mold and against the matrices. The swinging movement of the mold-carrying frame forward and backward is effected, as shown in Figs. 5, 27, 29 and 39, by a link $k^2$ extending from the frame to the movable melting pot, to which it is jointed at $k^3$. The link $k^2$ is made in two parts frictionally held together, to permit a partial movement of the pot to swing the mold frame to the vertical when the mold is at the slug-ejecting position (the full movement of the pot when coming into casting position causing the two parts of the link to slip on each other). The longitudinal reciprocation of the mold is effected, as shown in Fig. 5, by a link $k^4$ pivoted thereto and to an actuating lever $k^5$, which is arranged to swing horizontally on the upper end of a vertical rock-shaft $k^6$ mounted in the main-frame, as shown in Figs. 2, 3, 36 and 51, and provided near its lower end with a sector pinion $k^7$ actuated by a rack-bar $k^8$. This bar is mounted to slide forward and backward at one end in suitable guides on the main-frame, and yokes around the cam shaft at the other. It carries on one side a roller $k^9$, which is urged rearward by a cam $k^{10}$ on the main-shaft against the resistance of a spring $k^{11}$ encircling the shaft and secured at one end to a collar on the shaft, and at the other end to the main-frame. The form of the cam $k^{10}$ and the arrangement of the parts are such that the mold is moved to the left after the completion of the casting action, and permitted to remain at rest while the slug is being ejected, and then returned by the action of the spring $k^{11}$ to the casting position.

*Melting-pot and actuating mechanism.*—The melting-pot M may be formed, supported and heated in the manner shown in Figs. 2, 3, 4, 5, 26, 41, 42, 45, &c., or in any other suitable manner, provided only it is movable to and from the mold and adapted to close the same at the back while delivering metal thereto. In the drawings I have shown the pot secured in a surrounding jacket supported by rollers $m$ bearing under flat surfaces on the pot and upon the corresponding surfaces on the main-frame so that the pot may be moved easily forward and backward. The pot is constructed as usual, with a mouth or throat $m'$, and with a perforated mouth-piece $m^2$, adapted to fit against and tightly close the back of the mold, as shown in Figs. 41 and 45. Within the pot and communicating with the throat there is a vertical well containing a plunger $m^3$ actuated by a lever $m^4$ for the purpose of forcibly delivering the metal into the mold, as usual in this class of machines. Beneath the pot are burners $m^5$ and $m^6$, supplied with gas or other combustible, for the purpose of heating the pot.

It is important that the mouth of the pot shall be seated throughout its length forcibly but with yielding pressure against the back of the mold, and that subsequent to the casting operation, it shall be positively separated from the mold in order to break the sprues or gates from the base of the slug in the mold. This movement of the pot is effected, as shown in Figs. 26, 41, 42, 43 and 44, by two vertically movable bars $m^7$, $m^7$, guided at their upper ends in the main-frame on opposite sides of the pot, and provided in their upper ends with oblique or inclined cam-slots $m^8$, which receive studs or rollers $m^9$ secured to the pot. The form and arrangement of the parts are such that when the bars $m^7$ are drawn down, as in Fig. 41, their slots will carry the studs forward and advance the mouth of the pot against the mold, while on the other hand, the upward movement of the bars carries the studs rearward and moves the pot away from the mold, as shown in Fig. 42. The slots $m^8$ are preferably made with diminishing inclination toward their upper ends, so that they move the pot forward rapidly until it is near the mold, after which they act with increasing force thereon.

In order to insure the pressure of the pot across its entire face firmly against the mold, the two bars $m^7$ are jointed at their lower extremities to opposite ends of an equalizing-bar $m^{10}$, which is acted upon at the middle by a depressing-rod $m^{11}$, having on its upper end a nut or head $m^{12}$, with a spiral spring $m^{13}$ thereunder, so that when this rod is pulled down, the spring will depress the bar $m^{10}$, causing it in turn to pull down the bars $m^7$, allowing each bar to continue its motion independently of the other until arrested by the resistance of the pot. The rod $m^{11}$ is preferably actuated, as shown in Figs. 41 and 42, by a lever $m^{14}$ pivoted to the main-frame and carrying near its middle a stud or roller $m^{15}$ seated in the cam-groove $m^{16}$ in the side face of a cam-disk on the main-shaft.

The pump-plunger operating-lever $m^4$ may be operated, as shown in Figs. 45 and 46, by a link $m^{17}$ extended downward outside of the melting-pot and connected at its lower end to a lever $m^{18}$ pivoted to the main-frame, this lever being urged constantly downward by a spring $m^{19}$ but lifted and supported at the proper times by a cam $m^{20}$ mounted on the main-shaft and acting against a stud or roller $m^{21}$ on the side of the lever.

After the slug has been cast in the mold, the pot and the mold retracted, and the mold moved to the left, the slug is ejected from the mold and delivered to a galley by means to be hereinafter described.

The pot-cam is shaped, as shown, to cause the following actions: (a) The preliminary advance of the mold until it is near the face of the matrix line. (b) The arrest of the mold in this position during the first justification. (c) The pressure of the mold against the operative edges of the matrices to effect their alinement. (d) The slight withdrawal of the mold from the matrices during the second and final advance of the justifying wedges. (e) The final locking up of the mold tightly against the face of the matrices. (f) The withdrawal of the mold from the matrices to withdraw type characters therefrom. (g) The retention of the mold-carrying frame in its rearward position while the mold is advanced endwise to the ejecting position, the slug ejected and the mold returned to its initial point.

*Pump-lock.*—It may sometimes happen that a composed line will be too short to tightly fill the space between the confining-jaws I and J, after the wedge-justifiers are fully expanded, and in such event, it is desirable to automatically prevent the action of the pump or plunger from delivering the metal into the mold. For this purpose I provide the automatic pump-stop or -lock, shown more particularly in Figs. 4, 5, 25, 26 and 29, consisting of a rock-shaft $m^{23}$ seated in the frame and having at its rear end an upright arm $m^{24}$ urged by a spring toward the pump-link $m^{17}$ and beneath a lug $m^{25}$ projecting therefrom, as shown in Fig. 4, in such manner as to prevent the descent of the plunger and the delivery of metal thereby. The rock-shaft is provided at its forward end with a short arm $m^{22}$, Figs. 25 and 26, in position to be acted upon by the bar $j^2$, which holds the left-hand line-confining jaw. The parts tend to urge the jaw slightly to the right beyond its operative position, and if the matrix line is too short, the pump is prevented from acting, as above-mentioned. If, however, the line is of proper length, it acts during its advance or justification to crowd the jaw J backward to the left to its final position, causing the arm $m^{22}$ to turn the shaft and throw the locking-arm out of engagement with the pump-link. When the jaw-locking bar $j^2$ is not employed, the arm $m^{22}$ may be acted upon directly by the jaw.

*Slug trimming knives.*—When the slugs or linotypes are cast in the mold, the metal will sometimes overflow slightly between the face of the mold and the front of the matrices, forming thin lateral fins or burs along the front edges of the slug. For the purpose of removing these fins I provide on the front of the mold-guiding frame $k$ the two upright knives $l, l'$, see Figs. 25, 27, 28, 32, 33, 34 and 35. The knife $l$ is extended downward and provided at the lower end with a rearwardly extending cutting lip $l^2$ in such position that when the mold is carried to the left, this cutting edge, lying against the face of the mold, will act beneath the lower front edge of the slug L and remove the fin therefrom, as shown in Figs. 33 and 35. The knife $l'$ has its lower end provided with a cutting edge $l^3$ in position to act upon the upper forward edge of the slug and remove the fin therefrom, as shown in Figs. 33 and 34. Each knife is carried in a housing $l^{14}$, $l^{15}$, on the mold-frame, and consists of upper and lower portions united by a horizontal pivot $l^4$, so that the lower end of the knife may yield in a forward direction in the event of its encountering the face of the slug or other resistant. The yielding end of the knife is held normally rearward in its operative position by a spring $l^5$ encircling a screw $l^6$ passing through a slot in the knife and into the housing behind. The knives are movable upward and downward in the housings so that their lower ends may be accurately adjusted to the proper position for trimming the slug. The adjustment is effected by means of vertical screws $l^7$ and $l^8$, and by binding-screws $l^9$ and $l^{10}$ passing through the hinge portion of the knives and into their supports. In order to permit the upper knife to yield in a vertical direction, a spring $l^{11}$ is secured to the frame $k$ and arranged to bear on a pin on the back of the knife, as shown in Figs. 32 and 33.

The mold is provided with a horizontal top face $K^2$, Figs. 33, 34 and 35, at a definite distance from the upper edge of the mold opening, irrespective of the size of that opening. The lower face of the mold opening is constructed at a constant level for the different sizes of body to be cast, the variation being made in the upper face. The face $K^2$ is beveled at its ends, as shown at $K^3$. As the mold travels across the knives, the bevel $K^3$ rides under the housing of the knife $l'$, which is movably mounted on the frame $k$, lifting the knife against the action of the spring $l^{11}$ to bring its cutting edge in proper relation to the slug. Molds for different thicknesses of bodies may therefore be substituted without necessitating changes of adjustment of the knives.

*Back knives.*—In order to insure accuracy in the height of the slug, and to remove any irregularities which may exist when the mouth of the pot is separated therefrom, I propose to provide any suitable means for trimming the foot of the slug flush with the rear face of the mold while it is being carried therein from the casting to the ejecting position. A simple arrangement for the purpose, shown in Figs. 5, 32 and 34, consists of two knives $l^{12}$ and $l^{13}$ secured to the back of the mold-supporting frame $k$. The first of these knives will have its edge set slightly beyond the plane of the mold in order to take off the greater portion of the protruding metal from the base of the slug, while the second knife is set to act closely against the face of the passing mold in order to take off the remaining portion of the metal and finish the slug to the exact height demanded.

*Returning justifiers to their magazine.*— After the casting action, and after the composed line has been released endwise by the right-hand jaw, the justifiers Y are lifted out of the matrix line and returned to their magazine H. To this end I sustain the justifiers at the casting point by the elevator O, before mentioned, which is independent of the matrix supports. The elevator lifts the series of justifiers until their ears are on a level with the upper end of their magazine, into which they are shifted laterally from the elevator by the movement of the left-hand jaw J, as before alluded to. The details of the mechanism are clearly shown in Figs. 26, 47, 48, 49, 50, &c., in which O represents the justifier elevator, consisting mainly of two horizontal parallel plates connected together and having grooves $o^2$ in their inner faces to receive the sustaining ears on the upper ends of the justifiers, and grooves $o^3$ to receive ribs of the block J. This elevator O is sustained on the upper end of a vertical slide $o$ mounted in a suitable guideway on the vise knee $o'$. When the composed line is transferred to the left from the composing to the casting position in front of the mold, the jaw J, which stands normally at the right-hand end of the elevator O at the junction between the elevator and the assemblage channel, is advanced to the left by the incoming matrix line, forming a support for the foremost matrix after that matrix has passed the line-resistant in the assemblage channel; and the ears of the justifiers enter the grooves $o^2$ in the elevator O, which at this time stands in its lowermost position directly above the matrix line, as shown in Figs. 45ª and 47. After the casting action, the elevator rises to the position shown in Figs. 48 and 50, so that the ears at the upper ends of the justifiers are at the proper level to pass over the upper edges of the magazine H when the justifiers are shifted into the same, as indicated in said figures. For the purpose of thus shifting the spacers into the magazine, the jaw J is provided with an upright stud $o^{11}$, which is acted upon at the proper time by a shifter-link S attached to the upper end of the lever $s$ pivoted to the vertical elevator-guide $o$ at $s'$. This lever is acted upon by a slide $s^2$, guided vertically on the elevator-guide $o$. The arrangement is such that after the elevator O is raised to its uppermost position, the slide $s^2$ actuates the lever $s$ and causes the jaw J to push the justifiers Z out of the elevator O into the magazine H.

It will, of course, be understood that any suitable means may be employed for operating the elevator and moving the jaw to deliver the spacers therefrom. A good arrangement for this purpose is that represented in Figs. 47, 48, 49 and 50.

The vertical movement of the elevator is effected by means of a link $o^4$ carried by a lever $o^5$ pivoted to the main frame at $o^6$, this lever being urged upward by a spring $o^7$ and moved downward against the tension of the spring by a cam $o^8$ on the main-shaft. The link $o^4$ is connected at its upper end to the elevator slide $o$ by a transverse pin passing therethrough and through a vertical slot in the part $o$, so as to allow a limited lost motion between them. A spiral spring $o^9$ is seated within the slide and presses a plunger $o^{10}$ downward on the upper side of a stud or projection on the slide $s^2$, which in turn rests on the upper end of the link $o^4$. When the cam $o^8$ relieves the lever from downward pressure, the lever rises under the influence of spring $o^7$, thereby lifting the link $o^4$ which, through the plunger and spring, lifts the elevator O with the justifiers therein. After the elevator reaches its uppermost position and can move no farther, the link $o^4$ continues its upward movement, compressing the spring $o^9$, by reason of the greater strength of spring $o^7$. During this action, and while the elevator remains at rest, the slide $s^2$ is pushed upward and caused to operate the transfer-lever $s$, before referred to.

From the foregoing it will be understood that the justifiers are lifted out of the line and transferred directly to their magazine.

*Advancing matrix line to elevator.*—After the casting action, and after the justifiers have been lifted from the line and the left-hand jaw J withdrawn, the line must be advanced to the left and presented to the elevator U, which raises it to the distributer. This is effected, as shown in Figs. 29, 31, &c., by a pusher-finger $k^{18}$ connected by a vertical pivot to a slide $k^{14}$ lying adjacent to the mold and arranged to travel horizontally in the mold-guide. Normally this finger is closed rearward out of the path of the matrices, but when movement of the mold from the casting position to the left begins, the finger is caused to swing outward, as shown in Fig. 29, opposite the right end of the matrix line, so that as the supporting-slide is carried to the left, the finger pushes the matrices before it. The finger-carrying slide is actuated from the mold through a yielding connection, shown in Fig. 31, consisting of a latch $k^{15}$ seated on a horizontal pivot on the under side of the slide, one end $k^{16}$ being beveled and arranged to engage a shoulder on the mold, while the opposite end is acted upon by a spring-pressed plunger $k^{17}$, which maintains the engagement under normal conditions. The latch is so formed as to permit a limited horizontal movement between the slide and the mold, and the slide contains in the top a spring-pressed plunger $k^{20}$, which acts frictionally on the guide to resist movement of the slide. In the slide, as shown in Fig. 29, there is a horizontal plunger $k^{19}$ urged to the left against the mold and arranged to engage a projection on the heel of the matrix-shifting finger $k^{18}$. When the mold begins its movement to the right, the slide remains momentarily at rest, and the plunger being permitted to move to the left by the separation of the mold from the slide, causes the finger $k^{18}$ to swing outward to the operative position behind the matrices, as before mentioned and shown in Figs. 29 and 31. As soon as the finger has reached this position, the latch causes the slide to advance to the left with the mold, carrying the matrices before it until they are engaged with the elevator, which raises them to the distributer, as hereinafter described. When the mold returns to the right from the ejecting position, the resistance to the movement of the slide due to the spring plunger $k^{20}$ is such that the mold pushes the plunger $k^{19}$ inward, thereby swinging the finger $k^{18}$ back out of the matrix path to an inactive position, after which the slide and the mold are moved together to their normal positions. In the event of the matrix line meeting any serious resistance, so that it resists the advance of the finger $k^{18}$, the latch $k^{15}$ will disengage and release the slide from the mold. The engagement will be automatically restored when the mold is returned to the right.

Figure 28:
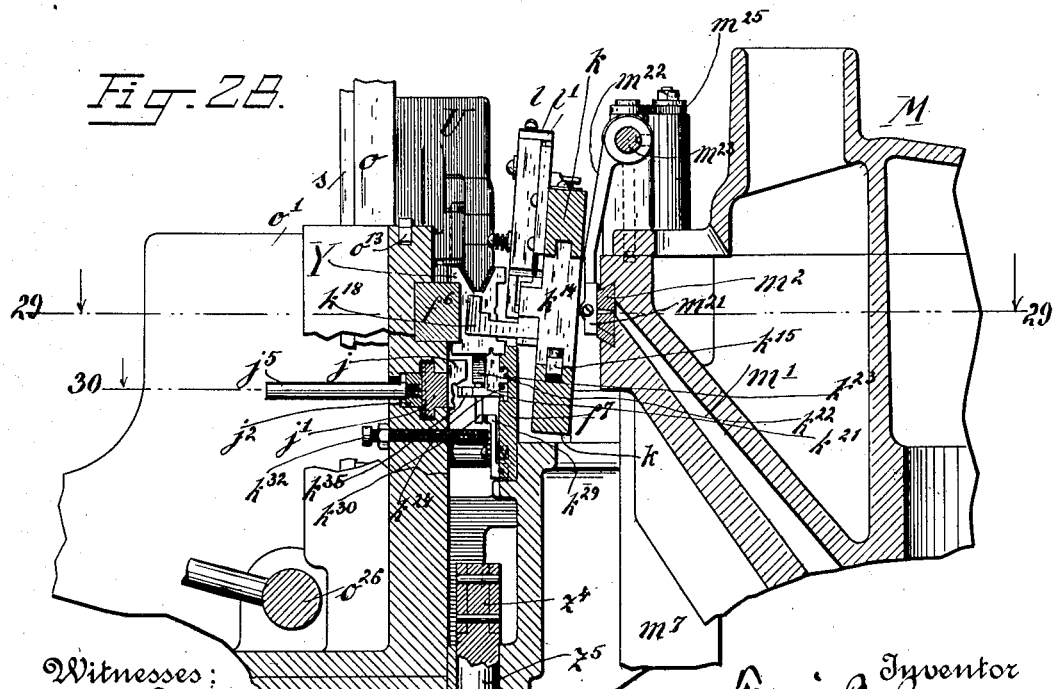

*Supporting line during transfer.*—While the matrix line is being pushed forward by the finger $k^{18}$, as above described, it is necessary to support it at the forward end in order to prevent the matrices from falling out of position. To this end I provide a yielding resistant of any suitable character, but I recommend the arrangement of parts shown in Figs. 29, 31 and 34, in which $k^{22}$ represents a resisting finger connected by a horizontal pivot to a slide $k^{21}$ mounted in a horizontal groove $k^{23}$ in the plate $f^{7}$, or other suitable support. A chain $k^{24}$ is extended from the slide around supporting pulleys $k^{25}$ and $k^{26}$ to a spring-actuated winding-drum $k^{27}$, the tendency of these parts being to urge the slide and finger $k^{22}$ to the right. The finger is urged upward by a spring in the slide $k^{21}$ into the path of the matrices. A forwardly projecting lug $k^{35}$ on the slide encounters the shoulder $j$ of the line-length adjusting-bar $j'$, as shown in Figs. 28 and 29, whereby the finger is stopped in a position corresponding to the length of line for which the parts are adjusted. A plate $k^{29}$, Figs. 28 and 31, pivoted at its lower edge to the plate $f^{7}$, has forwardly projecting ratchet teeth at its upper edge, and this toothed edge is pressed forward by a spring in the frame into the path of the pin $k^{30}$ projecting downward from the finger $k^{22}$. The ratchet teeth are held normally to the rear of the path of the pin by a screw $k^{32}$ projecting from the face of the casting-vise knee, in such manner that when the knee is drawn forward, as elsewhere described, the ratchet teeth swing forward and engage the pin $k^{30}$ before engagement is broken between the lug $k^{35}$ and shoulder $j$, thereby holding the finger against the action of the spring, tending to draw it to the right. When the knee is returned to its operative position, the ratchet plate is pressed rearward out of the path of the pin.

The matrix line is engaged by the elevator at a point directly in front of the slug-ejecting mechanism, and the elevator at once rises, as hereinafter described, leaving the path free for the ejection of the slug.

*Slug-ejecting mechanism.*—When the mold is at its extreme left-hand position, the slug is ejected therefrom and carried horizontally forward by an ejector-blade Q, as shown in Figs. 5, 29, 51 and 52, which carries the slug forward across the matrix channel and under and beyond a yielding bar $r$. After passing this bar, the slug falls foot-first behind an inclined plate $r'$, whereby it is turned to an upright position and permitted to descend into the receiving-galley R. The office of the yielding bar $r$, which is urged downward by an overlying spring, is that it accommodates itself to slugs of different thicknesses, maintaining them all in a horizontal position until their forward edges have advanced over the bar $r'$ so as to receive support therefrom. The ejector-blade Q is attached to a horizontal operating slide $q$ mounted in guides on the main-frame and actuated through a link $q'$ from an angular lever $q^2$ pivoted to the frame and actuated in its turn by a link $q^3$, which yokes around a flattened collar $q^8$ on the cam-shaft and carries a roll $q^5$ acted upon by a cam $q^4$.

For the purpose of repeatedly pushing the assembled slugs forward in the galley in order to make room for the entrance of the incoming slugs at the rear, I provide a series of rods $r^2$ carried by a second slide $r^3$ which receives motion from the ejector-slide $q$. A spring $r^4$ tends to draw the slide $r^3$ forward, but is impeded by the lug $r^7$ on the slide engaging the downwardly projecting lug $q^9$ of the ejector-slide. When the ejector advances, the slide $r^3$ moves with it to the extent of its permitted movement, to the position shown in Fig. 52, advancing the previously ejected slugs on the galley to permit the entrance of the succeeding slug, which falls upon the rods $r^2$. As the ejector is withdrawn, engagement between the lugs $q^9$ and $r^7$ causes the retraction of the slide $r^3$.

*Galley.*—The galley R may be made of sheet metal or other suitable material, and removably seated on the frame in position to receive the matrices. It contains a yielding weight $r^5$, or other suitable resistant, to maintain the slugs in an erect position therein.

It is to be noted that the slugs are delivered across the space occupied by the matrix line when it is transferred to the elevator, the elevator and the ejector alternating in their action. This arrangement admits of the machine being made much narrower than would otherwise be permissible. Consequently it is possible to reduce the size and length of movement of many parts.

*Mold wipers.*—In order to keep the front and rear faces of the mold clean and to free it from chips from the trimming knives that may adhere thereto, wipers of felt or other suitable material are provided to bear against the faces of the mold as it returns to the casting position after the delivery of each slug. The wiper to act on the front face of the mold is shown at $o^{30}$ (Figs. 25, 26 and 35$^a$), secured by a plate $o^{31}$ to the left-hand end of the justifier-elevator O. Its rear face is in line with the path of the forward face of the mold as it returns from the delivery to the casting position. The wiper thus stands in the path of travel of the matrix line from the casting position to the matrix line elevator; but being attached to the justifier-elevator, it is lifted from this position before the line is carried to the left, and returned to position by the descent of the elevator before the mold starts on its return trip, the mold rubbing against it as it returns.

A wiper $o^{32}$, (Fig. 35$^a$) for cleaning the rear face of the mold, is secured to the face of a plate $o^{33}$, which has sliding bearings under gibs $o^{34}$, $o^{34}$, on the side of the housing of the left-hand pot cam-slide $m^7$. A spring $o^{35}$ secured to the plate, draws the wiper forward against the rear face of the mold-frame, in which position it rubs against the back of the mold as the mold returns to the casting position after the delivery of a slug, as shown in Fig. 35$^a$.

In order that the sprues and fins projecting from the foot of the slug before it has been trimmed may not drag against the wipers as the mold travels from the casting position, an upwardly projecting arm $o^{36}$ of the plate $o^{33}$ is formed in position to be engaged by the upper edge of the mold-frame as the frame swings rearward, thereby pressing the wiper-plate to the position shown in Fig. 35$^b$, in which position of the mold-frame the mold travels to the slug-ejector. During the return trip, the mold-frame stands as in Fig. 35$^a$, the wiper being in position to rub against the mold to free it from chips or other accumulations.

*Pot-mouth wiper*, Figs. 28, 29 and 31.—For the purpose of freeing the mouth of the melting-pot from accumulations of metal and dross, a wiper $m^{26}$, preferably a steel blade, is provided. This wiper is carried on an arm $m^{27}$ on a shaft $m^{28}$ which has bearings in the frame at each side of the pot-mouth. The arm is feathered to the shaft, and a spring $m^{29}$, attached to a small lever at its left-hand end, holds the wiper against the pot-mouth. The arm is connected by a link $m^{30}$, with a stud on the mold-operating lever $k^5$, whereby the wiper is dragged across the pot-mouth after the casting of each slug, to carry away any excessive accumulation of metal or dross.

*Line-elevator.*—The mechanism for lifting the line from the casting level to the distributing mechanism is constructed as follows: Figs. 1, 2, 4, 29, 31, 53, 54, 55, &c. A slide U, mounted to travel on the bar $U^7$, carries a horizontal bar $U^{14}$ toothed longitudinally on its lower V-shaped edge to fit the distributing-teeth of the matrices. The bar $U^7$, secured at its extremities rigidly to the frame, is inclined for the greater portion of its length, but is bent at its ends so that they stand vertically, and this in order that the slide U may rise vertically from the position in which it receives the matrices, and also rise vertically in presenting the matrix line at the upper end of its movement to the distributing devices. When the matrices are advanced from the casting position, the bar $U^{14}$ so stands in their path of travel, that their upper toothed ends will straddle and engage the bar and will thereafter be carried therewith. The elevator U is operated preferably by a chain $U^{11}$ driven by a sprocket $U^2$ from below. This sprocket is mounted on the hub of a pinion $U^3$ between frictional surfaces held firmly against the sides of the sprocket by a screw-collar threaded on the pinion-hub (Fig. 36). The pinion turns freely on its stud, and is operated by the gear segment $U^5$ carrying a cam-roll $U^{15}$. The cam $U^6$ gives the pinion movement somewhat in excess of that required for the full movement of the elevator, slip of the friction taking up the excess of the movement at each end. The elevator is guided on the bar $U^7$ by studs carrying rolls projecting into grooves in the edges of the bar. The elevator stands normally at the upper end of its travel, as shown in Figs. 1, 53 and 55,—the position in which it delivers matrices to the feeding devices of the distributer. The cam $U^6$ acts to lower the elevator in time to receive the advancing line of matrices, in which position the right-hand end of the toothed bar is located in proper alinement with the matrices by a pointed adjustment-screw $U^8$ on the elevator engaging in a seat in a block $U^{16}$ on the side of the galley-frame. After the line has passed onto the toothed bar, the elevator rises, leaving a clear path for the ejection of the slug horizontally from the mold to the galley. As the elevator approaches the upper end of its travel, a pin $U^9$, projecting from its side (Figs. 55 and 56), strikes the end of the trip $u'$ projecting into its path (Fig. 58), forcing it rearward. This trip is pivoted to a lever $u^2$, which is secured to a rock-shaft $u^3$. A double-armed lever $u^4$ (Figs. 57, 59 and 61) is slidably secured to this shaft and is urged to the left by a weight $u^5$ on an attached cord. The upper end of this lever carries a segment of a nut $u^6$, adapted to mesh with the threads of a worm $u^7$ mounted on the main driving-shaft of the distributer. The lower end of the lever $u^4$ receives in a slot the end of a pin $u^8$ (Figs. 59, 60, &c.) projecting from a slide $u^9$ in a horizontal T-groove in the frame. This slide carries the pusher $U'$ of the usual type, for pushing the matrix-line toward the distributing devices. The worm $u^7$ is rotated, as below described, in the direction to drive the pusher toward the right. As the pin $U^9$ on the line-elevator throws the trip $u'$, the nut $u^6$ is released from the worm by the rocking of shaft $u^3$, and the arm $u^4$ and pusher $U'$ are returned at once to the left end of their travel in position to act on the next line when it is elevated. The cam $U^6$ is so proportioned as to cause the elevator to rise slowly after releasing the pusher $U'$, in order to give the pusher time to reach its position at the left of the line. As the elevator reaches the upper limit of its travel (Fig. 60), a beveled lug $U^{10}$ on the rear face of the elevator strikes a plunger seated in the main-frame, forcing backward the upper end $u^{10}$ of the lever $u^2$, thereby pressing the nut $u^6$ into engagement with the worm. A relief spring and plunger $u^{22}$ permit the nut to be pressed into engagement yieldingly.

The worm $u^7$ is freely mounted on the continuously running shaft $u^{11}$, and is driven in a direction to advance the pusher toward the right by a pin $u^{12}$ (Fig. 57) projecting from the face of a cam $v^7$ secured to the shaft, which pin engages a pin $u^{13}$ projecting from the end of the worm. The pins are held in yielding engagement by a spring $u^{14}$ on the shaft $u^{11}$ between the screw-collar $u^{15}$ and a washer $u^{61}$ which is pressed thereby into engagement with a collar $u^{17}$ fastened to the end of the worm. The pressure of the spring is sufficient to overcome the friction of the line of matrices and pusher, and the pull of the weight $u^5$. The worm is thereby caused to turn in the direction to advance the nut $u^6$ and the pusher $U'$, and to carry the matrix line to the right until the first matrix of the line is stopped over the lifter $v$ (Figs. 55, 62, 64, &c.) in position to be fed to the distributing mechanism, whereupon the continued rotation of the worm causes the worm to move lengthwise to the left against the impeded nut, compressing the spring $u^{14}$ and withdrawing the pin $u^{13}$ from engagement with the pin $u^{12}$, thus unclutching the worm from the driving-shaft, the friction of the collars at the end of the worm serving to steady it in the disengaging position. As each matrix is removed successively from the end of the line, the spring $u^{14}$ advances the worm and pusher to bring the pins again into engagement and revolve the worm until the pusher is again impeded. In this manner the pusher is advanced until, when all the matrices have been fed to the distributer it reaches the end of its travel, where it remains until the nut is again thrown out of engagement with the worm by the elevator as it ascends with the matrices of the succeeding line.

*Matrix-distributing lift.*—For the purpose of lifting the matrices one at a time from the line and delivering them to the distributing devices proper, I adopt the construction shown in Figs. 2, 55, 57, 59 and 62, as follows:—The lifter-blade $v$ is pivoted to a lever $v'$ loosely carried on a rock-shaft $v^3$, and yieldingly operated by a lever $v^2$ secured to that shaft, and carrying a spring $v^4$ bearing against the lever $v'$ on one side of the center, and an adjustment screw $v^5$ at the other end. On the rear end of the rock-shaft is the lever-arm $v^6$ (Figs. 2 and 59) carrying a roll in engagement with the cam $v^7$ on the continuously running shaft $u^{11}$. This cam acts to cause the lifter to rise, a spring $v^{17}$ on the lever $v'$ depressing it. The matrix-line to be distributed is advanced by the pusher, as above described, until the first matrix is stopped by its lower end coming against a channeled block $v^9$ (within which the lifter operates)—Figs. 62 and 64—and its upper ears against the shoulders $v^8$ of the plates $v^{10}$ (one at each side of the matrix). A front-plate $v^{11}$ is movably secured in place with its end, which overhangs the lower forward ears of the matrices, standing at a distance from the block $v^9$ just sufficient to permit the passage vertically of the ear of the foremost matrix, thereby to prevent the lifter from carrying up more than one matrix at an operation, the ears on the forward side of all matrices being of the same thickness, as above described. The matrix is thus lifted until its upper ears clear the shoulders $v^8$ and its lower end clears the block $v^9$, the operations of the lifter being timed to introduce the upper end of the matrix between the teeth of an endless chain of conveyers W, to be presently described, whereby the matrices are advanced horizontally, their upper ears riding on the bevels $v^{13}$, and their lower ends riding on the bevels $v^{14}$, as in Fig. 55. The conveyers thus advance and guide the matrices into engagement with the teeth of a distributer-bar, of the usual type, such as shown in U. S. Patent No. 347,629, and along the bar until released therefrom, as before described.
*Distributer*, Figs. 1, 2, 3, 55, 57, 63 and 64.—A distributer-bar T, having permuted teeth of the form familiar in the Mergenthaler linotype machines, is secured at its two ends to lugs on the main-frame. The conveyers W, above referred to, consist each of two plates $w$, $w$, secured to an intermediate bar $w'$ having rack-teeth cut in its outer edge. The plates are formed with the equally spaced teeth $w^2$, and studs $w^3$, $w^3$, on the front and back of the conveyers. Enough of these conveyers are provided to form a continuous line of them across the distributer and around the semi-circular tracks $w^4$ and $w^5$ and return track $w^6$. The conveyers travel with a continuous movement around this path, passing from left to right across the distributer-bar, upon which they rest, with their teeth extending downward on each side of the bar as shown.
Reaching the right-hand end of their travel on the bar, the studs $w^3$ pass into grooves $w^7$ on the inner faces of the tracks $w^4$, $w^5$ and $w^6$, which guide them back to the left-hand end of the distributer-bar. A gear $w^8$ meshing with the rack-teeth of the conveyers, is driven by a worm-wheel $w^9$ on the shaft of the gear, and a worm $w^{10}$ on the continuously running shaft $u^{11}$, driving the engaged conveyer toward the right and thereby advancing the whole line of conveyers. The semi-circular end track $w^5$ is fixed in position, while the track $w^4$ at the other end is pivoted at $w^{11}$, its lower end being free to swing to compensate for variations in the length of the line of carriers, as they travel around the curves. The gearing that drives the carriers is so proportioned as to move them the width of successive teeth during each operation of the matrix-lifter $v$, which is thus permitted to raise a matrix into each succeeding gap between teeth as the conveyers pass above it. The matrices are thereby engaged and carried onto and along the distributer-bar, until they reach the combination of distributer teeth that permits their disengagement from the bar, whereupon they fall into the channels of a magazine entrance-member $w^{12}$ of the usual type, by which they are guided into their channels in the magazine. The distributer shaft $u^{11}$ is driven by a belt $P^{14}$, over a pulley $w^{14}$, which is mounted frictionally on, and drives yieldingly, a collar $w^{15}$ that is loose on the shaft. A spring-plunger $w^{16}$, carried by this collar, engages ratchet teeth on the side of a collar $w^{17}$ secured to the shaft, in such manner that the shaft is driven by the belt in its operative direction, the ratchet-teeth permitting the power-shaft of the machine to be turned backward without turning the distributer-shaft, the plunger $w^{16}$ in that case clicking over the teeth.

It is desirable to provide means for automatically stopping the distributer in case matrices fail to properly enter the channels of the magazine entrance-member, and stop or clog in a position to cause injury to the matrices or adjacent parts if the operation were continued. To this end, the partitions $w^{18}$ of the channels of the magazine entrance-member are made flexible and are engaged by notches in the edge of a plate $w^{19}$, having a sliding bearing in the frame of the entrance member (Figs. 57 and 63). A lug $w^{20}$ on the right-hand end of this plate engages the lower end of a spring-pressed arm $w^{21}$, pivoted at $w^{22}$ to the frame, and holds it in the position shown, so that the foot $w^{23}$ clears the path of the pins $w^{24}$ projecting from the side of the pulley $w^{14}$. When a matrix hangs in a channel of the entrance member, in such manner as to project into the path of a succeeding matrix on the distributer-bar, the projecting matrix will be thereby advanced to the right, bending slightly the partition-plate $w^{18}$, and shifting the plate $w^{19}$ to cause the release of the arm $w^{21}$, which is swung by its spring to bring the foot $w^{23}$ into the path of the pins on the pulley, thereby stopping the distributer. The magazine entrance-member is pivoted on a rod $w^{25}$, and retained in position by a pivot latch $w^{26}$. The latch being released, the entrance-member may be swung downward to the rear, and the obstructing matrix removed. The displaced channel-partition $w^{18}$ and plate $w^{19}$ are thereby permitted to resume their normal position; and as the entrance-member is returned to place, the arm $w^{21}$ is reëngaged, thereby releasing the pulley $w^{14}$.

*Driving-clutch and connections*, Figs. 36, 37, 38, 39, 40, 49 and 50.—The machine is driven by a tight-and-loose pulley P on a shaft P′, which carries a gear $P^2$ meshing with a gear $P^3$, free on a shaft $P^9$. This gear, which runs continuously, has secured to it a toothed clutch member $P^4$ adapted to be engaged by, and to drive, a coöperating clutch member $P^5$. This latter member is secured to the shaft by a spline and groove, permitting longitudinal movement on the shaft, into and out of engagement with the member $P^4$. A spring $P^6$, acting through a rod $P^8$ and a pin $P^7$, tends to press the clutch into engagement. It is maintained in the disengaged position by the portion P¹⁰ of an arm P¹¹, secured to the rock-shaft i¹³, heretofore referred to, and bearing against an adjustment-screw in the projecting end of the rod P⁸. A foot P¹², carried by this arm, rests, when the cam-shaft is inoperative, upon a beveled cam-piece P¹³ on the side of the cam-shaft gear. This maintains the arm P¹¹ in such position that it holds the clutch out of action. When a line is advanced to the casting mechanism, the right-hand vise-jaw is released, and moves to the rear, its connection with the shaft i¹³ moving that shaft forward as heretofore described. This carries the foot P¹² clear of the cam-piece P¹³, permitting it to swing to the left, and permitting the spring P⁶ to press the clutch member P⁵ into engagement with the member P⁴, communicating rotation thereby to the shaft P⁸, and through the gearing, to the cam-shaft. As the cam-shaft approaches the end of a complete rotation, the foot P¹², being in the path of the cam-piece, is moved thereby to cause the clutch to open, permitting the cam-shaft to come to rest. Belts P¹⁵ and P¹⁶, driven by sheaves on the power-shaft P', drive the escapement-operating cylinder c and the star-wheel E respectively.

*Safety-stop.*—If, for any reason, the spaceband-elevator has not returned fully to its normal position, the action of the vise-jaw, and thereby of the clutch, will be prevented by a pin o¹² (Figs. 5, 25 and 27) engaging in a hole i²⁸ in the vise-jaw. This pin is depressed by a spring-actuated plunger o¹⁴, acting through the lever o¹³. When the elevator is in proper position, the block o¹⁵, secured to the elevator-slide, depresses the left-hand end of the lever, to raise the pin out of engagement with the jaw.

*Recasting lock.*—When it is desired to cast more than one slug from the same line of matrices, a lever o⁴⁰ (Figs. 25 and 45ᵃ), pivoted on the upper face of the casting vise knee at o⁴¹ and guided under a block at o⁴², is moved to the right into engagement with a square notch o⁴⁴ in the edge of the justifier-elevator slide o, the lever being held in position, as located, by a spring-pressed detent o⁴³. When the lever is in engagement with the slide o, the elevator is prevented from rising after the slug has been cast, the elevator-cam turning idly. As the mold travels to the left, it breaks engagement with the line-transfer slide k¹⁴, by virtue of the beveled connection heretofore described, the slide remaining at the right of the line of matrices, by which it is stopped. When the mold returns to the casting position after the delivery of the slug, it automatically establishes reëngagement with the line-transfer slide. When a number of slugs are desired from the same line of matrices, the line-advancing hand-lever n⁵ may be held down, thereby preventing the locking of the vise-jaw I in inoperative position, and the casting mechanism will run continuously.

*General operation.*—The matrices and spacers being mounted in their magazines, the pot supplied with metal kept in a molten condition by a flame thereunder, the power being applied to the main-shaft, the operation of the machine is as follows:—The operator manipulates the keys in the order in which the corresponding characters, spaces and justifiers are to appear in the line. As each key is actuated, it throws one of the toothed bars into engagement with the roll c, whereby it is immediately driven downward against the stress of the resisting spring x⁴, thereby permitting the escapement to reverse its position and release a matrix, or in the case of a justifier, causing the lifting-dog to act upon and release the foremost justifier from its magazine. The matrices and justifiers descend successively into the channel between the bars f' in front of the star-wheel, by which they are urged forward successively against the end of the line, and the line gradually advanced as additions thereto are made. When the line has acquired the proper length, the operator depresses the handle n⁵ which, through the intermediate parts, causes the slide N to advance to the left so that its arms, passing over and under the star-wheel, will act upon the end of the matrix line and push it forward horizontally to the casting position past the right-hand jaw I, which is at this time retracted. The jaw I then advances so that the line is confined between the two jaws, after which the justifying action occurs, the mold is closed forward against the matrices, and the pot closed forward against the back of the mold. While these parts are locked rigidly together, the pump or plunger is actuated and molten metal delivered from the mouth of the pot into the mold. Immediately thereafter the right-hand jaw is unlocked to release the matrix line and the elevator O rises, carrying with it the left-hand jaw and the justifiers, until the latter have their ears above the level of their magazine H, into which they are delivered by the movement of the jaw J to the right. After the justifiers and the jaw are thus raised, the mold with the slug therein is moved to the left from the casting to the ejecting position, carrying with it the slide k¹⁴ and its finger k¹⁸, which latter pushes the matrix line before it to the elevating position and into engagement with the elevator. It will be observed that the mold and the line of matrices are thus carried to the left at the same time. During this advance of the line, the finger k²² is previously raised in front of the matrices and stands against the front of the line, thus preventing the matrices from falling over on their sides while being transferred. The elevator next lifts the line of matrices and presents it to the distributing devices at the top of the machine, and immediately after the line is lifted from the casting level, the ejector advances and delivers the slug into the galley. The matrices are separated one at a time from the end of the elevated line and lifted into engagement with the conveyers by which they are carried along the distributer-bar, suspended therefrom until they arrive over their appropriate magazine channels, into which they fall.
It is to be observed that the bars $x^5$ and the slides $x^6$ for operating the escapements, are so connected that they form in effect a single or continuous piece, and it is to be understood that the two may be made integral if desired.

While I prefer to employ the star-wheel as a pusher for advancing the matrices to the line at the composing point, it is to be understood that any other suitable form of pusher may be employed, several such devices being already known in the art.

Having described my invention, I claim and desire to secure by Letters Patent:—

1. In combination, the main-frame, the magazine seated thereon and removable sidewise therefrom, and the rock-shaft seated in the frame and arranged to raise the end of the magazine and support it while being removed.
2. The main-frame having rails $a'$ and rock-shaft $a^2$, in combination with the laterally removable magazine bearing on the shaft and having a member to engage the rails $a'$ and suspend the magazine during its removal.

3. In combination, a magazine, an underlying bar grooved in the upper edge, and escapement levers seated in the respective grooves, each lever having upwardly extending lips at the ends, and a downwardly extending projection at the middle, said projections seated in the bar and supporting the lever in operative position.

4. In combination with a magazine, and an underlying bar having a series of grooves therein, escapement levers seated in the grooves and each having on the under side in contact with the underlying bar, a projection whereon it rocks.
5. In combination with a grooved supporting bar, the escapement levers each having a central bottom projection whereon it rocks, and also a central notch in the upper edge, and a rod seated in the series of notches.

6. An escapement lever for a linotype machine, formed in one piece, one edge being provided with upwardly projecting shoulders at the ends and a central notch in the middle, and the opposite edge provided with a central projection to serve as a bearing.

7. In a linotype machine, a magazine to sustain the matrices, an escapement lever centrally pivoted that its ends may alternately engage the matrices, its operative length being greater than that of a matrix, in combination with operating means acting to hold the lower end of the escapement normally in engagement; whereby the first movement of the escapement is caused to release the foremost matrix, while its rear end at the same time engages the second matrix.

8. In a linotype machine, a magazine and a series of gravitating matrices, in combination with a vibrating centrally pivoted escapement having a length greater than that of the individual matrices, spring-actuated devices whereby the lower end of the escapement is held normally in engagement with the forward end of the matrix, power-driven mechanism for retracting said devices, and a spring for reversing the position of the escapement when such retraction occurs.

9. In a linotype machine the pivoted escapement X having a length greater than the matrices, the spring $x^3$ tending to retract the forward end of the escapement from its operative position, a second and stronger spring $x^4$, devices through which said spring acts to move the escapement in opposition to the spring $x^3$, power-driven devices acting in opposition to the spring $x^4$, and a finger-key mechanism for controlling the action of the power-driven devices; whereby the forward end of the escapement is held normally in position to engage the forward end of the foremost matrix, its retraction effected when a key is operated, and its automatic restoration to the first position thereafter effected.

10. In combination with the pivoted escapement X, a spring $x^3$ to depress the lower end of the escapement, a toothed bar $x^5$ tending to raise the lower end of the escapement, a spring $x^4$ acting on said bar and adapting it to overcome the spring $x^3$, a continuously rotating toothed roll $c$, a finger-key C, and a rod $x^{11}$ arranged between the key and the bar $x^5$ and controlling the engagement of the latter.

11. In combination with the continuously rotating roll $c$, the toothed actuating escapement bar $x^5$ having a notch $x^9$, a spring $x^4$ tending to move said bar in opposition to the roll, a rod $x^{11}$ having a laterally bent end to hold the bar normally out of engagement, and a finger-key connected to said rod; whereby the movement of the key and rod is caused to effect the engagement of the bar with the actuating roll and the key thereafter restored to its normal position.

12. In combination with the toothed roll $c$, bar $x^5$, spring $x^4$, rod $x^{11}$ and spring-supported lips $x^{12}$ in position to control the edgewise movement of the bars $x^5$.

13. In combination with the toothed roll $c$, the longitudinally and laterally movable bars $x^5$ having projections $x^{10}$, the sliding plates $x^{14}$ between the bars with lips $x^{12}$ thereon, springs $x^{16}$, and means for holding the bars $x^5$ normally out of engagement with the roll.

14. In combination with a toothed roll, a movable bar having teeth $x^7$ and $x^8$ to engage the roll, spring connections tending to cause the engagement of the bar with the roll and to cause its longitudinal return after disengagement from the roll, a sliding member $x^{11}$ adapted to hold the bar normally out of engagement with the roll and to interlock with the bar when the latter is engaged with the roll and a finger-key connected with the member $x^{11}$; whereby the longitudinal movement of the bar is caused to return the slide to its normal position.

15. In combination with a magazine and matrices substantially such as shown, a centrally pivoted escapement lever of a length greater than the matrix adapted to engage the matrices at its two ends alternately, the forward end of said escapement being located in position to engage the forward end of the foremost matrix and retain the same; whereby the initial movement of the escapement releases the foremost matrix directly from the magazine, and at the same instant the second matrix is engaged near its upper end and momentarily arrested.

16. In a linotype machine, a roll $c$ and devices whereby it imparts motion to the matrix-releasing devices and also to the justifier-releasing devices; the connection to the latter constructed to permit play or lost motion between the roll and the justifier-releasing devices; whereby a dwell or loss of time in releasing the justifiers is permitted.

17. In combination with an escapement-actuating roll $e$, bar $h^{13}$ actuated thereby, a bar $h^{16}$ receiving motion from the bar $h^{13}$ and serving in turn to actuate the justifier-releasing mechanism, said bars $h^{13}$ and $h^{16}$ being arranged as shown, to permit a limited movement of the first-named bar before it imparts motion to the second; whereby the delivery of matrices is effected more speedily than the delivery of justifiers after the operation of the finger-key.

18. In combination with the two-part wedge-justifiers, their magazine, and means for retaining the justifiers therein and releasing them one at a time therefrom, a device $h^{26}$ arranged to engage the outgoing justifiers; whereby movement of the shorter wedges to the upper end of the longer wedges is insured as the justifiers pass to the line.

19. In combination with the double wedge-justifiers having sustaining ears on their shorter members, the spacer-magazine having side walls adapted to underride and support the ears, a lip $h^4$ to engage the lower ends of the justifiers, the plate $h^3$ to engage their upper ends, means for lifting the lower ends clear of the lip $h^4$, and means, as $h^{26}$, to retard the shorter members of the justifiers as the longer members start toward the line; whereby the spacers are fully extended before delivery to the line.

20. In combination with the justifiers having supporting lips $z^2$ at the upper end, a magazine having inclined side walls, on which said lips ride to sustain the justifiers, and an overlying plate $h^{28}$ in position to engage the upper ends of the justifiers to compel them to assume a substantially vertical position before entering the magazine.

21. A channeled assembler to receive the matrices, and the star-wheel to advance the matrices therein, in combination with the horizontal slide N located in rear of the star-wheel and provided with the long fingers $n$ and $n'$ and adapted as described to pass above and below the star-wheel and advance the composed line to the casting position.

22. In combination with the line-delivery slide N, a hand-lever $n^5$, rack-bar $n^4$, and lever $n^3$ connected with the slide.

23. In combination with the slide N having line-delivery fingers and a block $i^6$, an adjustable slide $g^6$ on the frame to engage the block and limit the advance of the slide; whereby the over-setting of the line is prevented.

24. In combination with the slide $g'$ carrying the line-resistant, the line-shifting slide, and intermediate adjustable stop devices to limit the advance of the slide $g'$ in relation to the shifter slide; whereby the composed lines may be limited to one length or another, as demanded.

25. In combination with means for supporting the composed line, means for advancing the line horizontally to the casting position, a confining jaw arranged to slide behind the advancing line, and connections through which said jaw is controlled by the line-advancing means.

26. The combination of horizontal supports for a composed line, means for advancing the line from the composing to the casting position, a confining jaw arranged to slide behind the advanced line, the spring tending to advance the jaw to its operative position, detaining devices to hold the jaw beyond the path of the advancing line, said detaining devices arranged to be released by the line-advancing devices; whereby the advance of the line to the casting postion is followed by the advance of the jaw to its operative position.

27. In a linotype machine, a line-confining jaw arranged to slide transversely across the path of the matrix line, and also movable laterally in the direction of the length of the line, in combination with means for effecting such movements.

28. In a linotype machine, guides for the composed line of matrices, means for advancing the matrices along said guides to the casting position, a line-confining jaw movable transversely across the path of the line, means for advancing and retracting the jaw, and means for moving the jaw laterally toward the line when in position to confine the same.

29. In a linotype machine, and in combination with a line-confining jaw I movable transversely across the line, a coöperating wedge $i^8$ whereby the jaw is moved laterally to compress the line and thereafter released laterally to relieve the line.

30. In a linotype machine, in combination, the sliding line-confining jaw I, the spring tending to advance the same to its operative position, the coöperating wedge $i^8$ and means for advancing and retracting said wedge in relation to the jaw.

31. In combination with a line-confining jaw I and a spring for advancing the same to its operative position, the coöperating wedge $i^8$ arranged to move the jaw laterally and also to effect the retraction of the jaw, and means for operating said wedge.

32. In combination with the sliding jaw I, the coöperating wedge $i^8$, the wedge-actuating cam, and connections between said parts.

33. In combination with the jaw I movable to and from the operating position, and a coöperating wedge to effect its movement lengthwise of the line, the wedge-operating cam and connections between the cam and wedge, said cam formed as described to repeatedly advance and retract the wedge while the jaw remains in operative position; whereby the compression and release of the line endwise is permitted to facilitate justification.

34. In combination with a horizontal support for the matrix line at the casting position, a vertically movable justifier-support, O, a jaw, J, adapted to lie against and confine the end of the matrix line in the casting position, and a rigid support to hold the jaw against the line, said jaw mounted and movable horizontally in the elevator to deliver the spacers therefrom after they are lifted clear of the matrix line.

35. In combination with the main-frame and the vertically movable justifier-support O, a horizontally movable jaw mounted in the support and adapted to confine the end of the matrix line in the casting position, means to sustain the jaw rigidly against the line, and means for moving the jaw when the elevator is in its upper position to discharge the justifiers; whereby the jaw is enabled to serve the two-fold purpose of confining the matrix line and delivering the justifiers from the elevator.

36. In combination with the justifier elevator and the horizontally sliding jaw J therein, the jaw-actuating lever on the elevator, and means to actuate the lever when the elevator is in its upper position.

37. In a machine of the class described, a horizontally movable jaw acting to cover and support one end of the matrix line in the casting position, and thereafter to shift the justifiers to their magazine, in combination with means for sustaining the jaw rigidly against the line, and means for carrying the jaw to and fro between the casting and the discharging levels.

38. In combination with the main-frame and the elevator O, the supporting knee for the latter mounted for forward movement at will, whereby the parts may be separated to give access to the casting mechanism.

39. In a linotype machine substantially such as described, the main-frame, the knee $o'$ movable forward and backward on the frame, and means for securing the knee in its normal position, said knee sustaining the line-confining jaw I and the elevator O with the second jaw J therein; whereby the matrix- and spacer-confining devices may be moved to give access to the casting mechanism.

40. In a machine of the class described, a support movable at will and having a justifier-elevator and the two line-confining jaws sustained therein, in combination with means for locking the support in operative position.

41. In a machine of the class described, horizontal line-supports extending from the composing to the casting position, and thence to the elevating position, in combination with means to shift the line to the casting position, means to lift the justifiers from the line at the casting position, distinct means to advance the line beyond the casting position, and a resistant acting against the front end of the line during its last-named advance.

42. In combination with supports for the matrix line extended horizontally beyond the casting position, a pusher to advance the line along said supports from the casting position, and a movable resistant to sustain the forward end of the line during said advance.

43. In combination with a reciprocating mold arranged to advance beyond the casting position, means advanced with the mold to carry the matrix line from the casting position.

44. In combination with a reciprocating mold, line-shifting means actuated in unison therewith.

45. In combination with a reciprocating mold, line-shifting means actuated thereby.

46. A mold and line-shifting means arranged to travel simultaneously and equally in parallel lines from the casting position.

47. A traveling mold and a line guide parallel with the path of the mold, a line-pushing device automatically movable into and out of the path of the line, said device controlled by the movement of the mold.

48. In combination with line-supporting guides, a line-pusher and a line resistant, both movable into and out of the path of the line, and an elevator to which the line is delivered thereby.

49. In combination with the reciprocating mold, line-supports parallel with the path of the mold, means actuated by the mold to advance the line from the casting position, and an elevator to which the line is delivered by said advance.

50. In combination with the justifier-elevator O and the line-confining jaw J sustained thereby, means for supporting the jaw horizontally in different operative positions, whereby the jaw is adapted to confine lines of different lengths.

51. In combination with the justifier-elevator and the line-confining jaw J therein, the toothed bars for changing the operative position of the jaw.

52. In combination, the elevator O, the line-confining jaw J carried thereby, the toothed bars to sustain the jaw at different operative points, and spring connections permitting instantaneous separation of the bars and adjustment of the jaw.

53. In a line casting machine of the character described, the combination of an elevator, O, a horizontally movable jaw therein, and means for moving the jaw when the elevator is in the upper position to deliver the justifiers therefrom, said moving means adapted to permit the jaw to remain in its forward position when the elevator descends, whereby the jaw is adapted to serve as a resistant for the forward end of the next incoming matrix line, and means for sustaining the jaw against the line in the casting position.

54. A mold and line-carrying devices arranged to advance in parallel lines from the casting position, in combination with means for lifting the matrices out of the way, and means for thereafter ejecting the slug from the mold across the space previously occupied by the line.

55. An ejector for the slugs and an elevator for the matrix line located within the same vertical planes, in combination with means for presenting the mold and the line within said limits, and means for removing the line and the slug in different paths.

56. In a linotype machine, the combination of the following elements: Horizontal supports for the matrix line, means for composing the line of matrices and spacers therein, means for advancing the line from the composing to the casting position, a resistant acting in front of the line during said advance, means for removing the spacers from the line at the casting position, means for thereafter advancing the line beyond the casting position, a resistant acting at the front of the line during the last-named advance, and an elevator to receive the line when thus advanced.

57. In a linotype machine, the combination of horizontal supporting guides for the composed line, two pushers acting successively to advance the line, and two resistants acting in connection with the respective pushers to confine the line during its advances.

58. In combination, means for confining the composed line endwise and advancing it by two steps from the composing to the casting position and thence to the elevating position, means for removing the spacers at the casting position, an elevator to receive the line at the casting position, a mold movable from the casting position to a position opposite the elevator, and an ejector arranged to expel the slug while the mold is in said position and subsequent to the removal of the line by the elevator.

59. In combination with means for advancing the line endwise beyond the casting position, a reciprocating resistant, and adjustable means to limit the length of the composed line, said means serving to arrest the return of the resistant, whereby the initial position of the resistant is made to correspond with the length of the line.

60. In combination with the line-confining jaw J, and a line-resisting device $k^{22}$, an adjustable device $j'$ serving to control the position of the jaw and the return movement of the resistant.

61. In combination with a resistant $k^{22}$ and means urging the same to the right, a movable support, as $o'$, and means for automatically locking the resistant when its support is moved from its normal position; whereby the resistant is retained in its field of action.

62. In combination with the knee or support $o'$ movable at will, the line-resisting slide, the spring-actuated plate $k^{29}$ to lock the slide, and means for disengaging the plate when the knee is restored to its normal position.

63. In combination with a reciprocating mold and a line-carrier, a yielding connection through which the mold operates the carrier.

64. In combination with the mold and the line-carrier slide, a spring-actuated separable connection $k^{15}$.

65. In combination with a horizontal mold and ejector, a receiving galley, means for turning the slugs to an upright position as they enter the galley, and pushers actuated by the ejector to advance the accumulated slugs in the galley.

66. In combination with the ejector Q and pusher $r^2$, the yielding connection between them.

67. In combination with a horizontal mold and ejector, the receiving galley at a lower level, and the plate $r'$ arranged to receive and momentarily sustain the front edges of the slugs; whereby they are caused to stand on their feet in the galley.

68. In combination with the horizontal mold, ejector and galley, a horizontal yielding guide $r$ between the mold and galley, and a plate $r'$ between the guide and galley to erect the falling slugs.

69. In combination with the frame and the movable pot, intermediate slides having cam surfaces to advance the pot.

70. In combination, the frame, the pot movable in relation thereto, and the intermediate slides having cam-slots engaging projections on the pot.

71. In combination with the pot and cam-slides to advance the same, slide-operating means, and an equalizing connection between said means and the slides.

72. In combination with the pot-actuating slides, an actuating cam and an equalizing bar between the cam and slides.

73. In combination with the pot and distinct means for advancing its respective slides, a common operating means, and an equalizing connection between the latter and the former.

74. In combination with the pot and its two actuating slides, an equalizing bar and a spring through which the bar is moved.

75. In a machine of the class described, the matrix line-elevator U and its stationary guide $U^7$ having vertical ends and an intermediate inclined portion, in combination with the endless chain attached to the elevator, guide pulleys whereby the chain is caused to follow the course of the elevator, and means for imparting a to and fro motion to said chain; whereby the elevator is moved positively upward and downward and caused to assume a vertical position at each end of its movement.

76. In a linotype machine, the combination of a line-elevator U, a stationary track or guide whereon it travels, an endless chain connected with the elevator, and means for imparting a reciprocating motion to the chain, whereby the elevator is caused to travel positively upward and downward in its guide.

77. The combination of a line-elevator U, a stationary track whereon it travels upward and downward, an endless chain connected to said elevator, guide-wheels around which the chain travels, a cam and intermediate devices through which the cam imparts a to and fro motion to the chain; whereby the elevator is caused to ascend and descend positively.

78. In combination, the continuously driven shaft $u^{11}$, the tubular worm $u^7$ connected therewith through clutching devices, a spring tending to maintain the engagement, and a pusher actuated by the worm, whereby excessive resistance of the matrices is caused to effect the disengagement of the worm to permit the stoppage of the pusher.

79. In combination with the continuously driven shaft $u^{11}$, the pusher actuating worm $u^7$ encircling the same, the spring $u^{14}$ urging the sleeve endwise, driving connections between the opposite end of the sleeve and the shaft, a line-pusher $u^4$ arranged to be actuated by the worm, means for effecting the engagement and disengagement of said parts, and means for returning the pusher to its receiving position when disengaged.

80. In a distributing mechanism, the combination of the toothed distributer-bar T, an endless series of unconnected toothed carriers W adapted to straddle the distributer-bar, and an endless track or guide for said carriers.

81. In a distributing mechanism, a distributer-bar in combination with an endless line of unconnected traveling carriers or conveyers W provided with fingers to engage the matrices and with driving teeth, an endless guide or track for said carriers, and a driving-wheel engaging the carrier teeth.

82. In a distributing mechanism, and in combination with a distributer-bar, an endless track or guide, an endless series of matrix-conveyers or carriers arranged to travel along said guide, and means for acting on the carriers successively to push them ahead, whereby each carrier is caused in turn to push ahead the one before it in order to maintain a close connection between them.

83. In a distributer, the combination of a distributer-bar, the conveyers adapted to straddle the bar, provided with teeth to engage the matrices and also with external studs $w^3$, and an endless track or guide grooved to receive said studs.

84. A matrix-carrier or conveyer for a distributing mechanism, consisting of a central portion provided with driving teeth and with two fixed parallel side faces, each having depending rigid teeth to engage the matrices.

85. In a distributing mechanism, and in combination with an endless series of matrix-conveyers, a driving pulley $w^{14}$ arranged to impart motion thereto, a finger $w^{21}$ arranged to engage the wheel and positively arrest its rotation, a series of laterally yielding plates $w^{18}$ between which the matrices are delivered by the distributer, and means connected to said plates for controlling the action of the stop-finger $w^{21}$.

86. In a distributing mechanism as a means of separating the matrices from the line preparatory to distribution, the lifting-finger $v$, side-plate $v^{11}$ arranged to overlie the ears of the matrices in the advancing line except the first, the stops $v^8$ and $v^9$, and means for advancing the line toward said stops, whereby the lift is caused to raise the foremost matrix only.

In testimony whereof I hereunto set my hand this 25th day of October, 1907, in the presence of two attesting witnesses.

FRANCIS B. CONVERSE.

Witnesses:
F. S. MOODY,
W. C. TUCKER.